United States Patent
Liu

(10) Patent No.: US 9,710,879 B2
(45) Date of Patent: Jul. 18, 2017

(54) METHODS AND SYSTEMS FOR COMPUTING AN ALPHA CHANNEL VALUE

(71) Applicant: ROSS VIDEO LIMITED, Iroquois, Ontario (CA)

(72) Inventor: Yu Liu, Kanata (CA)

(73) Assignee: Ross Video Limited, Ontario (CA)

( * ) Notice: Subject to any disclaimer, the term of this patent is extended or adjusted under 35 U.S.C. 154(b) by 424 days.

(21) Appl. No.: 14/479,989

(22) Filed: Sep. 8, 2014

(65) Prior Publication Data
US 2016/0071240 A1 Mar. 10, 2016

(51) Int. Cl.
| | |
|---|---|
| G06T 11/00 | (2006.01) |
| G06T 3/40 | (2006.01) |
| G06T 3/00 | (2006.01) |
| G09G 5/02 | (2006.01) |
| H04N 5/262 | (2006.01) |
| H04N 5/45 | (2011.01) |
| H04N 9/75 | (2006.01) |
| H04N 1/60 | (2006.01) |

(52) U.S. Cl.
CPC ............ *G06T 3/00* (2013.01); *H04N 5/2628* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,229,550 | B1* | 5/2001 | Gloudemans | H04N 5/272 345/641 |
| 2003/0179214 | A1* | 9/2003 | Saund | G06T 11/60 345/619 |
| 2007/0139707 | A1* | 6/2007 | Takami | H04N 1/00411 358/1.15 |
| 2010/0007665 | A1* | 1/2010 | Smith | G06T 13/40 345/473 |
| 2012/0206468 | A1* | 8/2012 | Bratt | G06T 13/80 345/547 |

* cited by examiner

*Primary Examiner* — Wesner Sajous
(74) *Attorney, Agent, or Firm* — Nixon Peabody LLP; Jeffrey L. Costellia

(57) ABSTRACT

Methods and systems for computing an alpha channel value are provided. In one embodiment, a set of parameters is obtained based on an effect (transformation) to be applied to a source image. A value is also obtained that defines a uniform width of an area that borders at least one boundary of the transformed source image in the target image. For a target image pixel coordinate in the area, a corresponding source pixel coordinate is computed that is within another non-uniform area bordering the source image. An alpha channel value defining semi-transparency of a pixel associated with the target image pixel coordinate is computed as a function of a location of the corresponding source pixel coordinate in the another area bordering the source image.

19 Claims, 39 Drawing Sheets

FIG. 1

METHODS AND SYSTEMS FOR COMPUTING AN ALPHA CHANNEL VALUE

FIELD

The following relates to computing alpha channel values for use in defining the boundaries of a transformed digital video or digital image.

BACKGROUND

In digital video, an alpha channel is used to define the transparency of the video when that video is mixed with a background image or background video. For example, a source video may undergo a transformation in video production equipment to produce an effect (e.g. the shrinking and/or rotating of the source video), and then the resultant transformed source video may be layered on top of a background image or background video. The alpha channel defines the transparency of the transformed source video when it is layered on top of the background image or background video. For example, an alpha channel can be used to make the transformed source video semi-transparent.

A shaping alpha is an alpha channel that defines the boundaries of the transformed source video when the transformed source video is layered on top of a background image or video. In particular, it has been found to be aesthetically pleasing to a human eye to have the transformed source video fade into the background image or background video at the boundaries of the transformed source video. This may be achieved through the use of a shaping alpha that defines the semi-transparency of the transformed source video at or around its boundaries.

Methods and systems for computing the shaping alpha in video production equipment are desired.

SUMMARY

Methods and systems for computing an alpha channel value are provided below.

In one embodiment, a set of parameters is obtained based on an effect (transformation) to be applied to a source image. A value is also obtained that defines a uniform width of an area that borders at least one boundary of the transformed source image in the target image. For a target image pixel coordinate in the area, a corresponding source pixel coordinate is computed that is within another non-uniform area bordering the source image. An alpha channel value defining semi-transparency of a pixel associated with the target image pixel coordinate is computed as a function of a location of the corresponding source pixel coordinate in the another area bordering the source image.

More particularly, in one example embodiment, the method is performed by a computational device, and the method is performed as part of transforming a source digital image into a digital object in a target digital image. The source digital image and the target digital image each comprise a plurality of pixels. The method comprises the following steps: (i) receiving an indication of an effect to be applied to the source digital image; (ii) obtaining a set of parameters based on the indication of the effect; (iii) obtaining a value defining a width of an area that borders at least one boundary of the digital object in the target digital image; the width of the area is uniform along the at least one boundary of the digital object; (iv) for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image; the another area has a width that is non-uniform along a boundary of the source digital image; and (v) computing an alpha channel value defining semi-transparency of a pixel associated with the pixel coordinate $(x_t, y_t)$ of the target digital image. The alpha channel value is computed as a function of a location of the corresponding source pixel coordinate $(x_s, y_s)$ in the another area bordering the source digital image.

A digital video effects (DVE) device for performing the methods herein is also disclosed. Also disclosed is a computer readable storage medium having instructions stored thereon that, when executed, cause a computational device to perform the methods herein.

For example, in another embodiment, there is provided a digital video effects (DVE) device for transforming a source digital image in source video into a digital object in a target digital image in target video, where the source digital image and the target digital image each comprise a plurality of pixels. The DVE device comprises memory to store the source digital image when received by the DVE, and to store a value defining a width of an area that borders at least one boundary of the digital object in the target digital image. The width of the area is uniform along the at least one boundary of the digital object. The DVE device also comprises a user interface to receive an indication of an effect to be applied to the source digital image. The DVE device also comprises circuitry to perform operations including: obtaining a set of parameters based on the indication of the effect; for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image, the another area having a width that is non-uniform along a boundary of the source digital image; and computing an alpha channel value defining semi-transparency of a pixel associated with the pixel coordinate $(x_t, y_t)$ of the target digital image. The alpha channel value is computed as a function of a location of the corresponding source pixel coordinate $(x_s, y_s)$ in the another area bordering the source digital image.

In another embodiment, there is provided a computer readable storage medium having stored thereon computer executable instructions for transforming a source digital image into a digital object in a target digital image, where the source digital image and the target digital image each comprise a plurality of pixels. The computer executable instructions, when executed by a computational device, cause the computational device to perform operations comprising: receiving and storing the source digital image in a memory; receiving from a user interface an indication of an effect to be applied to the source digital image; obtaining a set of parameters based on the indication of the effect; obtaining a value defining a width of an area that borders at least one boundary of the digital object in the target digital image, where the width of the area is uniform along the at least one boundary of the digital object; for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image, the another area having a width that is non-uniform along a boundary of the source digital image; and computing an alpha channel value defining semi-transparency of a pixel associated with the pixel coordinate $(x_t, y_t)$ of the target digital image. The alpha channel value is computed as a function of a location of the corresponding source pixel coordinate $(x_s, y_s)$ in the another area bordering the source digital image.

BRIEF DESCRIPTION

Embodiments of the present application will be described, by way of example only, with reference to the accompanying figures wherein:

FIG. 1 illustrates a picture portion of a digital image of a digital video;

Like reference numerals are used in different figures to denote similar elements.

DETAILED DESCRIPTION

Figure 2:
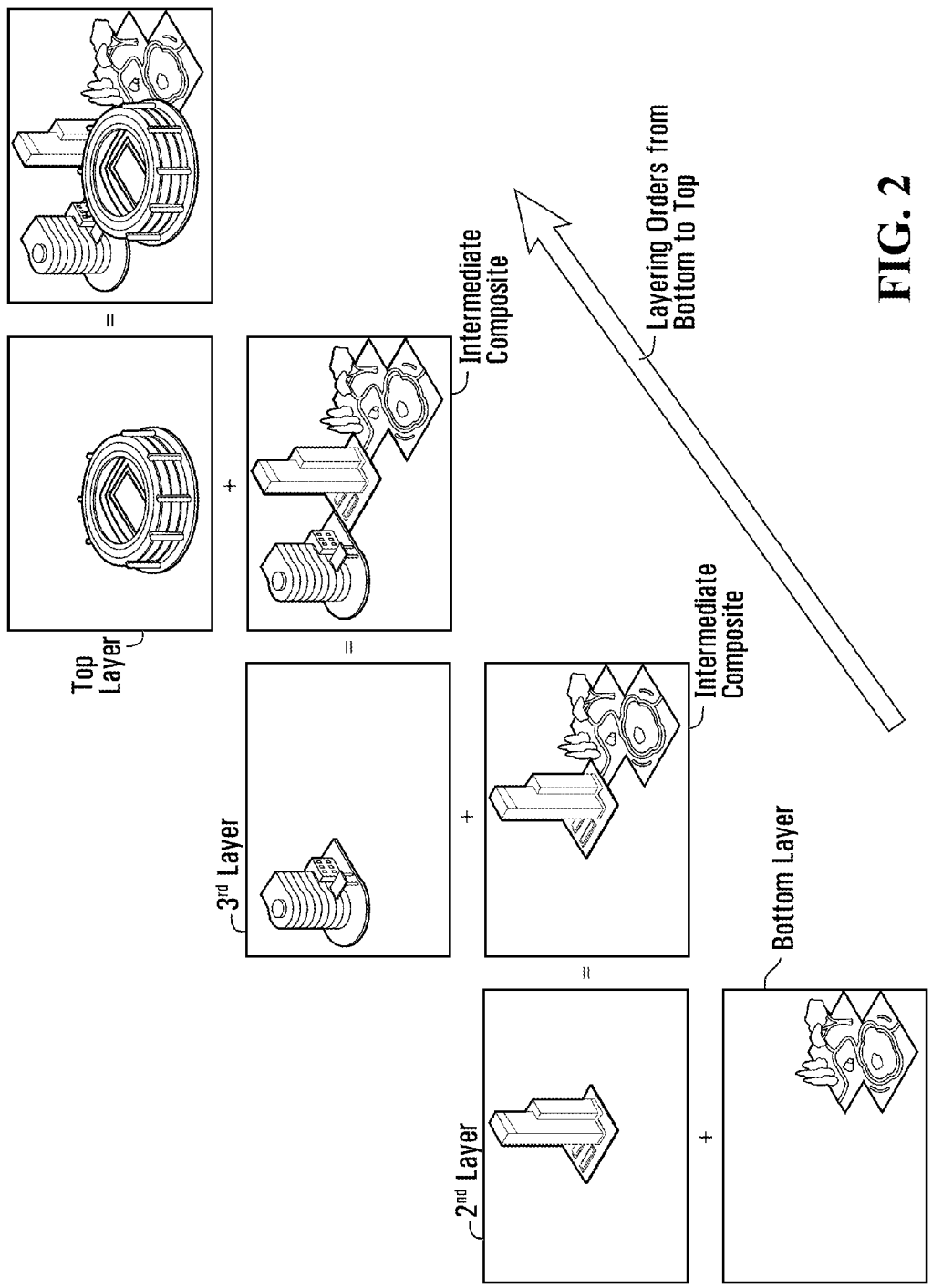
FIG. 2 illustrates a process of layering four video images from bottom to top.

For illustrative purposes, specific example embodiments will now be explained in greater detail below in conjunction with the figures.

The embodiments set forth herein represent information sufficient to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Turning now to the figures, some specific example embodiments will be described.

Figure 1:
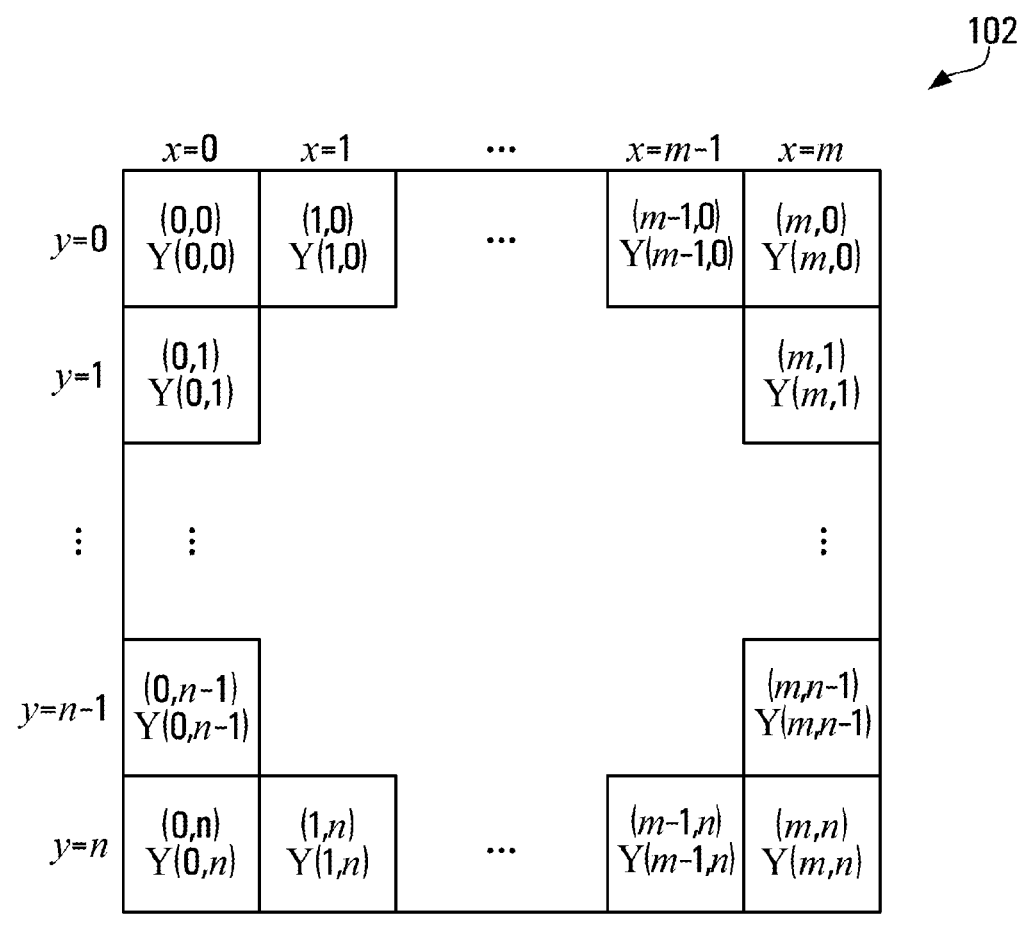

Digital video comprises a series of digital images displayed in rapid succession. Each digital image includes a picture portion, which is what is displayed, and typically some ancillary information (e.g. audio, metadata, etc.). FIG. 1 illustrates the picture portion 102 of a digital image of a digital video. The picture portion 102 comprises an $(m+1) \times (n+1)$ grid of pixels, where each pixel has a location coordinate $(x,y)$ on the picture 102 and a corresponding pixel value $Y(x,y)$. The pixel value $Y(x,y)$ is the visual information of the pixel at coordinate (x,y). For example, pixel value Y(x,y) may be the information designating what colour is to be displayed by that pixel and/or the luminance of the pixel. The notation Y(x,y) is used herein to designate the pixel value. It will be appreciated that the pixel value Y(x,y) may include multiple components, for example, the following 3 components: either a set of three numbers respectively representing red, blue, and green (RBG), or a set of three numbers respectively representing luminance, colour difference of blue, and colour difference of red. For example, Y(x,y) may comprise three separate numbers: one representing the luminance of the pixel, and two representing colour differences. When "pixel value Y(x,y)" is used herein, it will be understood to encompass all of the different components that make up the pixel value (e.g. the luminance and the colour difference values), unless indicated otherwise. When an operation is performed on a pixel value Y(x,y) (e.g. Y(x,y) is multiplied by a shaping alpha value α), it will be understood that the operation is being performed on each component of the pixel value (e.g. the luminance component and each colour difference value component).

FIG. 1 is somewhat simplified for ease of explanation. For example, it could be the case in some implementations that the coordinates (x,y) may not start at (0,0). Also, although the word "pixel" is used herein, what is meant more generally is an addressable element of a display device.

Digital video may be manipulated. One type of manipulation is video layering. Video layering may also be referred to as video compositing or video keying in production switchers. Video layering is a process which combines a sequence of separate video sources into a single video. For example, FIG. 2 illustrates a process of layering four video images from bottom to top. The four layers (bottom, $2^{nd}$, $3^{rd}$, and top in FIG. 2) each represent a respective video image and are layered to form a composite video image.

A digital video may also (or instead) be manipulated by a digital video effects (DVE) device to produce a digital video effect such as resizing, rotation, translation, and/or distortion of the video. A "DVE device" is sometimes also referred to as a "DVE system" or just a "DVE". Often, a video source undergoing digital video effects in a DVE device is further layered over other video images using video layering.

Figure 3:
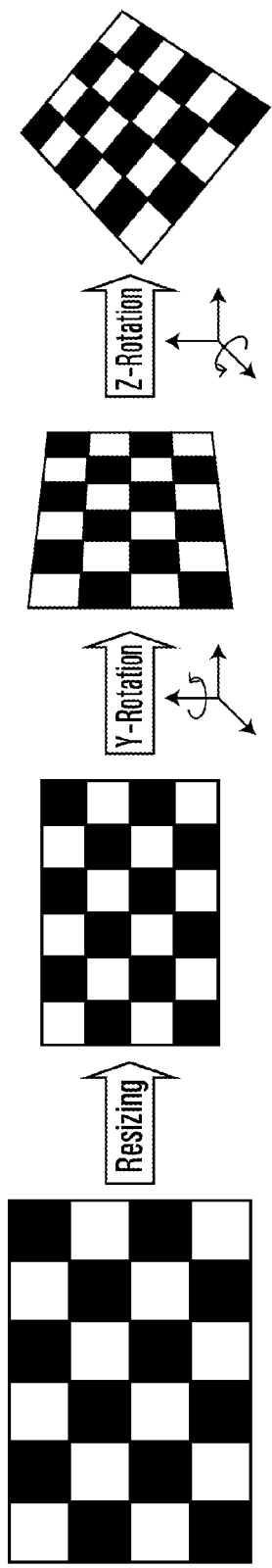
FIG. 3 illustrates a video image undergoing a sequence of 3-D manipulations.

A digital video effect is a visual effect which provides comprehensive video image manipulations in 3-D space, primarily dealing with resizing, rotation, translation or distortion of a source visual image. For example, FIG. 3 illustrates a process of a video image undergoing a sequence of 3-D manipulations, specifically, resizing, followed by y-rotation, followed by z-rotation.

Figure 4:
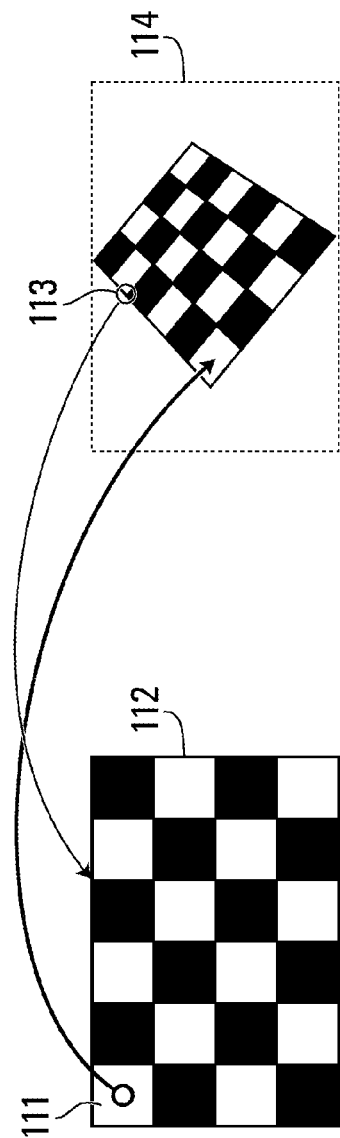
FIG. 4 illustrates forward mapping and inverse mapping.

One way to perform the digital video effect in the DVE device is to apply a geometric transformation (or mapping) to each digital image of the digital video. Such geometric transformations are also referred to as geometrical coordinates mapping. A geometrical mapping is called forward mapping if coordinates of a source video image are transformed into coordinates of a target video image. Conversely, a geometrical mapping is called an inverse mapping if a transform starts from a target video image and ends at a source image. FIG. 4 illustrates forward mapping and inverse mapping. As shown in FIG. 4, the center of the first block 111 in the source image 112 is mapped to a place between blocks in a target image 114. This is forward mapping. Conversely, the top boundary edge of the fourth target block 113 in the target image 114 is mapped onto a top boundary edge in the source image 112. This is inverse mapping. In the embodiments described with reference to the figures below, inverse mapping is used. Specifically, each coordinate of a transformed video image (target image) is mapped to a corresponding coordinate in the source video image.

Figure 5:
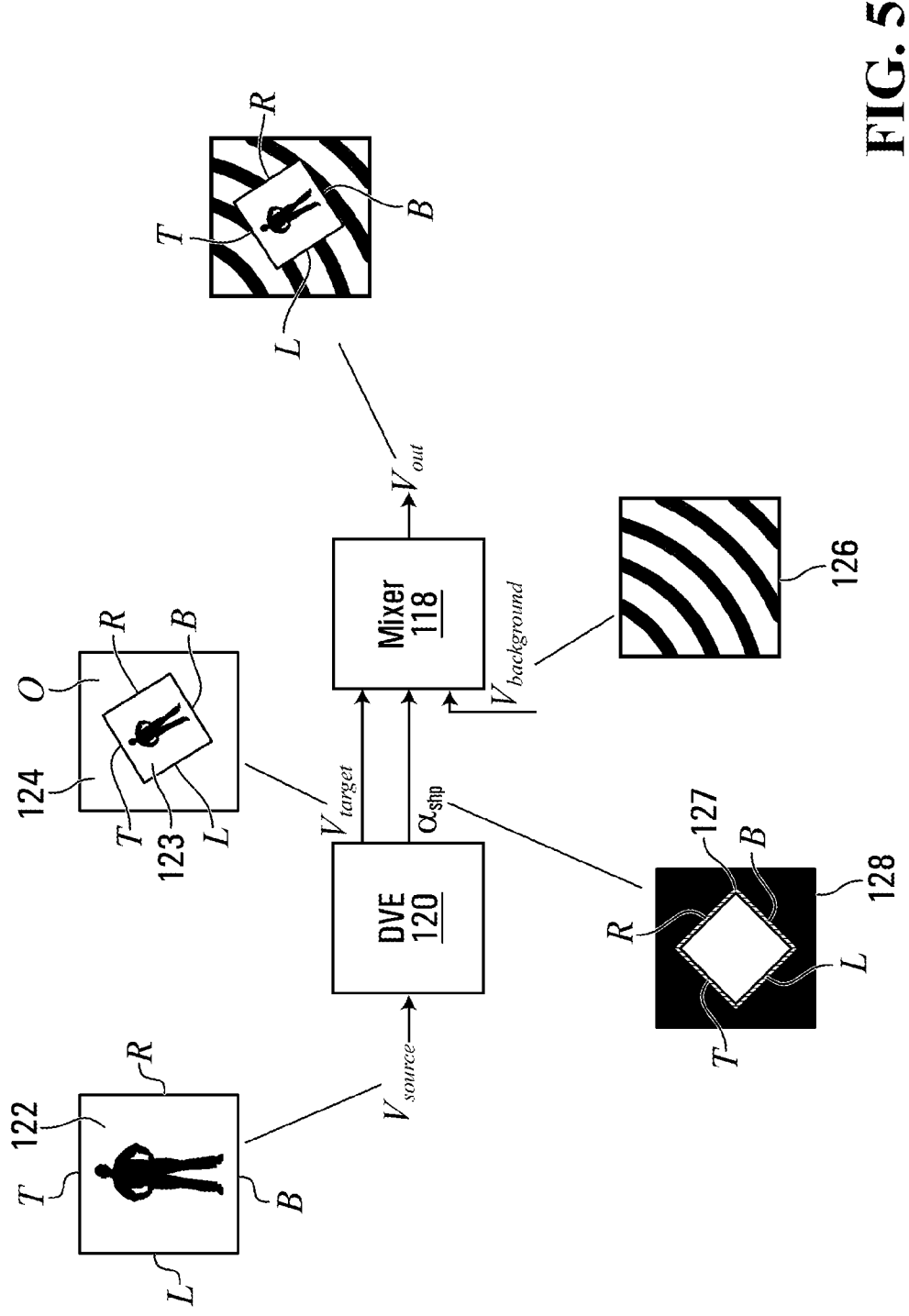
FIG. 5 illustrates a system for performing digital video effects (DVE) and a mixer for performing video layering.

With reference now to FIG. 5, there is illustrated a system 120 for performing DVE and a mixer 118 for performing video layering. As discussed in more detail below, the DVE device 120 and the mixer 118 may be implemented, for example, by one or more field programmable gate arrays (FPGAs) and/or one or more application specific integrated circuits (ASICs) and/or one or more processors in a computational device (e.g. a central processing unit, a graphics processing unit, and/or a general-purpose computing on graphics processing units).

In operation, the DVE device 120 receives as an input a source video $V_{source}$ comprising a series of source images (source image 122 being illustrated). The DVE device 120 outputs the manipulated video, which will be referred to as the "target video" $V_{target}$. The target video $V_{target}$ comprises a series of target images (target image 124 being illustrated). The mixer 118 layers the target video $V_{target}$ on top of a background video or image $V_{background}$ to produce an output video $V_{out}$.

When the source video $V_{source}$ undergoes manipulation in the DVE device 120, a shaping alpha $\alpha_{shp}$ may also be created. The shaping alpha $\alpha_{shp}$ is an alpha channel associated with the video that defines the resultant boundaries of the transformed source video in the target video $V_{target}$. The shaping alpha $\alpha_{shp}$ is particularly useful for situations like that illustrated in FIG. 5, in which the target video $V_{target}$ is layered on top of a background video or image $V_{background}$. Specifically, the shaping alpha $\alpha_{shp}$ may allow for a smooth transition between the boundaries of the transformed source video and the background $V_{background}$.

As shown in FIG. 5, a source video $V_{source}$ has left, right, top, and bottom boundaries, respectively denoted as L, R, T, and B. In the illustrated embodiment, the source video $V_{source}$ undergoes a manipulation by the DVE device 120 to generate the target video $V_{target}$. The manipulation illustrated involves moving the source video $V_{source}$ farther away from viewers and rotation around the z-axis in the x-y plane. There is an area O in the target video $V_{target}$ that is outside the original source video $V_{source}$. The DVE device 120 can set each target video pixel value Y(x,y) in area O to have a value equal to the value of the closest boundary pixel (i.e. the closest pixel on a boundary L, R, T, or B), although this is implementation specific.

The source video $V_{source}$ is manipulated on an image-by-image basis, and so the target video $V_{target}$ is created on an image-by-image basis and is layered on top of the background on an image-by-image basis. Therefore, in the remaining discussion, "source image" and "target image" will be used, it being understood that in the context of digital video, each "image" is a video image (e.g. a frame or field) of a digital video. Also, in the following discussion, "background image" will be used, it being understood that this may be a stand-alone image or a video image (e.g. frame or field) of a background digital video.

Therefore, for each source image 122, the DVE device 120 creates a corresponding target image 124 that includes an object 123 representing the transformed source image 122. In general, some of the pixels of the target image 124 will be within source bounds (i.e. within object 123) and others will be outside source bounds (i.e. in area O). This scenario is illustrated in FIG. 5, it being understood that this is a generality. It could be the case, for example, that the object 123 encompasses all of target image 124.

For each target image 124, the DVE device 120 also creates a shaping alpha $\alpha_{shp}$. The shaping alpha $\alpha_{shp}$ comprises a plurality of values, each one of the values of the shaping alpha $\alpha_{shp}$ corresponding to a respective pixel in the target image 124. Each one of the shaping alpha values of the shaping alpha $\alpha_{shp}$ will therefore be denoted as $\alpha_{shp}(x_t, y_t)$. Generally, each value $\alpha_{shp}(x_t, y_t)$ in the shaping alpha will range from zero to one (i.e. $0 \leq \alpha_{shp}(x_t, y_t) \leq 1$). A value of zero indicates that the corresponding target image pixel is out of bounds of the source image (i.e. the pixel of the target image 124 is in area O), and therefore when the target image 124 is layered on top of a background image 126, that pixel of the target image will be completely transparent, such that only the background 126 is seen. On the other hand, a shaping alpha value $\alpha_{shp}(x_t, y_t)$ of one indicates that the corresponding target image pixel is within the bounds of the source image (i.e. the pixel of the target image 124 is within the area defined by L, R, T, and B), and therefore when the target image 124 is layered on top of the background 126, that pixel of the target image will be completely opaque in the sense that it will not show any of the background image and only show the target image. A shaping alpha value $\alpha_{shp}(x_t, y_t)$ between zero and one indicates a boundary condition (a border area of the object 123) in which partial transparency (semi-transparency) is present to allow for a smooth transition between the edge of the object 123 and the background image 126. The closer the shaping alpha value $\alpha_{shp}(x_t, y_t)$ is to 1, the more the object 123 will show, and the closer the shaping alpha value is to zero, the more the background image 126 will show. By using the shaping alpha $\alpha_{shp}$, the transformed source image (i.e. the object 123) may be made to fade out gradually into the background image 126 at edge boundaries L, R, T, and B, which is typically more aesthetically pleasing to a human eye.

The shaping alpha $\alpha_{shp}$ corresponding to the target image 124 is shown as 128 in FIG. 5. It may also be thought of as an "image" in the sense that, as explained above, it has an alpha value $\alpha_{shp}(x_t, y_t)$ associated with each pixel $(x_t, y_t)$ in the target image 124. As explained above, each alpha value $\alpha_{shp}(x_t, y_t)$ in the shaping alpha $\alpha_{shp}$ is either zero or one or some number in between. The shaping alpha $\alpha_{shp}$ defines all boundaries of the target object 123 (i.e. of the manipulated source video) and helps layering the target image 124 on top of the background image 126. In FIG. 5, the black area of the shaping alpha 128 represents shaping alpha values of zero (outside the source bounds), the white area of the shaping alpha 128 represents shaping alpha values of one (inside the source bounds), and the cross-hatched area 127 of the shaping alpha 128 represents shaping alpha values between zero and one (defining semi-transparency of the boundaries of the transformed source image).

Figure 6:
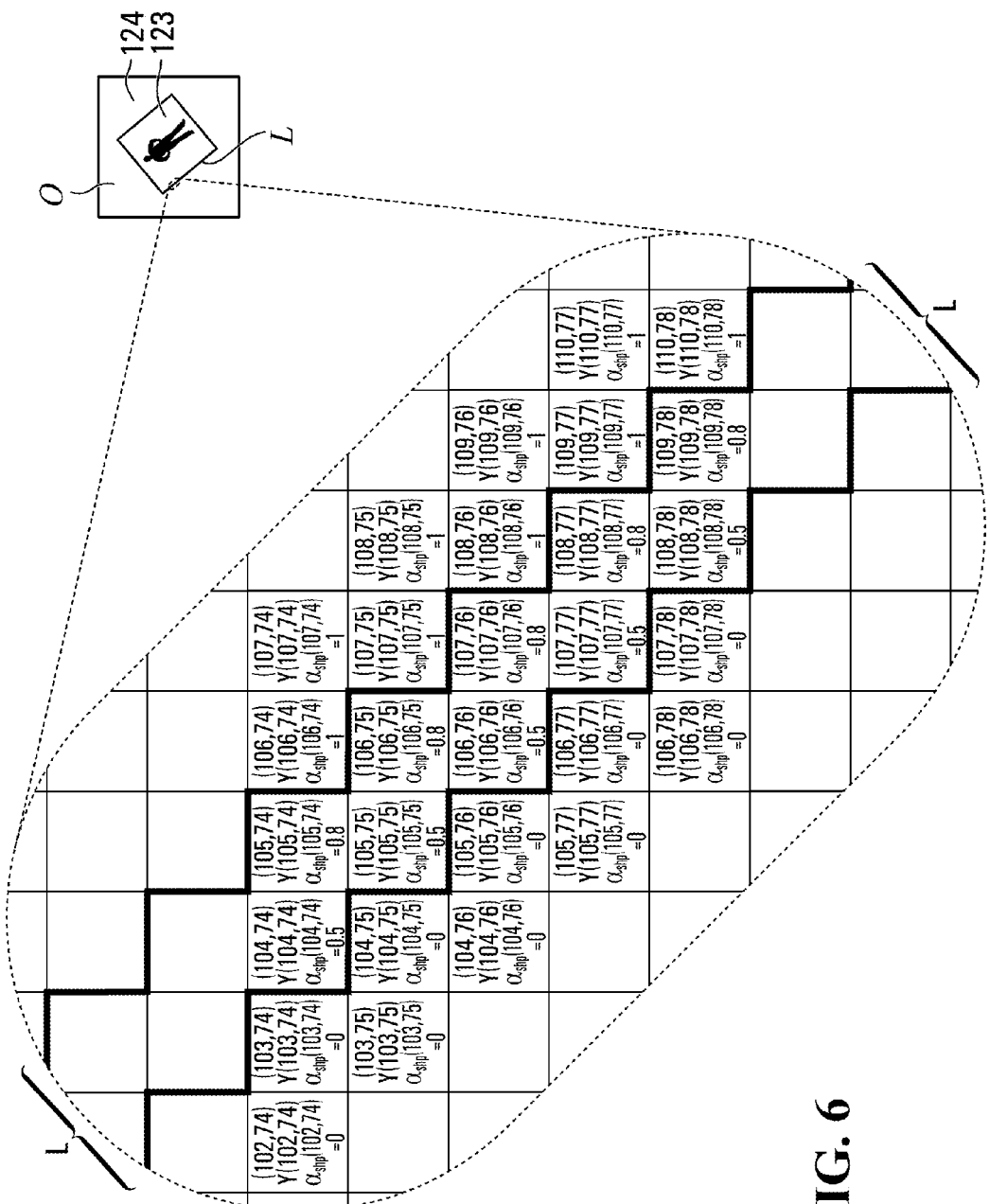
FIG. 6 illustrates a magnified portion of a target image around a left boundary.

As a simple example to further help illustrate the principle of the shaping alpha $\alpha_{shp}$, consider FIG. 6, which illustrates a magnified portion of target image 124 around left boundary L, and which shows each pixel in the magnified portion. Each pixel has a coordinate (x,y) (e.g. (102,74)) and a corresponding pixel value $Y(x_t, y_t)$ (e.g. Y(102,74)). Also shown for each pixel is the corresponding shaping alpha value $\alpha_{shp}(x,y)$. The bold lines represent the boundary L. In this example, the boundary L is two pixels in width, and the shaping alpha values on the boundary L are between zero and one. This will cause the pixels on the boundary L to be semi-transparent, so that some of the background image 126 at the boundary L will be seen, when the background image 126 is layered underneath the target image 124. This two-pixel area/range in which the shaping alpha $\alpha_{shp}$ values are between zero and one is referred to as the "softness" range (or softness zone or softness margin). The pixels that are not on the boundary L (i.e. not in the softness range), will either be completely transparent and therefore show only the background image 126, or completely opaque so that only the target image 124 is seen and not the background image 126.

For example, target image pixel (103,74) is outside the boundary L and specifically in area O of the target image 124. Therefore, this pixel has a corresponding shaping alpha value of zero ($\alpha_{shp}(103,74)=0$). This means that this pixel will be completely transparent in that it will only show the background image 126 at this pixel location when the background image 126 is layered underneath the target image 124. That is, no matter what the target image pixel value Y(103,74) is, it will not be displayed. Instead, only the pixel value of the background image 126 layered underneath the target image 124 will be displayed. On the other hand, target image pixel (106,74) is within the boundaries of the source image and has a corresponding shaping alpha value of one ($\alpha_{shp}(106,74)=1$). This means that this pixel will be completely opaque in that it will only show the target image 124 at this pixel location when the background image 126 is layered underneath the target image 124. That is, Y(106,74) will be displayed with no corresponding background image pixel being shown. Target image pixel (105,74) is on the boundary L (specifically in the softness range) and therefore has a corresponding shaping alpha value that is between zero and one and specifically 0.8 in this example ($\alpha_{shp}(105,74)=0.8$). This means that this pixel of the target image 124 will have semi-transparency in that it will show some of the background image 126 at this pixel location when the background image 126 is layered underneath the target image 124. That is, no matter what the target image pixel value Y(105,74), the pixel value of the background image 126 layered underneath the target image 124 at this point will still also be partially displayed. Similarly, target image pixel (104,74) is also on the boundary L and therefore has a corresponding shaping alpha value that is between zero and one and specifically 0.5 in this example ($\alpha_{shp}(104,74)=0.5$). This means that this pixel of the target image 124 will also have semi-transparency in that it will show some of the background image 126 at this pixel location when the background image 126 is layered underneath the target image 124. Since 0.5 is closer to 0 than 0.8, the pixel value Y(104,74) will be more transparent than the pixel value Y(105,74). As mentioned above, a primary purpose of the shaping alpha is to cause the transformed source image (i.e. the object 123 in the target image 124) to fade out gradually into the background image 126 at edge boundaries of the object 123 (e.g. at boundary L), which is typically more aesthetically pleasing to a human eye.

One way to apply the shaping alpha $\alpha_{shp}$ is to multiply each pixel value $Y(x_t, y_t)$ in the target image with its corresponding shaping alpha value $\alpha_{shp}(x_t, y_t)$. The examples illustrated herein use this method, which is one reason why $\alpha_{shp}(x_t, y_t)=0$ is used to denote full transparency of the target image pixel and $\alpha_{shp}(x_t, y_t)=1$ is used to denote full opaqueness of the target image pixel. Specifically, when $\alpha_{shp}(x_t, y_t)=0$, then $Y(x_t, y_t) \times \alpha_{shp}(x_t, y_t) = Y(x_t, y_t) \times 0 = 0$, which means that the target image pixel displays no value and hence is fully transparent, and when $\alpha_{shp}(x_t, y_t)=1$, then $Y(x_t, y_t) \times \alpha_{shp}(x_t, y_t) = Y(x_t, y_t) \times 1 = Y(x_t, y_t)$, which means the target image pixel displays its full value.

Figure 7:
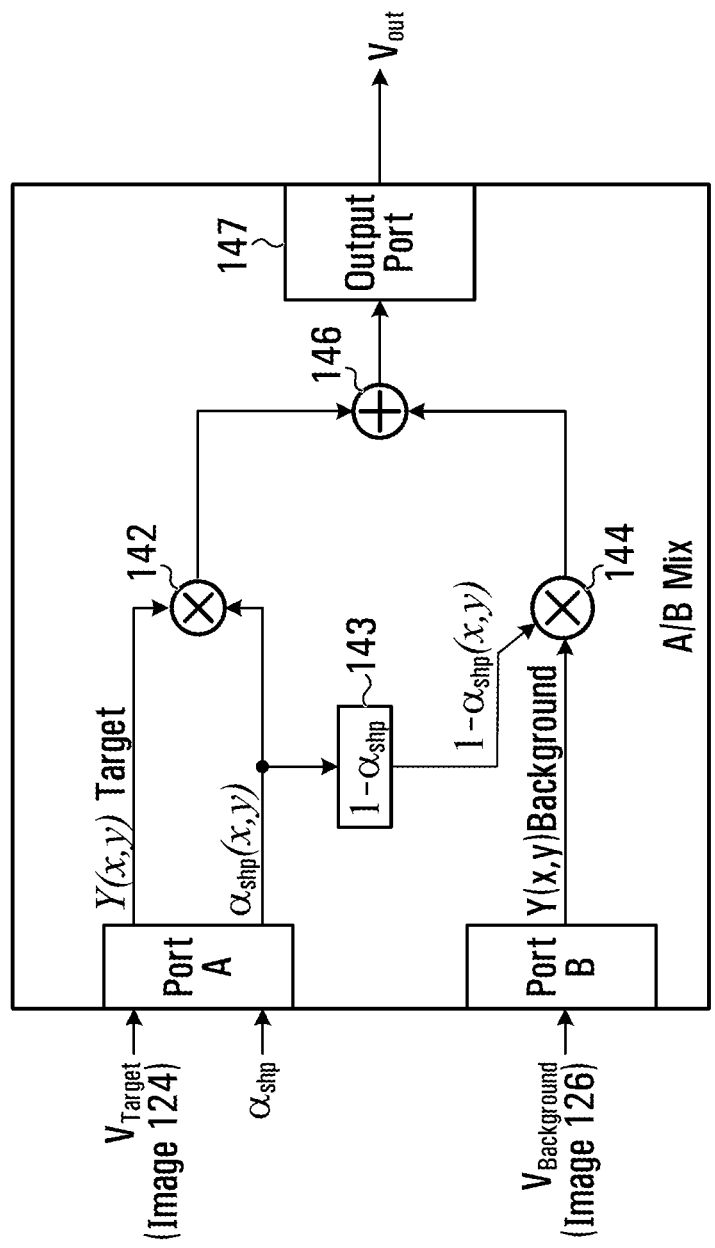
FIG. 7 illustrates an example implementation of mixer.

FIG. 7 illustrates an example implementation of mixer 118. The example shown in FIG. 7 includes two input ports labelled Port A and Port B, multipliers 142 and 144, adder 146, and an output port 147. The input and output ports may be implemented, for example, by addressable memory (e.g. the target image 124 may be fed to Port A by writing the target image 124 to a designated memory location). The multipliers and adders may be implemented, for example, using digital logic multiplying and adding circuits (e.g. in the case of a multiplier a digital logic circuit that receives two digital inputs and multiplies them together, and in the case of an adder a digital logic circuit that received two digital inputs and adds them together). The mixer 118 also includes a computational block 143 for computing a complementary shaping alpha $1-\alpha_{shp}$. This may be implemented, for example, by a digital logic circuit that subtracts the input value $\alpha_{shp}$ (x,y) from the value "1" for each shaping alpha value $\alpha_{shp}$(x,y).

In operation, the mixer 118 multiplies each pixel value $Y(x_t,y_t)$ in the target image with its corresponding shaping alpha value $\alpha_{shp}$(x,y), as per above. As shown in FIG. 7, the complementary shaping alpha value, that is $1-\alpha_{shp}$, is applied to the background image 126, so that the background image pixels are completely transparent when the corresponding target image pixels are completely opaque, and vice versa, and so that a complementary amount of semi-transparency is applied to each background image pixel corresponding to a semi-transparent target image pixel.

More specifically, with reference to FIG. 7, the "Port A" receives two inputs: the target image 124 and the shaping alpha value $\alpha_{shp}$, and the "Port B" receives a single input: the background image 126. The shaping alpha value $\alpha_{shp}$ is applied to the target image 124 by multiplying the target image 124 with the shaping alpha value $\alpha_{shp}$, as at multiplier 142. More specifically, each pixel value $Y(x_t,y_t)$ in the target image is multiplied with its corresponding shaping alpha value $\alpha_{shp}(x_t,y_t)$. The complementary shaping alpha value $1-\alpha_{shp}$ is applied to the background image 126 in the same manner, as at multiplier 144. Then the two images are added, as at adder 146, to form the layered output image. Thus, it can be said that the mixer 118 in this example embodiment implements the function $O_{mix}=A\alpha+B*(1-\alpha)$, where A is the target video and B is the background. This is referred to as A/B mixing. The background B may be, for example, a solid video picture or a composite video produced from multiple layered videos.

Figure 8:
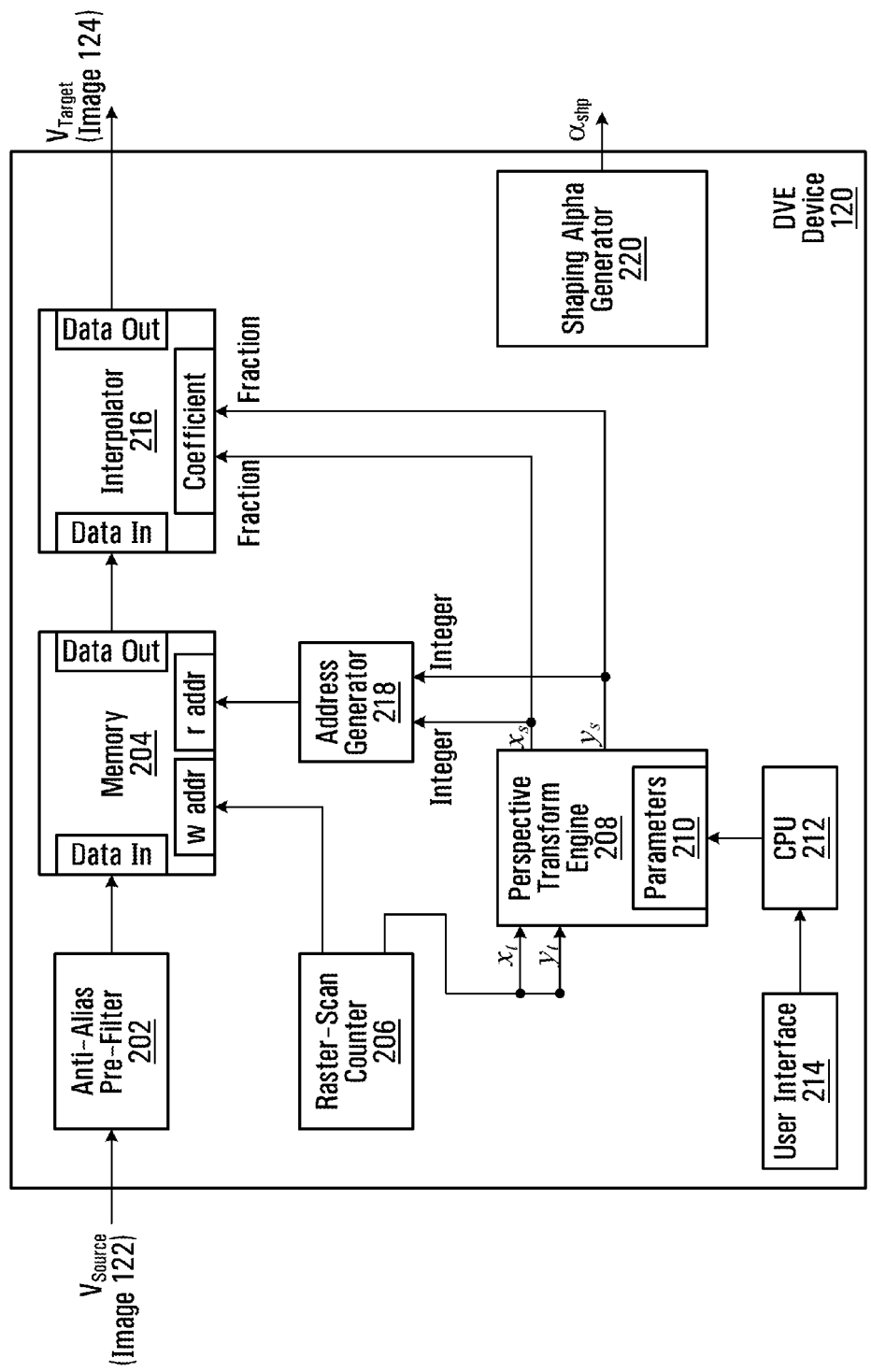
FIG. 8 illustrates an example implementation of a DVE device.

Returning to FIG. 5, the DVE device 120 receives source image 122 as an input and produces as an output the target image 124 and its corresponding shaping alpha $\alpha_{shp}$. FIG. 8 illustrates an example implementation of DVE device 120.

As shown in FIG. 8, the example implementation of the DVE device 120 includes a pre-filter 202, memory 204, a raster-scan counter 206, a perspective transform engine 208, a CPU 212, a user interface 214, an interpolator 216, an address generator 218, and a shaping alpha generator 220. The pre-filter 202 may be implemented, for example, by a digital filter implemented by a general processing device (e.g. a processor) and/or a specific integrated circuit. The raster-scan counter 206 may be implemented, for example, by (or using) a digital counter circuit. The perspective transform engine 208, interpolator 216, address generator 218, and shaping alpha generator 220 may each be implemented, for example, using a general processing device (e.g. processor) and/or a specific integrated circuit configured to perform the specific operations discussed herein. The user interface 214 may be implemented, for example, using a graphical user interface and/or knobs and/or keys and/or other physical devices that allow a user to interface with the DVE device 120 and input commands.

In operation, and as shown in FIG. 8, the source image 122 may first be subject to the pre-filtering 202 (e.g. to reduce alias artifacts caused by down-sampling), and is then stored in memory 204. The raster-scan counter 206 can be used to write the source image 122 into the memory 204 on a pixel-by-pixel basis.

The corresponding target image 124 is then also generated on a pixel-by-pixel basis as follows.

Assume the picture portion of the target image 124 comprises an (m+1)×(n+1) grid of pixels, where each target pixel has a location $(x_t,y_t)$ and an associated pixel value $Y_t(x_t,y_t)$. The raster-scan counter 206 begins at $(x_t,y_t)=(0,0)$ and counts up to $(x_t,y_t)=(m,n)$. That is, the raster-scan counter 206 generates each geometrical target pixel coordinate $(x_t,y_t)$. For each target pixel coordinate $(x_t,y_t)$, the target coordinate values $x_t$ and $y_t$ are input into the perspective transform engine 208, which computes the corresponding source pixel coordinate $(x_s,y_s)$ of the source image 122 stored in memory 204. The source pixel coordinate $(x_s,y_s)$ corresponding to the target pixel coordinate $(x_t,y_t)$ is a function of the manipulation being applied by the DVE device 120 and is guided by parameters 210. For example, in one embodiment, to obtain the corresponding x-coordinate of the source pixel (i.e. $x_s$) for a given target pixel coordinate $(x_t,y_t)$, the following computation is performed by the perspective transform engine 208:

$$x_s = T_d + \frac{(T_a x_t + T_b y_t + T_c f)P_d}{P_a x_t + P_b y_t + P_c f} \qquad \text{(Equation 1)}$$

To obtain the corresponding y-coordinate of the source pixel (i.e. $y_s$) for a given target pixel $(x_t,y_t)$, the following computation is performed by the perspective transform engine 208:

$$y_s = T_h + \frac{(T_e x_t + T_f y_t + T_g f)P_d}{P_a x_t + P_b y_t + P_c f}. \qquad \text{(Equation 2)}$$

Equations 1 and 2 are based on mapping of a target pixel coordinate to a corresponding source pixel coordinate using the following inverse mapping function (geometric transformation):

$$M^{-1} = \begin{bmatrix} T_a & T_b & T_c & T_d \\ T_e & T_f & T_g & T_h \\ P_a & P_b & P_c & -P_d \\ 0 & 0 & 0 & 1 \end{bmatrix}, \qquad \text{(Equation 3)}$$

where $M^{-1}$ is a homogeneous matrix, inverse to a forward mapping M, where a 4×4 homogeneous matrix represents a geometrical transformation. The value f represents a focus distance between the viewer and the target screen.

In this example, $T_a$, $T_b$, $T_c$, $T_d$, $T_e$, $T_f$, $T_g$, $T_h$, $P_a$, $P_b$, $P_c$, $P_d$, and f are the parameters 210, and their values are set by the CPU 212 based on the specific effect requested by the user via the user interface 214. For example, if a user indicated via the user interface 214 that it was desired to rotate the image by 15 degrees and shrink the image to half its size, then the user interface 214 would electronically forward this request to the CPU 212, which would compute the corresponding values of the parameters 210, and forward these specific parameter values 210 to the perspective transform engine 208 via a parameter bus.

One way to compute the parameters is as follows. A matrix $M=M_t \times M_y \times M_z$ is computed where $$M_t = \begin{bmatrix} 1 & 0 & 0 & x \\ 0 & 1 & 0 & y \\ 0 & 0 & 1 & z \\ 0 & 0 & 0 & 1 \end{bmatrix},$$

which represents the translation or shift in 3D space by (x, y, z), where $$M_y = \begin{bmatrix} \cos\beta & 0 & -\sin\beta & 0 \\ 0 & 1 & 0 & 0 \\ \sin\beta & 0 & \cos\beta & 0 \\ 0 & 0 & 0 & 1 \end{bmatrix},$$

which represents the rotation at angle β around the y-axis, and where $$M_z = \begin{bmatrix} \cos\phi & -\sin\phi & 0 & 0 \\ \sin\phi & \cos\phi & 0 & 0 \\ 0 & 0 & 1 & 0 \\ 0 & 0 & 0 & 1 \end{bmatrix},$$

which represents a rotation at angle φ around the z-axis. $M^{-1}$ is then the inverse of M. Therefore, for a given effect, the translation and rotation angles around the y and z axis are determined. Then, $M=M_t \times M_y \times M_z$ is computed, which gives the effect of rotation around the z-axis first, then rotation around the y-axis, and then translation. Either in parallel to computing M (or from M), the inverse matrix $M^{-1}$ is computed to determine parameters $T_a$, $T_b$, $T_c$, $T_d$, $T_e$, $T_f$, $T_g$, $T_h$, $P_a$, $P_b$, $P_c$, $P_d$. Also, the focus f is determined, which is representative of the rotation around the x-axis. Then, Equations (1) and (2) above may be computed for each target pixel coordinate $(x_t, y_t)$.

Equations (1) and (2) relate to the parameters from matrix $M^{-1}$ as follows. Subjected to perspective projection, the depth of a point in 3-D space may be expressed in terms of a target pixel coordinate $(x_t, y_t)$ such that $$\bar{z} = \left(\frac{z}{f}\right) = \frac{P_d}{P_a x_t + P_b y_t + P_c f},$$

where $\bar{z}$ is unified depth in terms of focus. The inverse mapped x-coordinate in a source image space is then expressed in terms of target coordinates such that $x_s = \bar{z}(T_a x_t + T_b y_t + T_c f) + T_d$, which is equal to Equation (1). The inverse mapped y-coordinate in a source image space is expressed in terms of target coordinates such that $y_s = \bar{z}(T_e x_t + T_f y_t + T_g f) + T_h$, which is equal to Equation (2).

Equations (1) and (2) may also be rearranged to instead be in terms of unified source coordinates $$\bar{x}_s \text{ and } \bar{y}_s: \begin{cases} \bar{x}_s = \dfrac{x_s - T_d}{P_d} = \dfrac{T_a x_t + T_b y_t + T_c f}{P_a x_t + P_b y_t + P_c f} \\ \bar{y}_s = \dfrac{y_s - T_h}{P_d} = \dfrac{T_e x_t + T_f y_t + T_g f}{P_a x_t + P_b y_t + P_c f} \end{cases}.$$

The parameters above (i.e. the parameters in matrix $M^{-1}$, and the value of f) are computed on an image-by-image basis, although this need not be the case (particularly if the effect does not change between video images). Also, in an alternative embodiment, the user of the DVE device 120 could also (or instead) be provided with pre-selected effects, with corresponding pre-computed parameters stored in memory and retrieved by the CPU 212, rather than computed.

In the matrix $M^{-1}$, the parameters in the first two rows ($T_a$, $T_b$, $T_c$, $T_d$, $T_e$, $T_f$, $T_g$, $T_h$) generally relate to providing the transform, whereas the parameters in the third row ($P_a$, $P_b$, $P_c$, $P_d$) generally relate to providing the perspective.

In the illustrated embodiments, the parameters 210 are pre-calculated per image (field or frame) before the raster-scan counter 206 begins counting target pixel coordinate values $(x_t, y_t)$.

As discussed above, the perspective transform engine 208 computes a corresponding source pixel coordinate $(x_s, y_s)$ for each target pixel coordinate $(x_t, y_t)$. In general, the target pixel value $Y_t(x_t, y_t)$ will then be set as the corresponding source pixel value $Y_s(x_s, y_s)$ which is stored in and retrieved from memory 204. However, there is a caveat. In general, the corresponding source pixel coordinate $(x_s, y_s)$ computed by the perspective transform engine 208 for a given target pixel coordinate $(x_t, y_t)$ will not be an integer, but will be a fractional value. For example, if $(x_t, y_t) = (12, 14)$ is input into the perspective transform engine 208, then the corresponding source pixel coordinate $(x_s, y_s)$ (computed using Equations 1 and 2, for example) may be $(x_s, y_s) = (23.63, 17.27)$. Therefore, to compute the target pixel value $Y_t(x_t, y_t)$ interpolation is used. In one embodiment, bilinear interpolation is used as follows: assume a source pixel coordinate of $(x_s, y_s) = (i+u, j+v)$ where (i,j) is the integer and (u,v) is the fraction. For example, in the example above of $(x_s, y_s) = (23.63, 17.27)$, then i=23, u=0.63, j=17, and v=0.27. The source pixel values neighbouring $(x_s, y_s) = (i+u, j+v)$ are therefore $Y_s(i,j)$, $Y_s(i+1, j)$, $Y_s(i, j+1)$, and $Y_s(i+1, j+1)$. The target pixel value $Y_t(x_t, y_t)$ is then computed as $Y_t(x_t, y_t) = Y_j \times (1-v) + Y_{j+1} \times v$, where $Y_j = Y(i,j) \times (1-u) + Y(i+1, j) \times u$ and where $Y_{j+1} = Y(i, j+1) \times (1-u) + Y(i+1, j+1) \times u$. To perform interpolation of this nature, the DVE device 120 includes the interpolator 216. It will be appreciated that another type of interpolation could be performed instead (e.g. a higher order of interpolation that uses a higher order of polynomial in the x-axis and y-axis).

As shown in FIG. 8, the DVE device 120 also includes the address generator 218, which uses the computed source pixel coordinate $(x_s, y_s)$ (e.g. $(x_s, y_s) = (23.63, 17.27)$) to generate the addresses of the source pixels to be used for the interpolation (e.g. (23, 17), (23, 18), (24, 17), and (24, 18)). The corresponding source pixel values indicated by the address generator 218 are then read from memory 204 and forwarded to interpolator 216. The fractional values of the computed source pixel coordinate $(x_s, y_s)$ (e.g. 0.63 and 0.27) are also forwarded to the interpolator. The output of interpolator 216 is the target pixel value $Y_t(x_t, y_t)$.

The process above is repeated for each target image coordinate $(x_t, y_t)$ such that the target image 124 is created on a pixel-by-pixel basis. In this example, in the cases in which a given target pixel coordinate $(x_t, y_t)$ maps to a corresponding source pixel coordinate $(x_s, y_s)$ that is out of source bounds, then the target pixel value $Y_t(x_t, y_t)$ is set to the source pixel value $Y_s(x_s, y_s)$ of the closest source boundary pixel. For example, assume that the effect being applied to the source image 122 includes reducing the size of the image 122 so that the transformed source image (i.e. the object 123) is smaller than the source image 122. In this case, there will be some target pixel coordinates that will be outside of the transformed source image (i.e. in area O in FIG. 5). In this case, the corresponding source pixel coordinate $(x_s,y_s)$ will (in general) be out of bounds of the source image 122, and in such a case the target pixel value $Y_t(x_t,y_t)$ is set to the source pixel value $Y_s(x_s,y_s)$ of the closest source boundary pixel (i.e. the closest source pixel on a boundary L, R, T, or B of the source image 122).

The DVE device 120 also includes the shaping alpha generator 220. Computation of the shaping alpha $\alpha_{shp}$ for the target image 124 is discussed below.

Figure 9:
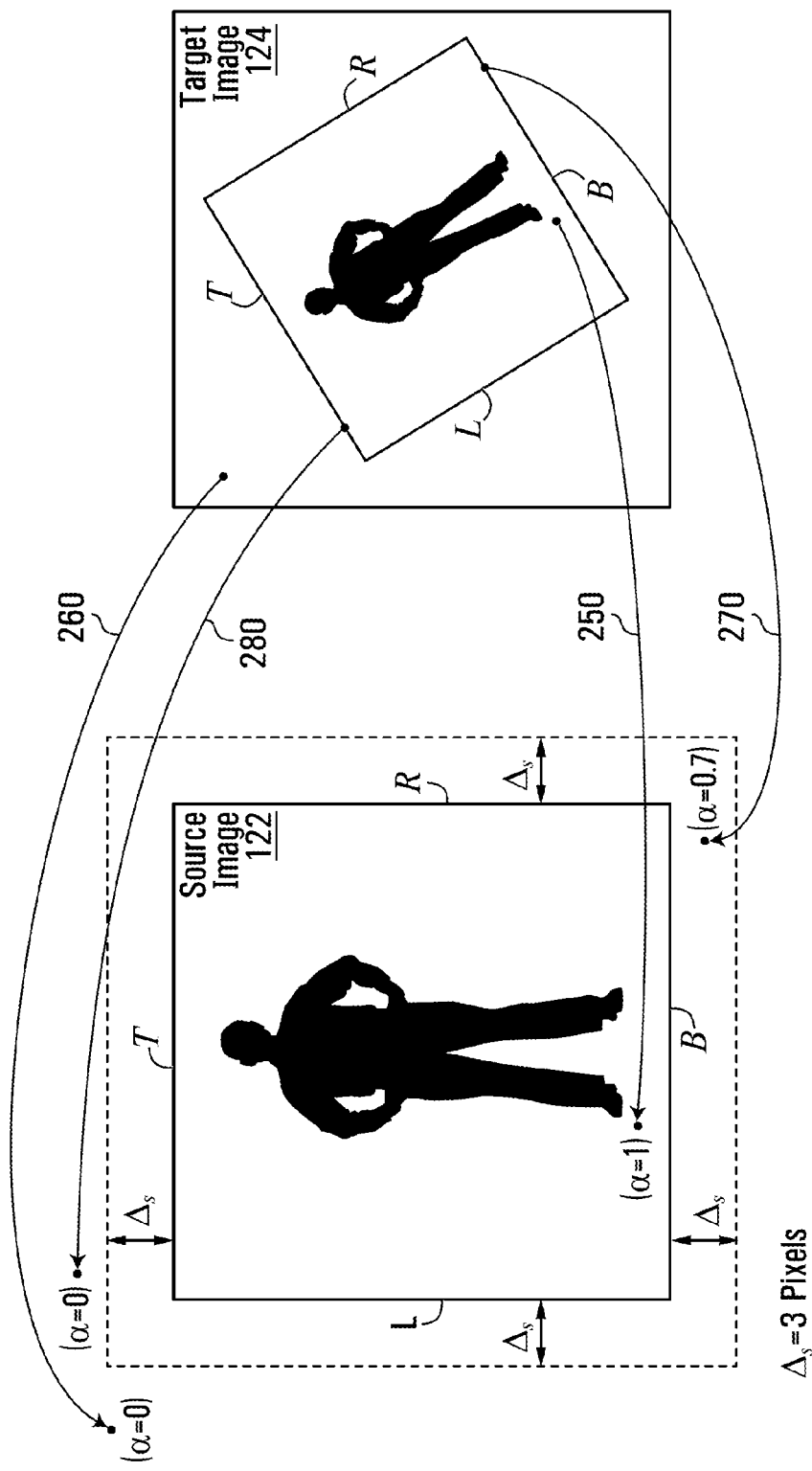
FIG. 9 illustrates a source image with a softness area of uniform width bordering the boundaries of the source image.

There are different ways to compute the shaping alpha $\alpha_{shp}$ for the target image 124. One method to compute the shaping alpha $\alpha_{shp}$ assumes a fixed (uniform) range of softness around each of boundary edges L, R, T, and B of the source image 122 (that is, a fixed pixel width around each of the boundary edges L, R, T, and B in which the shaping alpha value is between zero and one). An example of this is shown in FIG. 9 in which a uniform width $\Delta_s$ around the boundaries of the source image 122 is defined, which in this example is 3 pixels wide. When a target pixel coordinate $(x_t,y_t)$ maps to a corresponding source pixel coordinate $(x_s,y_s)$ that is within the area bounded by boundary edges L, R, T, and B (as at 250 in FIG. 9), then the shaping alpha $\alpha_{shp}$ value for that target pixel coordinate $(x_t,y_t)$ is set to one (i.e. fully opaque since the target pixel coordinate maps within the source image and so the background image layered underneath should not be seen at this pixel location). When the target pixel coordinate $(x_t,y_t)$ maps to a corresponding pixel coordinate $(x_s,y_s)$ outside of the area bounded by softness range $\Delta_s$ (as at 260 in FIG. 9), then the shaping alpha $\alpha_{shp}$ value for that target pixel coordinate $(x_t,y_t)$ is set to zero (i.e. fully transparent since the target pixel coordinate maps outside the source image and so only the background image layered underneath should be seen at this pixel location). When the target pixel coordinate $(x_t,y_t)$ maps to a corresponding pixel coordinate $(x_s,y_s)$ within the softness range $\Delta_s$ (as at 270 in FIG. 9), then the shaping alpha $\alpha_{shp}$ value for that target pixel coordinate $(x_t,y_t)$ is set to a value between zero and one (i.e. semi-transparent since it is desired to show a smooth transition between the manipulated source image boundary and the background layered underneath).

Depending on how the source image 122 has been manipulated by the perspective transform engine 208, a pixel of the target image on the boundary of the manipulated source image could map outside of the softness range $\Delta_s$ in some places, as shown at 280 in FIG. 9. When pixels of the target image on the boundary of the manipulated source image map outside of the softness range $\Delta_s$ in some places, but not in others, then this may result in jagged edges showing abrupt changes between the boundary of the manipulated source image and the background image over which the manipulated source image is layered. For example, in FIG. 10, along the right boundary R, pixels 1, 2, and 3 have a smooth transition since pixel 1 has a corresponding shaping alpha value $\alpha_{shp}$ equal to 1 (inside the right boundary), pixel 2 has a corresponding shaping alpha value $\alpha_{shp}$ between zero and one, such as 0.5 (inside softness range $\Delta_s$), and pixel 3 has a corresponding shaping alpha value $\alpha_{shp}$ equal to zero (outside softness range $\Delta_s$). However, none of pixels 4, 5, and 6 fall within softness range $\Delta_s$, and so the appearance of a jagged edge may occur. Area A defines a more desirable (non-uniform) softness range around the source image to mitigate the appearance of jagged edges. However, instead the area A outside of the softness range $\Delta_s$ is in the "hard-switch" area (i.e. the shaping alpha value $\alpha_{shp}$ equals zero in this area).

Figure 10:
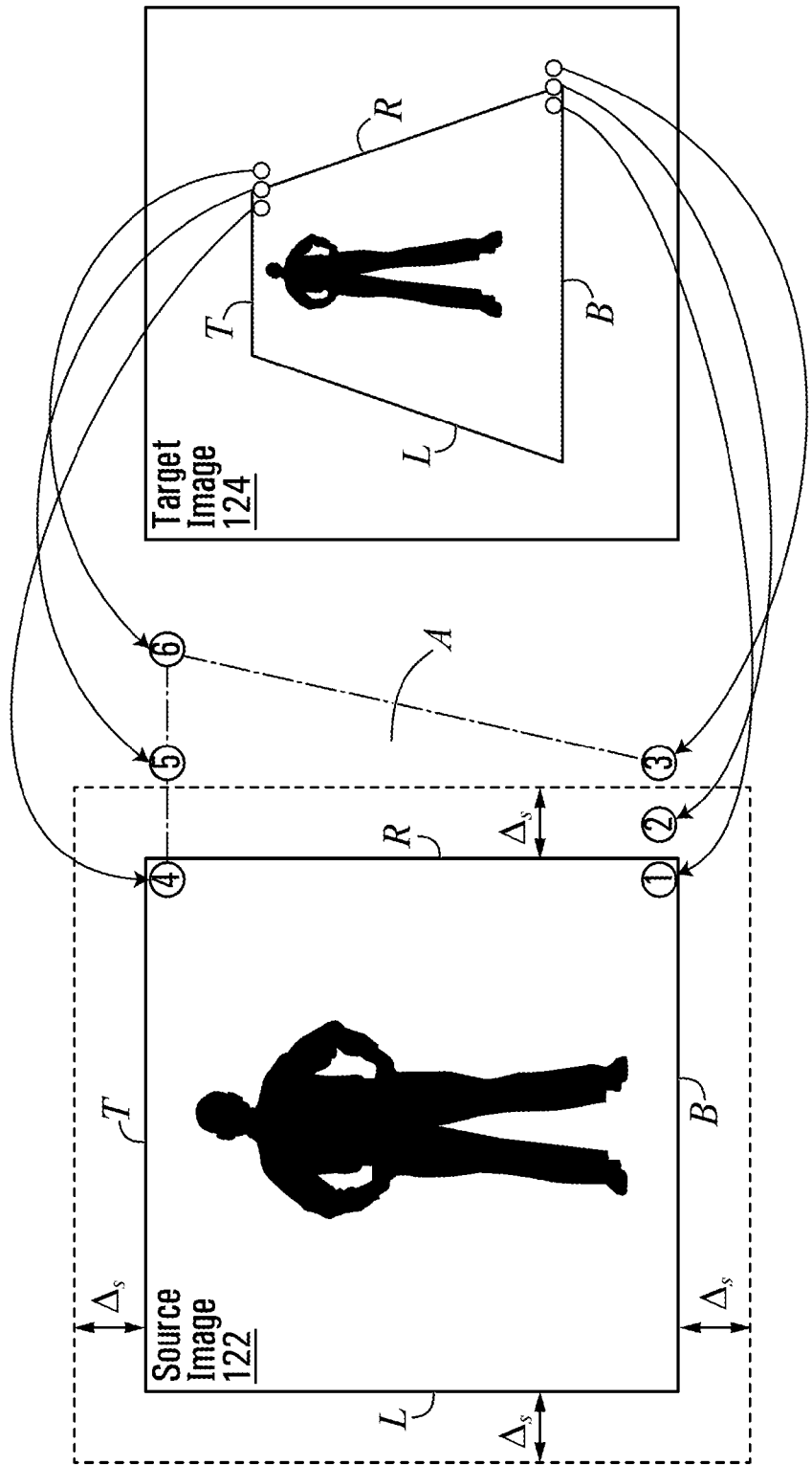
FIG. 10 illustrates an example mapping of target pixel coordinates to source pixel coordinates.

With the mapping shown in FIG. 10, it may be the case that all target pixels around the right boundary edge, inversely mapped onto (for example) 9 top source lines, may lose softness, with only the bottom right corner with some softness.

One reason for jagged edges may be as follows: when a source image is rotated around the x-axis and moved away from a viewer, perspective effect makes the top area of the target image squeezed more than the bottom area. With a uniform softness range defined around the source image 122, a mapping such as that shown in FIG. 10 can cause the target pixels 4, 5, and 6 at the top of the image to no longer take on preferred respective alpha channel values of 1 (inside the source boundaries), 0.5 (or another value between 0 and 1, which is in the softness range), and 0 (outside the boundaries).

Figure 11:
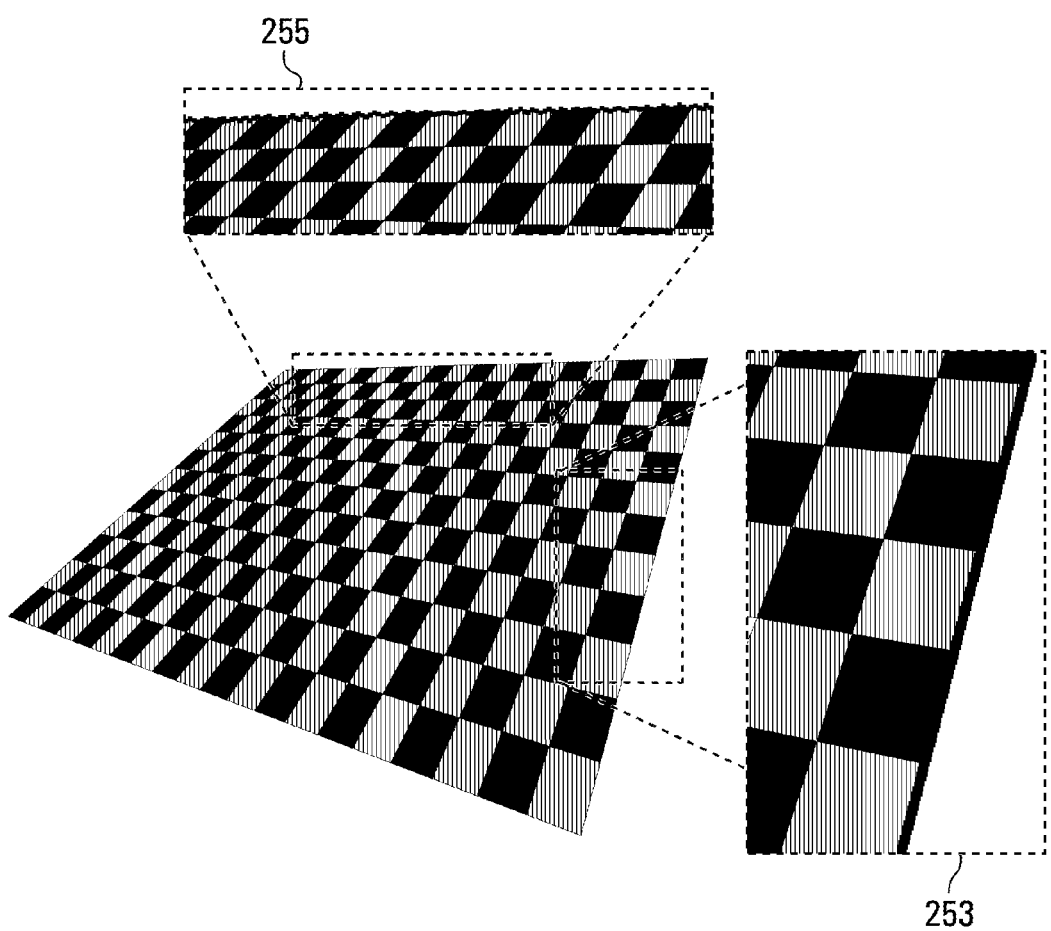
FIGS. 11 and 12 illustrate areas of non-uniform softness.
Figure 12:
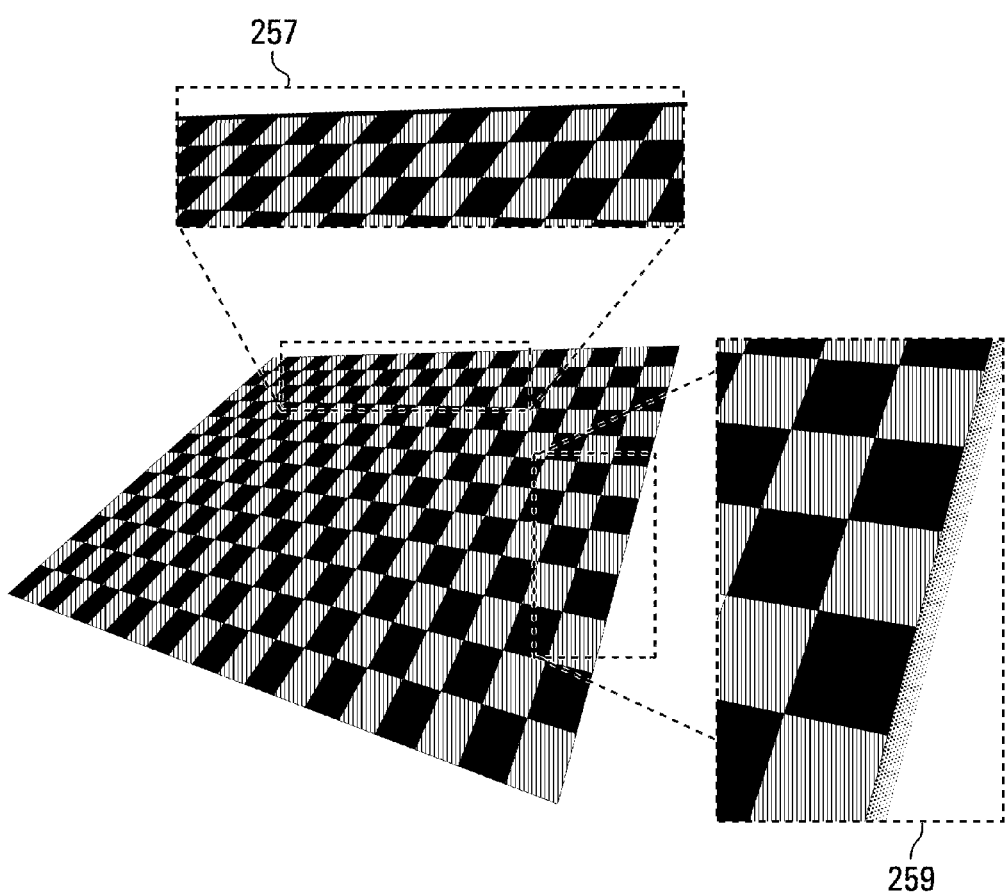

Jagged or step boundary edges, such as that described above with reference to FIG. 10, are often visible in some DVE devices. As an example, FIG. 11 illustrates a mapping such as that discussed above in relation to FIG. 10, in which a picture is subjected to x-y rotations with a constant source softness range $\Delta_s$ of 1.2 pixels wide. As can be seen from FIG. 11, the edges do not have uniform softness. Specifically, the transition is relatively smooth on the near edge, as shown at 253, and jagged at the far edge, as shown at 255. FIG. 12 illustrates a constant source softness range $\Delta_s$ of 12.5 pixels instead, with the same mapping discussed above with reference to FIG. 10. Still, the edges do not have uniform softness. Specifically, the transition is appropriately smooth at the far edge, as shown at 257, but now overly soft on the near edge, as shown at 259.

Figure 13:
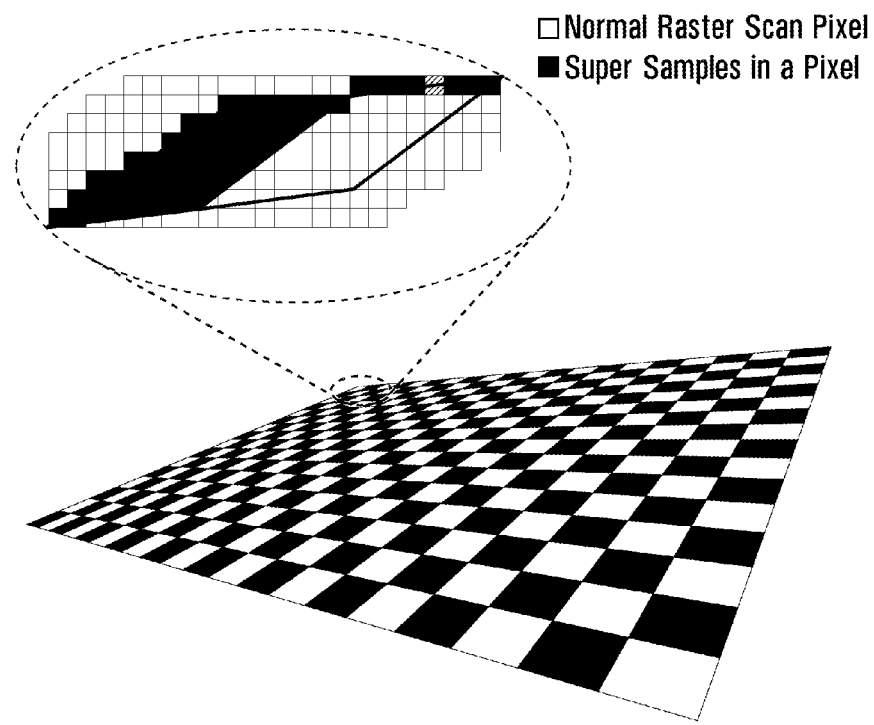
FIG. 13 illustrates an example anti-aliasing technique.

One method to address the jagged edges discussed above is to use anti-aliasing techniques. For example, an anti-alias method may be used employing super-samples or multi-samples, for example, 4×4 multiple samples in one normal square pixel area, as illustrated in FIG. 13. An average or weighted average is applied to all of the super samples and taken as a value for a pixel of interest. However, a disadvantage of this method is that it may result in high cost on hardware resources and/or computing time, primarily because of two reasons: (1) boundary detection on the target image is typically required to identify the pixel cross-edges, and (2) there is increased calculation time for a single pixel at an edge (specifically by N×N, where N is a the number of horizontal or vertical samples), which is generally undesirable for raster-scan based video data processing.

Figure 14:
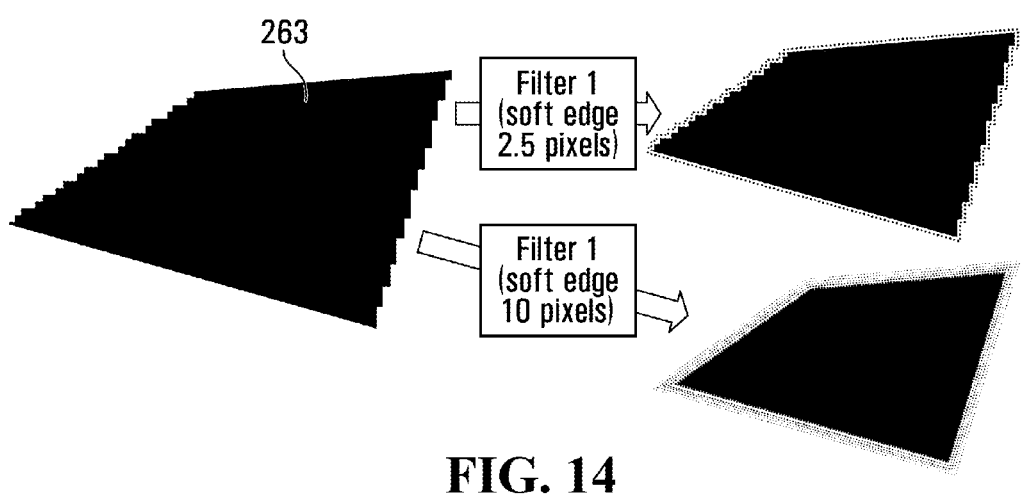
FIG. 14 illustrates the results of a post-filtering image processing technique.

Another method to address the jagged edges problem discussed above is to use post-filtering image processing techniques to filter the jagged alpha to smooth the boundary edges. This method also has disadvantages relating to cost (computational resources and/or time) and quality. For example, boundary edge detection of the object in the target image is still required, and good quality filtering typically requires 2-D filtering techniques, which has a higher cost in terms of computational resources. Also, the post-filter bandwidth may be required to be dynamically changed in order to smooth different jagged edges. This is shown in FIG. 14, in which a first filter (filter 1) filters an image 263 to generate a softness area 2.5 pixels wide, and a second filter (filter 2) filters the image 263 to generate a softness area 10 pixels wide. The softness area 2.5 pixels wide (caused by filter 1) does not seem to be enough, whereas the softness area 10 pixels wide (caused by filter 2) appears to be overly soft. If different edges in the image 263 were to be jagged in different degrees, then a general spatial-invariant filter may not achieve consistent quality for all jagged edges.

Figure 15:
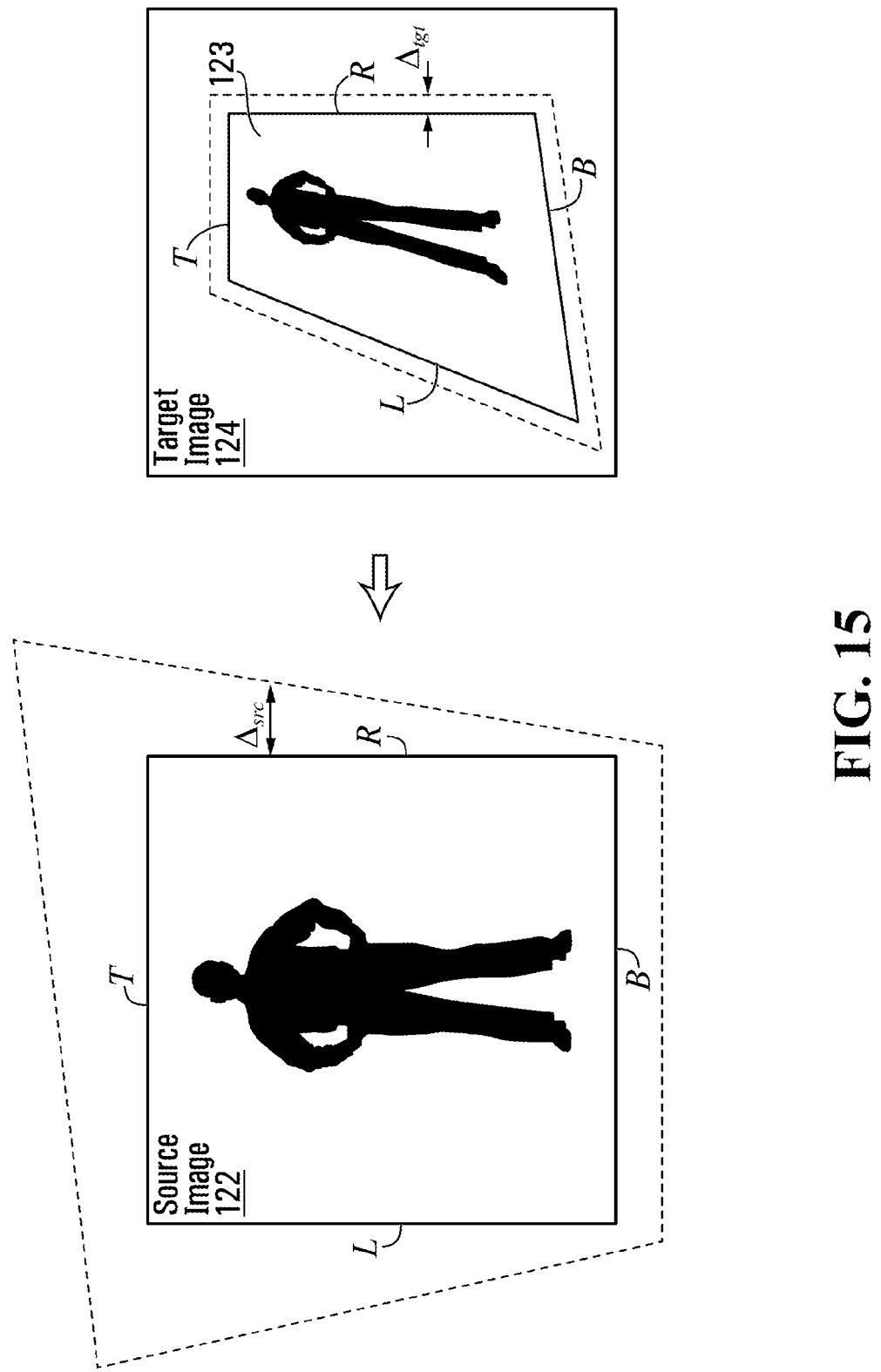
FIG. 15 illustrates a source image with a non-uniform softness area corresponding to a target image having a uniform softness area.

In contrast to the methods described with reference to FIGS. 10 to 14, embodiments described below instead construct a shaping alpha $\alpha_{shp}$ with uniform softness around the transformed source image (i.e. object 123 in FIG. 5), rather than around the source image 122. As described below, a constant range of softness around the object 123 is defined, and corresponding expressions for spatial-variant or dynamic source ranges for softness are derived and implemented to generate the alpha channel value. The area of softness bordering the source image 122 therefore varies, rather than being a fixed area. This is shown in FIG. 15. The parameter $\Delta_{tgt}$ may be controllable by the user and defines how much softness there will be at the edge of object 123, and more particularly, the width of the softness area bordering object 123. The larger the parameter $\Delta_{tgt}$, the more gradually the object 123 will fade into the background image. The parameter $\Delta_{src}$ defines the extent of the corresponding softness area bordering the source image 122 that is required to result in the desired target softness area. Note that the source softness range is spatial-variant or dynamic. That is, the value of $\Delta_{src}$ changes along each boundary due to the softness area bordering the object 123 being uniform. Also note that both $\Delta_{tgt}$>0 and $\Delta_{src}$>0.

One method of creating a shaping alpha $\alpha_{shp}$ to result in a uniform softness around the transformed source image (i.e. object 123) in the target image 124 is explained below.

In the embodiments described below, the parameters 210 and inverse mapping function $M^{-1}$ discussed above will be assumed, such that Equations 1 and 2 represent the relationship between the source pixel coordinates and the target pixel coordinates. That is, to obtain the corresponding source pixel coordinate $(x_s,y_s)$ for a given target pixel coordinate $(x_t,y_t)$, the following computation is performed by the perspective transform engine 208:

$$x_s = T_d + \frac{(T_a x_t + T_b y_t + T_c f)P_d}{P_a x_t + P_b y_t + P_c f}$$ (i.e. Equation 1), and $$y_s = T_h + \frac{(T_e x_t + T_f y_t + T_g f)P_d}{P_a x_t + P_b y_t + P_c f}$$ (i.e. Equation 2).

Figure 16:
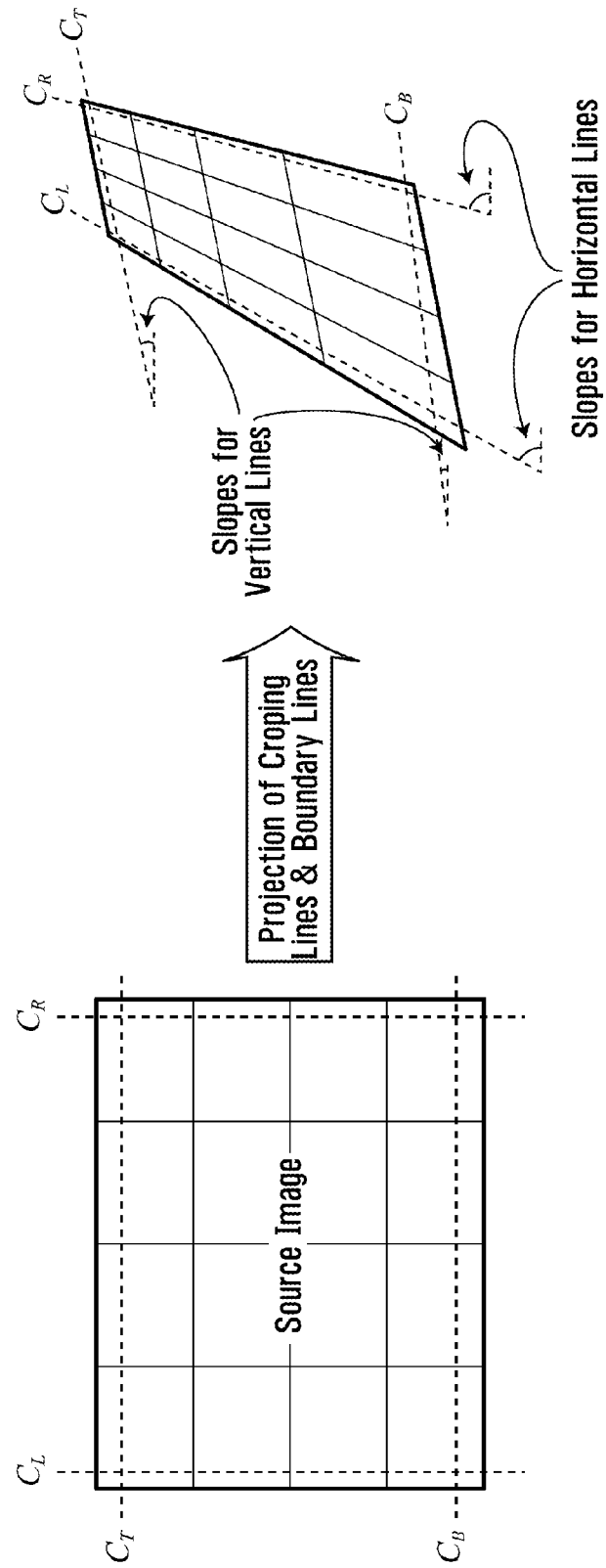
FIG. 16 illustrates mapping relationships between source boundary lines and target boundary lines, as well as mapping relationships between source cropping lines and target cropping lines.

Generally, a valid source image picture area is defined by the four boundary lines left (L), right (R), top (T), and bottom (B). However, in many applications, the source image may be further limited through a cropping effect, as shown in FIG. 16. Specifically, FIG. 16 illustrates mapping relationships between source boundary lines and target boundary lines, as well as mapping relationships between source cropping lines and target cropping lines. After perspective projection, those horizontal or vertical lines in source space may be tilted to certain degrees in target space, as is shown in the slopes of FIG. 16.

Figure 17:
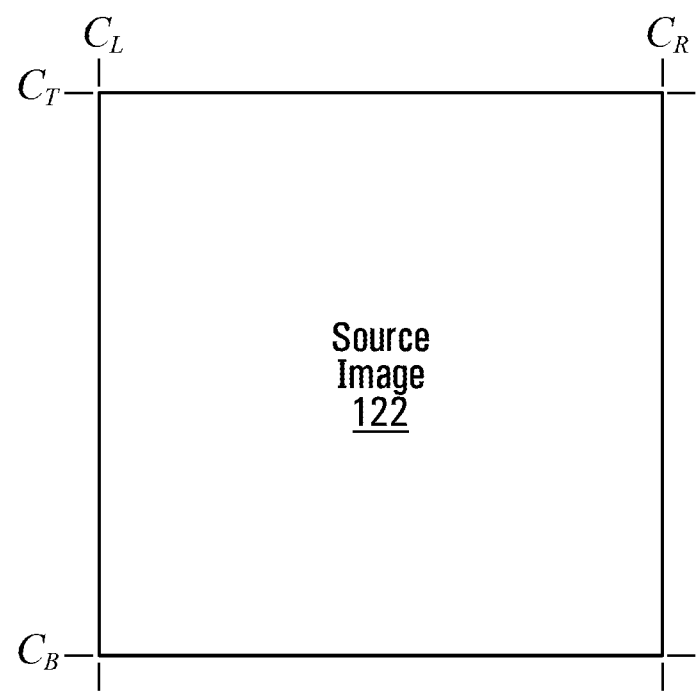
FIG. 17 illustrates a source image cropped by the left, right, top, and bottom cropping boundary lines.

Given that cropping can be applied to the source image, the source image will therefore be considered to be defined by four lines (left, right, top, and bottom), which will be designated as left cropping boundary line $C_L$, right cropping boundary line $C_R$, top cropping boundary line $C_T$, and bottom cropping boundary line $C_B$. This is shown in FIG. 17, which illustrates a source image 122 cropped by the left, right, top, and bottom cropping boundary lines. However, it will be appreciated that more generally these cropping boundary lines are boundary lines.

A cropping boundary line can be denoted as:

$$C_i = \begin{cases} C_L & i = L \\ C_R & i = R \\ C_T & i = T \\ C_B & i = B \end{cases}$$ (Equation 4)

Another way to denote these cropping lines is as follows: horizontal cropping:

$$C_H = \begin{cases} C_L \\ C_R \end{cases};$$

and
vertical cropping:

$$C_V = \begin{cases} C_T \\ C_B \end{cases}.$$

Consider horizontal cropping first. In this case, on the cropping line ($C_L$ or $C_R$), the source x-coordinate $x_s$ will be a constant $x_s=C_H$.

By substituting $x_s=C_H$ into Equation 1 and we have:

$$C_H = T_d + \frac{(T_a x_t + T_b y_t + T_c f)P_d}{P_a x_t + P_b y_t + P_c f}.$$ (Equation 5)

Equation 5 can be rearranged to have the form:

$$(P_a W - T_a)x_t + (P_b W - T_b)y_t + (P_c W - T_c)f = 0.$$ (Equation 6)

In Equation 6, $W = \frac{C_H - T_d}{P_d}$.

Therefore, the horizontal crop line $x_s=C_H$ in the source image 122 has the corresponding horizontal crop line in the target image 124 defined by Equation 6. Note that Equation 6 is a linear function (geometric line) in target space, which includes two extreme cases:

$$y_t = -\frac{(P_c W - T_c)f}{(P_b W - T_b)} \text{ when } (P_a W - T_a) = 0$$

(which means that the target line is completely horizontal), and $$x_t = -\frac{(P_c W - T_c)f}{(P_a W - T_a)}$$

when $(P_b W - T_b) = 0$ (which means that the target line is completely vertical).

Equation 6 can be expressed in slope intercept form in two different ways:

$$y_t = \phi_{x_t} x_t + \tau_{y_t}$$ (Equation 7)

or $$x_t = \phi_{y_t} y_t + \tau_{x_t}$$ (Equation 8)

Note that:

$$\varphi_{x_t}\varphi_{y_t} = 1, \varphi_{x_t} = \frac{-(P_aW - T_a)}{(P_bW - T_b)} = \frac{dy_t}{dx_t},$$

$$\varphi_{y_t} = \frac{-(P_bW - T_b)}{(P_aW - T_a)} = \frac{dx_t}{dy_t}, \tau_{y_t} = \frac{-(P_cW - T_c)f}{(P_bW - T_b)}, \text{ and}$$

$$\tau_{x_t} = \frac{-(P_cW - T_c)f}{(P_aW - T_a)}.$$

Equations 7 and 8 are equivalent. Which one of Equations 7 and 8 to use in the computations is decided on an image-by-image basis. Specifically, for each target image, and therefore for each set of parameters $T_a$ to $T_h$, $P_a$ to $P_d$, and f, the Equation 7 or 8 used depends upon which one has the smallest slope ($\phi_{x_t}$ or $\phi_{y_t}$). That is, the equation having the smallest slope is used. The consideration of both of equations 7 and 8, with a selection of which one to use during operation on an image-by-image basis, is to accommodate cases in which the target image boundary line defined by Equation 6 is completely vertical or horizontal (since when the target image boundary line is completely horizontal one of equations 7 and 8 will have an infinite slope and cannot be used and vice versa). Also, the analysis below is based on the assumption that there is a small parallel shift in the target image boundary line to define the softness area, and so the equation that has the smallest slope will mean that the intercept ($\tau_{x_t}$ or $\tau_{y_t}$) dominates, such that a relatively small change in the intercept ($\tau_{x_t}$ or $\tau_{y_t}$) results in a relatively larger parallel shift in the target image boundary line. Also, it will therefore be appreciated that it is the absolute value of the slope of the target image boundary line (i.e. $|\phi_{x_t}|$ or $|\phi_{y_t}|$) that is of interest to determine which equation to use.

Therefore, for each target image, and therefore set of parameters $T_a$ to $T_h$, $P_a$ to $P_d$, and f, Equation 6 is expressed as Equation 7 when $$|\varphi_{x_t}| = \left|\frac{-(P_aW - T_a)}{(P_bW - T_b)}\right| = \left|\frac{P_aW - T}{P_bW - T}\right| \le 1$$

(which means $|\phi_{y_t}| \ge 1$), and Equation 6 is instead expressed as Equation 8 when $|\phi_{x_t}| > 1$ (which means $|\phi_{y_t}| < 1$).

Therefore Equation 6 in slope intercept form is:

$$\begin{cases} y_t = \varphi_{x_t}x_t + \tau_{y_t}, & \text{if } |P_aW - T_a| \le |P_bW - T_b| \\ x_t = \varphi_{y_t}y_t + \tau_{x_t}, & \text{else} \end{cases}.$$

Consider now the vertical cropping. In this case, on the cropping line ($C_T$ or $C_B$), the source y-coordinate $y_s$ will be a constant $y_s = C_V$.

By substituting $y_s = C_V$ into Equation 2 and we have:

$$C_V = T_h + \frac{(T_e x_t + T_f y_t + T_g f)P_d}{P_a x_t + P_b y_t + P_c f}. \tag{Equation 9}$$

Equation 9 can be rearranged to have the form:

$$(P_aW - T_e)x_t + (P_bW - T_f)y_t + (P_cH - T_g)f = 0. \tag{Equation 10}$$

In Equation 10, $H = \frac{C_V - T_h}{P_d}$.

Therefore, the vertical crop line $y_s = C_V$ in the source image 122 has the corresponding crop line in the target image 124 defined by Equation 10. Note that Equation 10 is a linear function (geometric line) in target space, which includes two extreme cases:

$$y_t = -\frac{(P_cH - T_g)f}{(P_bH - T_f)}$$

when $(P_aH - T_e) = 0$ (which means that the target line is completely horizontal), and $$x_t = -\frac{(P_cH - T_g)f}{(P_aH - T_e)}$$

when $(P_bH - T_f) = 0$ (which means that the target line is completely vertical).

Equation 10 can also be expressed in slope intercept form in two different ways:

$$y_t = \phi_{x_t}x_t + \tau_{y_t} \tag{Equation 11}$$

or $$x_t = \phi_{y_t}y_t + \tau_{x_t} \tag{Equation 12}.$$

Note that:

$$\varphi_{x_t}\varphi_{y_t} = 1, \varphi_{x_t} = \frac{-(P_aH - T_e)}{(P_bH - T_f)} = \frac{dy_t}{dx_t},$$

$$\varphi_{y_t} = \frac{-(P_bH - T_f)}{(P_aH - T_e)} = \frac{dx_t}{dy_t},$$

$$\tau_{y_t} = \frac{-(P_cH - T_g)f}{(P_bH - T_f)}, \text{ and } \tau_{x_t} = \frac{-(P_cH - T_g)f}{(P_aH - T_e)}.$$

Equations 11 and 12 are equivalent. As was the case for horizontal cropping, for vertical cropping which one of Equations 11 and 12 to use in the computations is decided on an image-by-image basis. Specifically, for each target image, and therefore for each set of parameters $T_a$ to $T_h$, $P_a$ to $P_d$, and f, the Equation 11 or 12 used depends upon which one has the smallest slope ($\phi_{x_t}$ or $\phi_{y_t}$). That is, the equation having the smallest slope is used.

Therefore, for each target image, and therefore set of parameters $T_a$ to $T_h$, $P_a$ to $P_d$, and f, Equation 10 is expressed as Equation 11 when $$|\varphi_{x_t}| = \left|\frac{-(P_aH - T_e)}{(P_bH - T_f)}\right| = \left|\frac{P_aH - T_e}{P_bH - T_f}\right| \le 1$$

(which means $|\phi_{y_t}| \ge 1$), and Equation 10 is instead expressed as Equation 12 when $|\phi_{x_t}| > 1$ (which means $|\phi_{y_t}| < 1$).

Therefore Equation 10 in slope intercept form is:

$$\begin{cases} y_t = \varphi_{x_t}x_t + \tau_{y_t}, & \text{if } |P_aH - T_e| \le |P_bH - T_f| \\ x_t = \varphi_{y_t}y_t + \tau_{x_t}, & \text{else} \end{cases}.$$

Therefore, in summary, a target image boundary line mapped from a source cropping image line is expressed as either:

$$y_t = \varphi_{x_t} x_t + \tau_{y_t} = \qquad \text{(Equation 13)}$$

$$\begin{cases} -\dfrac{(P_a W - T_a)}{(P_b W - T_b)} x_t - \dfrac{(P_c W - T_c)}{(P_b W - T_b)} f, & \text{horizontal source boundary} \\ -\dfrac{(P_a H - T_e)}{(P_b H - T_f)} x_t - \dfrac{(P_c H - T_g)}{(P_b H - T_f)} f, & \text{vertical source boundary} \end{cases}$$

when $|\varphi_{x_t}| \leq 1$, or $$x_t = \varphi_{y_t} y_t + \tau_{x_t} = \qquad \text{(Equation 14)}$$

$$\begin{cases} -\dfrac{(P_b W - T_b)}{(P_a W - T_a)} y_t - \dfrac{(P_c W - T_c)}{(P_a W - T_a)} f, & \text{horizontal source boundary} \\ -\dfrac{(P_b H - T_f)}{(P_a H - T_e)} y_t - \dfrac{(P_c H - T_g)}{(P_a H - T_e)} f, & \text{vertical source boundary} \end{cases}$$

when $|\varphi_{x_t}| > 1$ ($|\varphi_{y_t}| < 1$).

Figure 18:
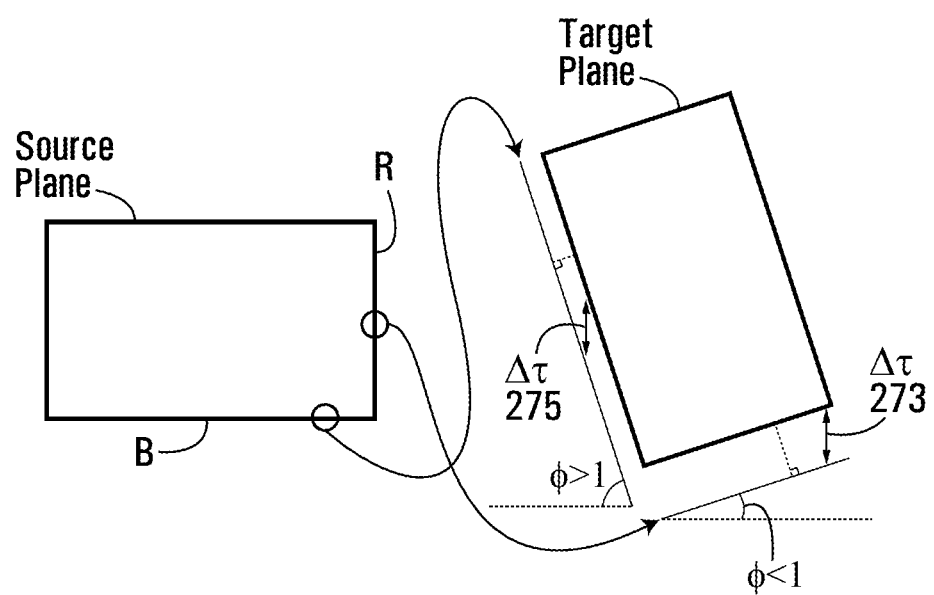
FIG. 18 illustrates the same intercept change being applied to a right edge boundary and a bottom edge boundary, but with each intercept change resulting in a different spatial margin.

As mentioned above, a smaller slope lets the intercept dominate the softness on the target plane. This is illustrated in FIG. 18, in which the right source boundary edge R is mapped onto the target plane with a smaller slope, and the bottom boundary edge B with a larger slope. The same intercept change is applied to the right edge and bottom edge, but they give a different spatial margin. Specifically, the right source boundary, which has the smaller slope in the target plane, means a larger shift (as shown at 273) compared to the shift in the bottom source boundary (as shown at 275). This is why the smaller slope is used.

Also, since (as described above) $\phi_{x_t}\phi_{y_t}=1$, the smaller slope must be less than one and the other bigger than one. The exception is where $\phi_{x_t}=\phi_{y_t}=1$, where which one is chosen will give the same result.

Analysis leading to the construction of the shaping alpha value will now be described.

A constant spatial softness area of width $\Delta_{tgt}$ around the target object provides for uniform softness. Therefore, each boundary of the target object is parallel-shifted by an amount $\Delta_{tgt}$. When this shift $\Delta_{tgt}$ is inversely mapped onto the source image space, it appears as non-uniform spatial area of width $\Delta_{src}$, as previously shown in FIG. 15. The non-uniform spatial area of width $\Delta_{src}$ bordering the source image is used to define the shaping alpha channel. The computation of this non-uniform spatial area of width $\Delta_{src}$ is as follows.

Consider first the case where it is a horizontal cropping (therefore $x_s = C_H$), and assume that $|\phi_{x_t}| \geq 1$ ($\phi_{x_t} \leq \phi_{y_t}$) and therefore the corresponding target cropping line is $$y_t = \varphi_{x_t} x_t + \tau_{y_t} = -\dfrac{(P_a W - T_a)}{(P_b W - T_b)} x_t - \dfrac{(P_c W - T_c)}{(P_b W - T_b)} f.$$

We are interested in the case where there is a small change in $\tau_{y_t}$, since that represents the parallel shift in the target image horizontal boundary. More specifically, we are interested in the change in the corresponding source horizontal cropping boundary $x_s$ with respect to the change in the target image horizontal boundary $$\tau_{y_t} \left( \text{i.e. } \dfrac{dx_s}{d\tau_{y_t}} \right).$$

Therefore, the differential $$\dfrac{dx_s}{d\tau_{y_t}}$$

is to be computed.

Let $$\bar{x}_s = \dfrac{x_s - T_d}{P_d}.$$

Therefore, $$\bar{x}_s = \dfrac{T_a x_t + T_b y_t + T_c f}{P_a x_t + P_b y_t + P_c f}. \qquad \text{(Equation 15)}$$

The differential $$\dfrac{dx_s}{d\tau_{y_t}}$$

can be expressed as $$\dfrac{dx_s}{d\tau_{y_t}} = \dfrac{dx_s}{d\bar{x}_s} \dfrac{d\bar{x}_s}{d\tau_{y_t}} = P_d \dfrac{d\bar{x}_s}{d\tau_{y_t}}$$

(since rearranging the equation $$\bar{x}_s = \dfrac{x_s - T_d}{P_d}$$

in terms of $x_s$ and then computing $$\dfrac{dx_s}{d\bar{x}_s}$$

results in $$\dfrac{dx_s}{d\bar{x}_s} = P_d).$$

Therefore, substitute $y_t = \phi_{x_t} x_t + \tau_{y_t}$ into Equation 15

$$\left( \bar{x}_s = \dfrac{T_a x_t + T_b(\varphi_{x_t} x_t + \tau_{y_t}) + T_c f}{P_a x_t + P_b(\varphi_{x_t} x_t + \tau_{y_t}) + P_c f} \right),$$

and taking the differential $$\dfrac{d\bar{x}_s}{d\tau_{y_t}}$$

(using the quotient rule for derivatives):

$$\frac{d\bar{x}_s}{d\tau_{y_t}} = \frac{T_b - P_b \bar{x}_s}{P_a x_t + P_b(\varphi_{x_t} x_t + \tau_y) + P_c f} = \frac{T_b - P_b \bar{x}_s}{P_a x_t + P_b y_t + P_c f}. \quad \text{(Equation 16)}$$

The range in softness at the horizontal source boundary edge W is the absolute value of Equation 16 when $\bar{x}_s = W$:

$$\left| \frac{d\bar{x}_s}{d\tau_{y_t}} \right|_{\bar{x}_s=W} = \left| \frac{T_b - P_b W}{P_a x_t + P_b y_t + P_c f} \right| = \frac{|T_b - P_b W|}{|P_a x_t + P_b y_t + P_c f|}. \quad \text{(Equation 17)}$$

This defines the change (parallel shift) in the horizontal source cropping line. Recall that $$W = \frac{C_H - T_d}{P_d},$$

where $C_H = C_L$ for left source cropping and $C_H = C_R$ for right source cropping.

Consider now the case where it is a horizontal cropping still (therefore $x_s = C_H$), but assume that $|\phi_{x_t}| > 1$ ($\phi_{x_t} > \phi_{y_t}$) and therefore the corresponding target cropping line is $$x_t = \varphi_{y_t} y_t + \tau_{x_t} = -\frac{(P_b W - T_b)}{(P_a W - T_a)} y_t - \frac{(P_c W - T_c)}{(P_a W - T_a)} f.$$

We are interested in the case where there is a small change in $\tau_{x_t}$, since that represents the parallel shift in the target image horizontal boundary. More specifically, we are interested in the change in the corresponding horizontal source cropping boundary $x_s$ with respect to the change in the target image horizontal boundary $$\tau_{x_t} \left( \text{i.e. } \frac{dx_s}{d\tau_{x_t}} \right).$$

Therefore, the differential $$\frac{dx_s}{d\tau_{x_t}}$$

is to be computed.
The differential $$\frac{dx_s}{d\tau_{x_t}}$$

can be expressed as $$\frac{dx_s}{d\tau_{x_t}} = \frac{dx_s}{d\bar{x}_s} \frac{d\bar{x}_s}{d\tau_{x_t}} = P_d \frac{d\bar{x}_s}{d\tau_{x_t}}.$$

Therefore, substitute $x_t = \phi_{y_t} y_t + \tau_{x_t}$ into Equation 15

$$\left( \bar{x}_s = \frac{T_a(\varphi_{y_t} y_t + \tau_{x_t}) + T_b y_t + T_c f}{P_a(\varphi_{y_t} y_t + \tau_{x_t}) + P_b y_t + P_c f} \right),$$

and taking the differential $$\frac{d\bar{x}_s}{d\tau_{x_t}}$$

(using the quotient rule for derivatives):

$$\frac{d\bar{x}_s}{d\tau_{x_t}} = \frac{T_a - P_a \bar{x}_s}{P_a(\varphi_{y_t} y_t + \tau_{x_t}) + P_b y_t + P_c f} = \frac{T_a - P_a \bar{x}_s}{P_a x_t + P_b y_t + P_c f}. \quad \text{(Equation 18)}$$

The range for softness at the horizontal source boundary edge W is the absolute value of Equation 18 when $\bar{x}_s = W$:

$$\left| \frac{d\bar{x}_s}{d\tau_{y_t}} \right|_{\bar{x}_s=W} = \left| \frac{T_a - P_a W}{P_a x_t + P_b y_t + P_c f} \right| = \frac{|T_a - P_a W|}{|P_a x_t + P_b y_t + P_c f|}. \quad \text{(Equation 19)}$$

This defines the change (parallel shift) in the horizontal source cropping line.

Consider now the case where it is a vertical cropping (therefore $y_s = C_V$), and assume that $|\phi_{x_t}| \leq 1$ ($\phi_{x_t} \leq \phi_{y_t}$) and therefore the corresponding target cropping line is $$y_t = \varphi_{x_t} x_t + \tau_{y_t} = -\frac{(P_a H - T_e)}{(P_b H - T_f)} x_t - \frac{(P_c H - T_g)}{(P_b H - T_f)} f.$$

We are interested in the case where there is a small change in $\tau_{y_t}$, since that represents the parallel shift in the target image vertical boundary. More specifically, we are interested in the change in the corresponding source vertical cropping boundary $y_s$ with respect to the change in the target image vertical boundary $$\tau_{y_t} \left( \text{i.e. } \frac{dy_s}{d\tau_{y_t}} \right).$$

Therefore, the differential $$\frac{dy_s}{d\tau_{y_t}}$$

is to be computed.

Let $\bar{y}_s = \frac{y_s - T_h}{P_d}$.

Therefore, $$\bar{y}_s = \frac{T_e x_t + T_f y_t + T_g f}{P_a x_t + P_b y_t + P_c f}. \quad \text{(Equation 20)}$$

The differential $$\frac{dy_s}{d\tau_{y_t}}$$

can be expressed as $$\frac{dy_s}{d\tau_{y_t}} = \frac{dy_s}{d\bar{y}_s}\frac{d\bar{y}_s}{d\tau_{y_t}} = P_d \frac{d\bar{y}_s}{d\tau_{y_t}} \left(\text{since } \frac{dy_s}{d\bar{y}_s} = P_d\right).$$

Therefore, substitute $y_t = \phi_{x_t} x_t + \tau_{y_t}$ into Equation 20

$$\left(\bar{y}_s = \frac{T_e x_t + T_f(\varphi_{x_t} x_t + \tau_{y_t}) + T_g f}{P_a x_t + P_b(\varphi_{x_t} x_t + \tau_{y_t}) + P_c f}\right),$$

and taking the differential $$\frac{d\bar{y}_s}{d\tau_{y_t}}$$

(using the quotient rule for derivatives):

$$\frac{d\bar{y}_s}{d\tau_{y_t}} = \frac{T_f - P_b \bar{y}_s}{P_a x_t + P_b(\varphi_{x_t} x_t + \tau_y) + P_c f} = \frac{T_f - P_b \bar{y}_s}{P_a x_t + P_b y_t + P_c f}. \quad \text{(Equation 21)}$$

The range for softness at the vertical source boundary edge H is the absolute value of Equation 21 when $\bar{y}_s$=H:

$$\left|\frac{d\bar{y}_s}{d\tau_{y_t}}\right|_{\bar{y}_s=H} = \left|\frac{T_f - P_b H}{P_a x_t + P_b y_t + P_c f}\right| = \frac{|T_f - P_b H|}{|P_a x_t + P_b y_t + P_c f|}. \quad \text{(Equation 22)}$$

This defines the change (parallel shift) in the vertical source cropping line.

Consider now the case where it is a vertical cropping still (therefore $y_s = C_V$), but assume that $|\phi_{x_t}|>1$ ($\phi_{x_t} \leq \phi_{y_t}$) and therefore the corresponding target cropping line is $$x_t = \varphi_{y_t} y_t + \tau_{x_t} = -\frac{(P_b H - T_f)}{(P_a H - T_e)} y_t - \frac{(P_c H - T_g)}{(P_a H - T_e)} f.$$

We are interested in the case where there is a small change in $\tau_{x_t}$, since that represents the parallel shift in the target image vertical boundary. More specifically, we are interested in the change in the corresponding source vertical cropping boundary $y_s$ with respect to the change in the target image vertical boundary $\tau_{x_t}\left(\text{i.e. } \frac{dy_s}{d\tau_{x_t}}\right).$ Therefore, the differential $$\frac{dy_s}{d\tau_{x_t}}$$

is to be computed.
The differential $$\frac{dy_s}{d\tau_{x_t}}$$

can be expressed as $$\frac{dy_s}{d\tau_{x_t}} = \frac{dy_s}{d\bar{y}_s}\frac{d\bar{y}_s}{d\tau_{x_t}} = P_d \frac{d\bar{y}_s}{d\tau_{x_t}}.$$

Therefore, substitute $x_t = \phi_{y_t} y_t + \tau_{x_t}$ into Equation 20

$$\left(\bar{y}_s = \frac{T_e(\varphi_{y_t} y_t + \tau_{x_t}) + T_f y_t + T_g f}{P_a(\varphi_{y_t} y_t + \tau_{x_t}) + P_b y_t + P_c f}\right),$$

and taking the differential $$\frac{d\bar{y}_s}{d\tau_{x_t}}$$

(using the quotient rule for derivatives):

$$\frac{d\bar{y}_s}{d\tau_{x_t}} = \frac{T_e - P_a \bar{y}_s}{P_a(\varphi_{y_t} y_t + \tau_{x_t}) + P_b y_t + P_c f} = \frac{T_e - P_a \bar{y}_s}{P_a x_t + P_b y_t + P_c f}. \quad \text{(Equation 23)}$$

The range for softness at the vertical source boundary edge H is the absolute value of Equation 23 when $\bar{y}_s$=H:

$$\left|\frac{d\bar{y}_s}{d\tau_{x_t}}\right|_{\bar{y}_s=H} = \left|\frac{T_e - P_a H}{P_a x_t + P_b y_t + P_c f}\right| = \frac{|T_e - P_a H|}{|P_a x_t + P_b y_t + P_c f|}. \quad \text{(Equation 24)}$$

This defines the change (parallel shift) in the vertical source cropping line.

Constructing the shaping alpha $\alpha_{shp}$ will now be described.

A constant spatial softness area bordering the target object provides for uniform softness. Therefore, each boundary of the target object is parallel-shifted by an amount $\Delta_{tgt}$. This is a user-controllable parameter, and the corresponding change in the source image is $\Delta_{src}$. The value $\Delta_{src}$ is determined by multiplying the amount $\Delta_{tgt}$ in the target space by the absolute value of the value that represents the change in the corresponding source cropping boundary with respect to the change in the target image boundary. That is, for the horizontal boundary:

$$\Delta^x_{src} = \begin{cases} \Delta_{tgt} \left| \dfrac{dx_s}{d\tau_{y_t}} \right|_{x_s=C_H}, & \text{if } |\phi_{x_t}| \le 1 \\ \Delta_{tgt} \left| \dfrac{dx_s}{d\tau_{x_t}} \right|_{x_s=C_H}, & \text{else} \end{cases}$$

(Equation 25)

$$= \begin{cases} \Delta_{tgt} \left| P_d \dfrac{d\bar{x}_s}{d\tau_{y_t}} \right|_{\bar{x}_s=W}, & \text{if } |\phi_{x_t}| \le 1 \\ \Delta_{tgt} \left| P_d \dfrac{d\bar{x}_s}{d\tau_{x_t}} \right|_{\bar{x}_s=W}, & \text{else} \end{cases}$$

$$= \begin{cases} \dfrac{|P_d(T_b - P_b W)|\Delta_{tgt}}{|P_a x_t + P_b y_t + P_c f|}, & \text{if } |P_a W - T_a| \le |P_b W - T_b| \\ \dfrac{|P_d(T_a - P_a W)|\Delta_{tgt}}{|P_a x_t + P_b y_t + P_c f|}, & \text{else} \end{cases}$$

$$= \begin{cases} \dfrac{|P_d T_b - P_b(C_H - T_d)|\Delta_{tgt}}{|P_a x_t + P_b y_t + P_c f|}, & \text{if } |P_a(C_H - T_d) - P_d T_a| \le \\ & |P_b(C_H - T_d) - P_d T_b| \\ \dfrac{|P_d T_a - P_a(C_H - T_d)|\Delta_{tgt}}{|P_a x_t + P_b y_t + P_c f|}, & \text{else} \end{cases}$$

For the vertical boundary:

$$\Delta^y_{src} = \begin{cases} \Delta_{tgt} \left| \dfrac{dy_s}{d\tau_{y_t}} \right|_{y_s=C_V}, & \text{if } |\phi_{x_t}| \le 1 \\ \Delta_{tgt} \left| \dfrac{dy_s}{d\tau_{x_t}} \right|_{y_s=C_V}, & \text{else} \end{cases}$$

(Equation 26)

$$= \begin{cases} \Delta_{tgt} \left| P_d \dfrac{d\bar{y}_s}{d\tau_{y_t}} \right|_{\bar{y}_s=H}, & \text{if } |\phi_{x_t}| \le 1 \\ \Delta_{tgt} \left| P_d \dfrac{d\bar{y}_s}{d\tau_{x_t}} \right|_{\bar{y}_s=H}, & \text{else} \end{cases}$$

$$= \begin{cases} \dfrac{|P_d(T_f - P_b H)|\Delta_{tgt}}{|P_a x_t + P_b y_t + P_c f|}, & \text{if } |P_a H - T_e| \le |P_b H - T_f| \\ \dfrac{|P_d(T_e - P_a H)|\Delta_{tgt}}{|P_a x_t + P_b y_t + P_c f|}, & \text{else} \end{cases}$$

$$= \begin{cases} \dfrac{|P_d T_f - P_b(C_V - T_h)|\Delta_{tgt}}{|P_a x_t + P_b y_t + P_c f|}, & \text{if } |P_a(C_V - T_h) - P_d T_e| \le \\ & |P_b(C_V - T_h) - P_d T_f| \\ \dfrac{|P_d T_e - P_a(C_V - T_h)|\Delta_{tgt}}{|P_a x_t + P_b y_t + P_c f|}, & \text{else} \end{cases}$$

$\Delta^x_{src}$, and $\Delta^y_{src}$, are spatial-variant ranges or dynamic ranges in the source image space, horizontally and vertically respectively.

In the equations above, absolute values of differentiations are used because mathematically, increments $d\tau_{x_t}$ and $d\tau_{y_t}$ could cause $dx_s$ and $dy_s$ to extend in an uncertain direction (positive or negative). It is the absolute ranges that are of interest, not the direction.

To construct the shaping alpha value $\alpha_{shp}(x_t,y_t)$ for each target pixel $(x_t,y_t)$ mapped to a corresponding source pixel $(x_s,y_s)$, a pre-alpha value $\alpha'_i(x_s,y_s)$ is first computed as $$\alpha'_i(x_s,y_s) = \dfrac{\Delta D_i}{\Delta^i_{src}} = \begin{cases} \dfrac{\Delta x}{\Delta^x_{src}} = \begin{cases} \dfrac{x_s - C_L}{\Delta^L_{src}} & i = L \text{ (left edge)} \\ \dfrac{C_R - x_s}{\Delta^R_{src}} & i = R \text{ (right edge)} \end{cases} \\ \dfrac{\Delta y}{\Delta^y_{src}} = \begin{cases} \dfrac{y_s - C_T}{\Delta^T_{src}} & i = T \text{ (top edge)} \\ \dfrac{C_B - y_s}{\Delta^B_{src}} & i = B \text{ (bottom edge)} \end{cases} \end{cases}$$

(Equation 27)

where $\Delta D_i$ is a distance difference between a source coordinate and a cropping line (boundary line in the source image), and $\Delta x$ and $\Delta y$ are horizontal and vertical distance differences respectively.

The shaping alpha value on each source boundary is then constructed by the following clipping function:

$$a_i(x_s, y_s) = \begin{cases} 0, & \alpha'_i(x_s, y_s) < 0 \\ 1, & \alpha'_i(x_s, y_s) > 1 \\ \alpha'_i(x_s, y_s), & \text{else} \end{cases}$$

(Equation 28)

where i=L, R, T, B.

Figure 19:
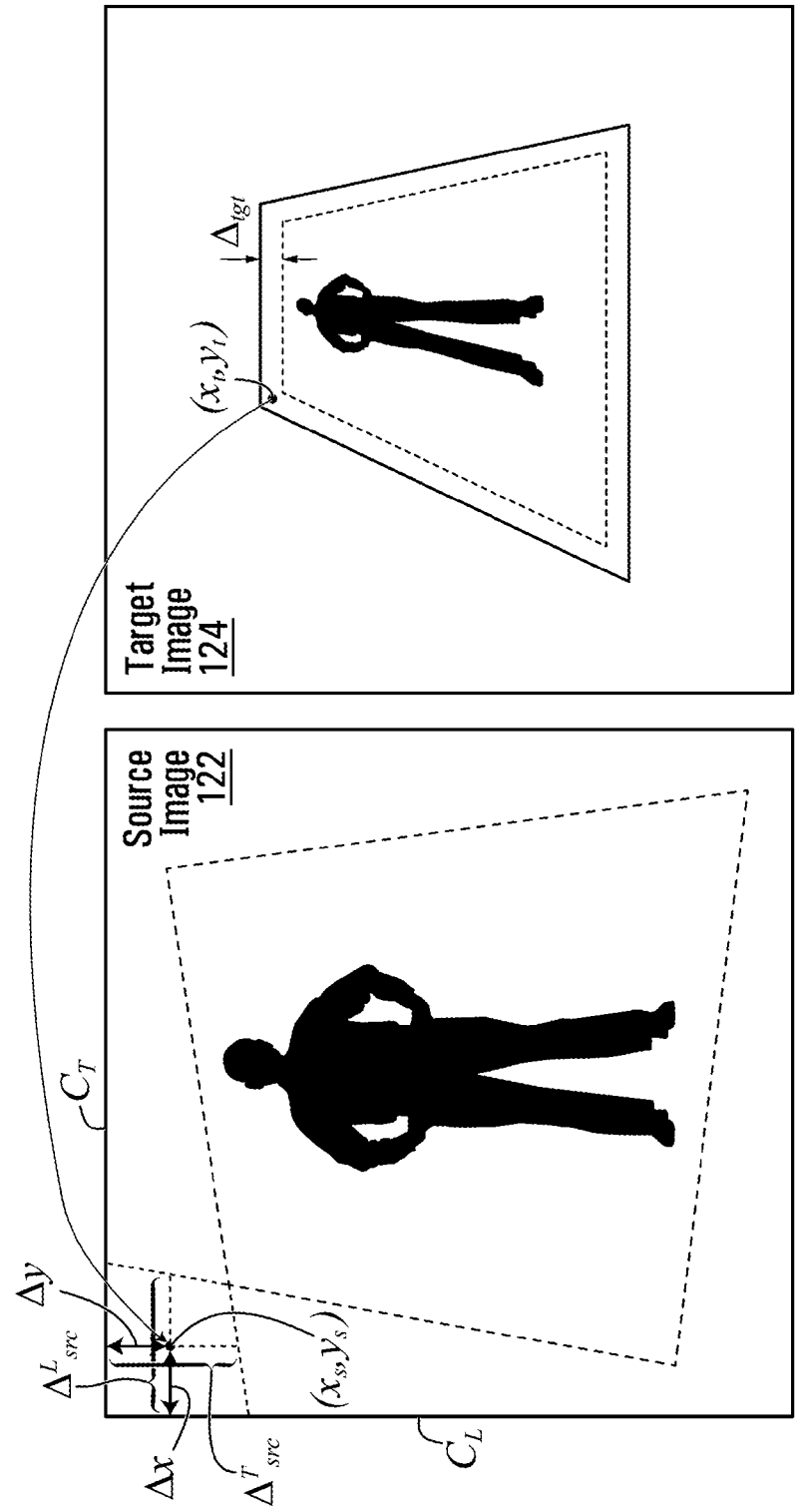
FIGS. 19 to 21 illustrate mappings of target pixel coordinates to corresponding source pixel coordinates.
Figure 20:
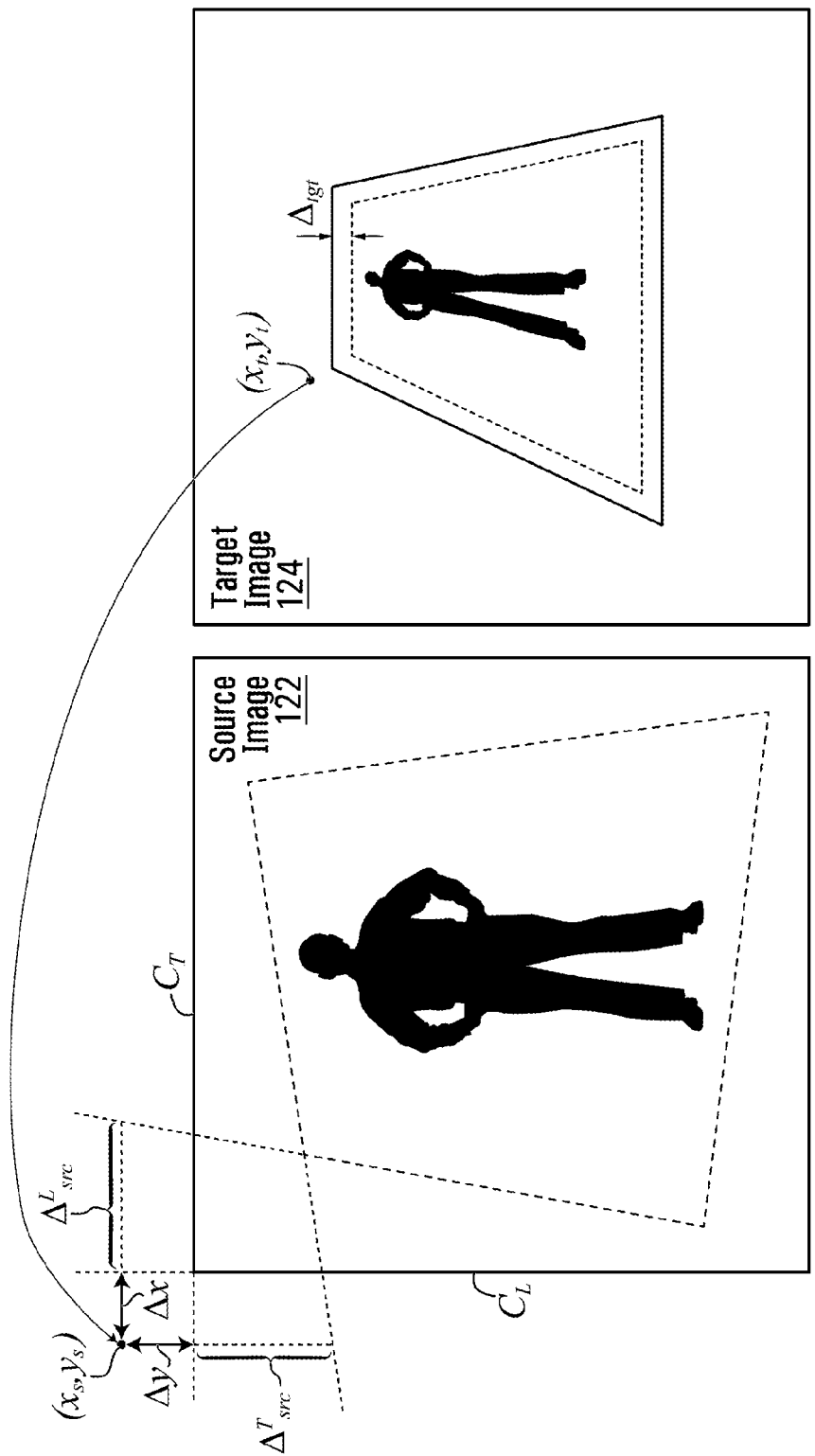
Figure 21:
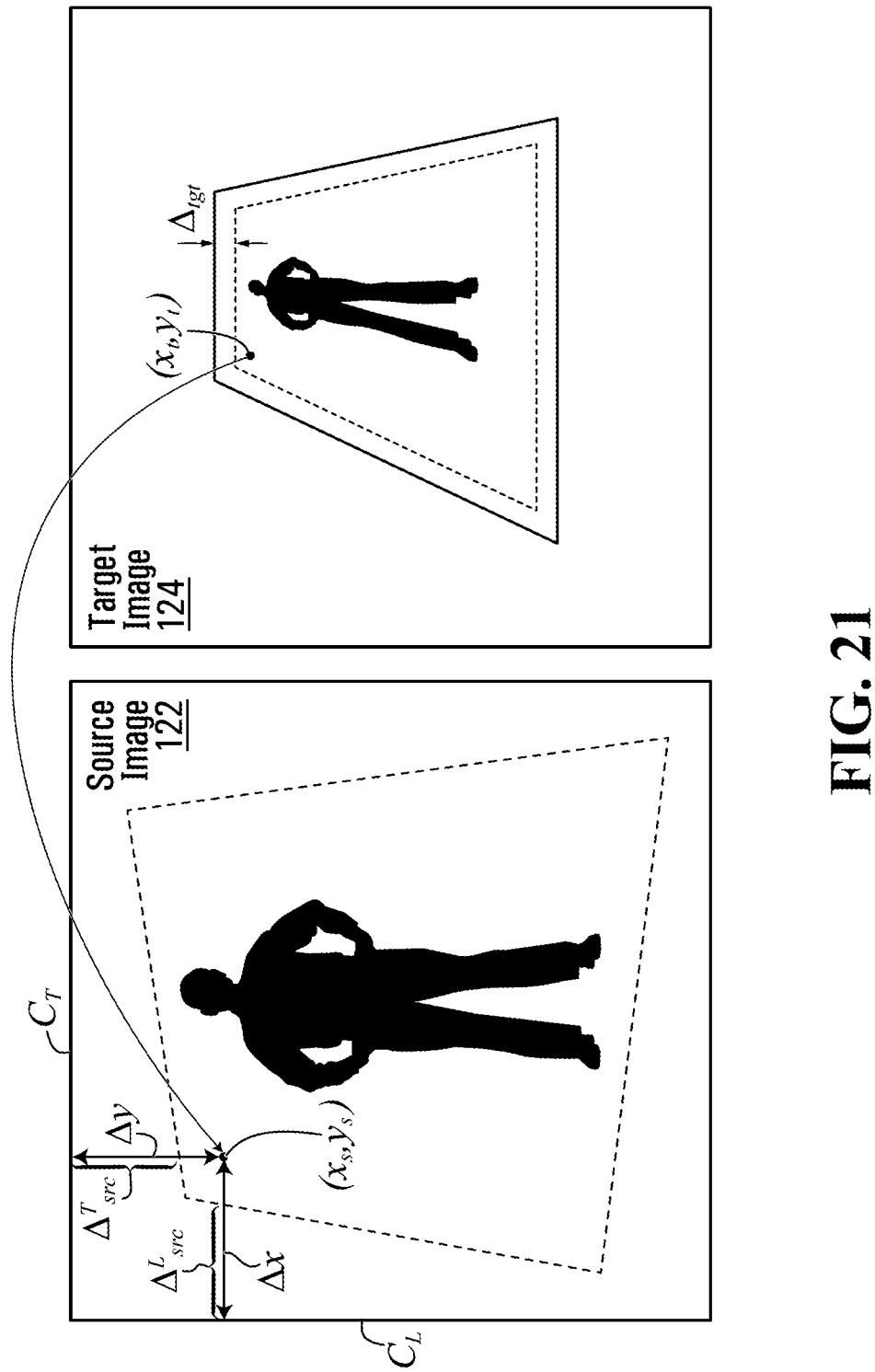

To assist in understanding Equations 27 and 28, please consider FIGS. 19 to 21. In these figures, the softness area bordering the image is within the crop lines ($C_L$, $C_R$, $C_T$, and $C_B$). The softness area has inward ramping. This is to illustrate a variation compared to FIG. 15 in which the softness area bordering the image is outside the crop lines and has outward ramping. Equation 27 is specific to an inward ramping implementation, it being understood that the equation could be modified in a straight-forward way for the FIG. 15 outward ramping implementation instead.

With reference first to FIG. 19, a target pixel coordinate $(x_t,y_t)$ is mapped to a corresponding source pixel coordinate $(x_s,y_s)$ inside the softness area by the DVE device 120 (via Equations 1 and 2 in this example embodiment). The pre-alpha value for the top boundary $\alpha'_T(x_s,y_s)$ is (via Equation 27):

$$\alpha'_T(x_s, y_s) = \dfrac{\Delta y}{\Delta^y_{src}} = \dfrac{y_s - C_T}{\Delta^T_{src}}.$$

Note that $0 < \alpha'_T(x_s,y_s) < 1$ in this example since $y_s - C_T < \Delta^T_{src}$. The shaping alpha value $\alpha_T(x_s,y_s)$ for the top boundary for source pixel coordinate $(x_s,y_s)$ is therefore $\alpha_T(x_s,y_s) = \alpha'_T(x_s,y_s)$. The pre-alpha value for the left boundary $\alpha'_L(x_s,y_s)$ is (via Equation 27):

$$\alpha'_L = \dfrac{\Delta x}{\Delta^x_{src}} = \dfrac{x_s - C_L}{\Delta^L_{src}}.$$

Note that $0 < \alpha'_L(x_s,y_s) < 1$ in this example since $x_s - C_L < \Delta^L_{src}$. The shaping alpha value $\alpha_L(x_s,y_s)$ for the left boundary for source pixel coordinate $(x_s,y_s)$ is therefore $\alpha_L(x_s,y_s) = \alpha'_L(x_s,y_s)$. The shaping alpha value for the bottom boundary ($\alpha_B(x_s,y_s)$) and the right boundary ($\alpha_R(x_s,y_s)$) are computed in a similar manner.

Now consider the situation in FIG. 20 in which a target pixel coordinate $(x_t,y_t)$ is mapped to a corresponding source pixel coordinate $(x_s,y_s)$ that is outside the softness area. The pre-alpha value for the top boundary $\alpha'_T(x_s,y_s)$ is (via Equation 27):

$$\alpha'_T(x_s, y_s) = \dfrac{\Delta y}{\Delta^y_{src}} = \dfrac{y_s - C_T}{\Delta^T_{src}}.$$

Note that $\alpha'_T(x_s,y_s) < 0$ in this example since $C_T > y_s$. The shaping alpha $\alpha_T(x_s,y_s)$ for the top boundary for source pixel coordinate $(x_s,y_s)$ is therefore $\alpha_T(x_s,y_s) = 0$. Similarly, the shaping alpha $\alpha_L(x_s,y_s)$ for the left boundary for source pixel coordinate $(x_s,y_s)$ is also $\alpha_L(x_s,y_s) = 0$ since $\alpha'_L(x_s,y_s) < 0$. The shaping alpha value for the bottom boundary $\alpha_B(x_s,y_s)$) and the right boundary ($\alpha_R(x_s,y_s)$) are computed in a similar manner.

As a third example, consider the situation in FIG. 21 in which a target pixel coordinate $(x_t,y_t)$ is mapped to a corresponding source pixel coordinate $(x_s,y_s)$ that is inside the source image boundaries. The pre-alpha value for the top boundary $\alpha'_T(x_s,y_s)$ is (via Equation 27):

$$\alpha'_T(x_s, y_s) = \frac{\Delta y}{\Delta_{src}^y} = \frac{y_s - C_T}{\Delta_{src}^T}.$$

Note that $\alpha'_T(x_s,y_s) > 1$ in this example since $y_s > C_T$ and $y_s - C_T > \Delta_{src}^T$. The shaping alpha $\alpha_T(x_s,y_s)$ for the top boundary for source pixel coordinate $(x_s,y_s)$ is therefore $\alpha_T(x_s,y_s) = 1$ as per Equation 28. Similarly, the shaping alpha $\alpha_L(x_s,y_s)$ for the left boundary for source pixel coordinate $(x_s,y_s)$ is also $\alpha_L(x_s,y_s)=1$ since $x_s > C_L$ and $x_s - C_L > \Delta_{src}^L$. The shaping alpha value for the bottom boundary ($\alpha_B(x_s,y_s)$) and the right boundary ($\alpha_R(x_s,y_s)$) are computed in a similar manner.

As mentioned above, the Equation 27 is specific to an inward ramping implementation. This is in contrast to outward ramping. Outward ramping would require a straightforward modification to Equation 27 to instead be:

$$\alpha'_i(x_s, y_s) = \frac{\Delta D_i}{\Delta_{src}^i} = \begin{cases} \frac{\Delta x}{\Delta_{src}^x} = \begin{cases} \frac{C_L - x_s}{\Delta_{src}^L} i = L \text{ (left edge)} \\ \frac{x_s - C_R}{\Delta_{src}^R} i = R \text{ (right edge)} \end{cases} \\ \frac{\Delta y}{\Delta_{src}^y} = \begin{cases} \frac{C_T - y_s}{\Delta_{src}^T} i = T \text{ (top edge)} \\ \frac{y_s - C_B}{\Delta_{src}^B} i = B \text{ (bottom edge)} \end{cases} \end{cases}$$

Figure 22:
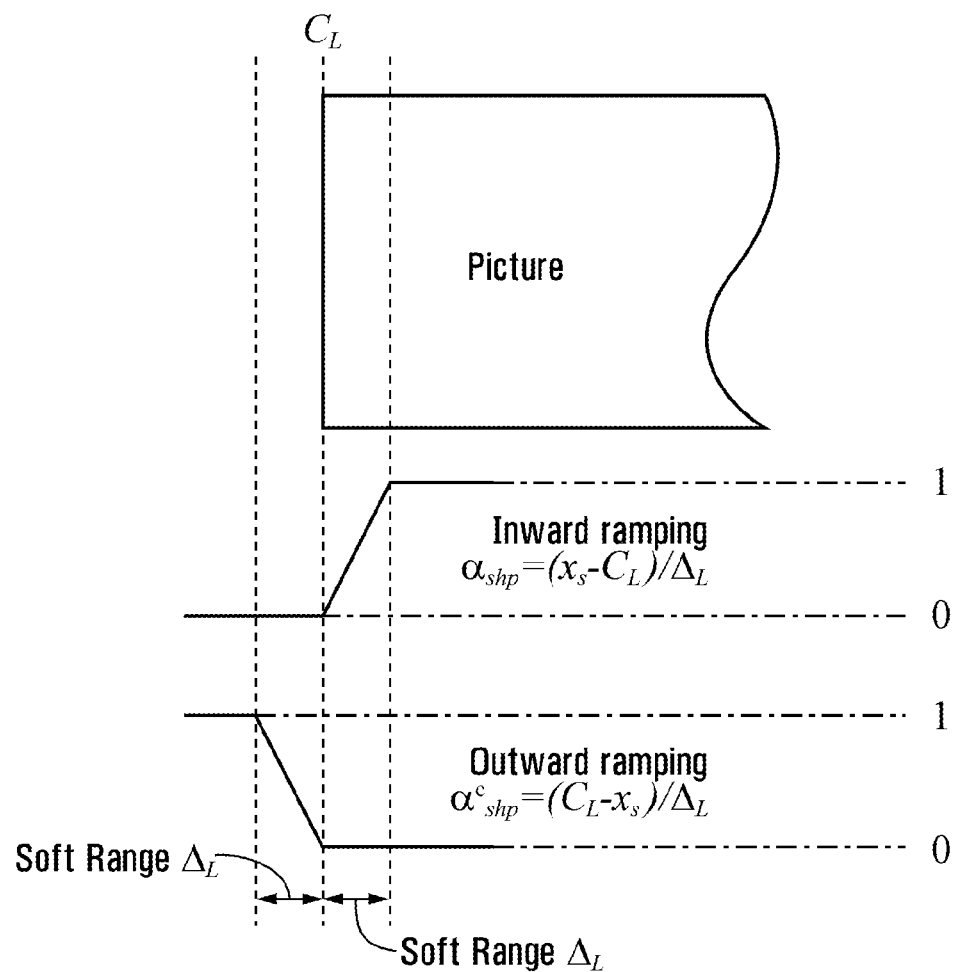
FIG. 22 illustrates the meaning of inward ramping versus outward ramping.

FIG. 22 illustrates the meaning of inward ramping and outward ramping. In FIG. 22, inward ramping produces a direct shaping alpha value, while outward ramping produces a complementary shaping alpha. That is, if inward ramping produces a, then outward ramping produces complementary alpha $\alpha^c = 1 - \alpha$. If computing $1-\alpha$ using outward ramping, then $\alpha$ is determined from $1-\alpha$ to obtain the shaping alpha used for the target image in mixing the target image with the background.

In the method above, for each target pixel coordinate $(x_t,y_t)$ that is mapped to a corresponding source pixel coordinate $(x_s,y_s)$, four boundary shaping alpha values are computed (one for each boundary, i.e. $\alpha_L(x_s,y_s)$, $\alpha_R(x_s,y_s)$, $\alpha_T(x_s,y_s)$, and $\alpha_B(x_s,y_s)$). The shaping alpha value $\alpha_{shp}(x_t,y_t)$ is generated from (or based on) these four boundary shaping alpha values $\alpha_L(x_s,y_s)$, $\alpha_R(x_s,y_s)$, $\alpha_T(x_s,y_s)$, and $\alpha_B(x_s,y_s)$. One way to achieve this is to use a fuzzy logic function, such as:

$$\alpha_{shp}(x_t, y_t) = \bigcap_{i=L,R,T,B} \alpha_i(x_s, y_s), \quad \text{(Equation 29)}$$

where $\cap$ is fuzzy logic AND. One example way of computing this fuzzy logic AND is as follows:

$$\alpha_{shp}(x_t,y_t) = \min\{\alpha_L(x_s,y_s), \alpha_R(x_s,y_s), \alpha_T(x_s,y_s), \alpha_B(x_s,y_s)\} \quad \text{(Equation 30).}$$

Another example way of computing this fuzzy logic AND is as follows:

$$\alpha_{shp}(x_t,y_t) = \alpha_L(x_s,y_s) \times \alpha_R(x_s,y_s) \times \alpha_T(x_s,y_s) \times \alpha_B(x_s,y_s) \quad \text{(Equation 31).}$$

Therefore, for each target pixel coordinate $(x_t,y_t)$ that is mapped to a corresponding source pixel coordinate $(x_s,y_s)$, a corresponding shaping alpha value $\alpha_{shp}(x_t,y_t)$ may be computed in the manner described above. The shaping alpha $\alpha_{shp}$ for the target image comprises the set of shaping alpha values: $\{\alpha_{shp}(x_t,y_t)\}$; i.e. a set comprising one shaping alpha value $\alpha_{shp}(x_t,y_t)$ for each pixel coordinate $(x_t,y_t)$ in the target image.

Note that if using outward ramping instead to produce the complementary alpha ($\alpha^c = 1-\alpha$), the fuzzy logic AND of Equation 29 would be replaced with a fuzzy logic OR (e.g. which may be implemented, for example, as $\alpha^c_{shp}(x_t,y_t) = \max\{\alpha^c_L(x_s,y_s), \alpha^c_R(x_s,y_s), \alpha^c_T(x_s,y_s), \alpha^c_B(x_s,y_s)\}$).

Figure 23:
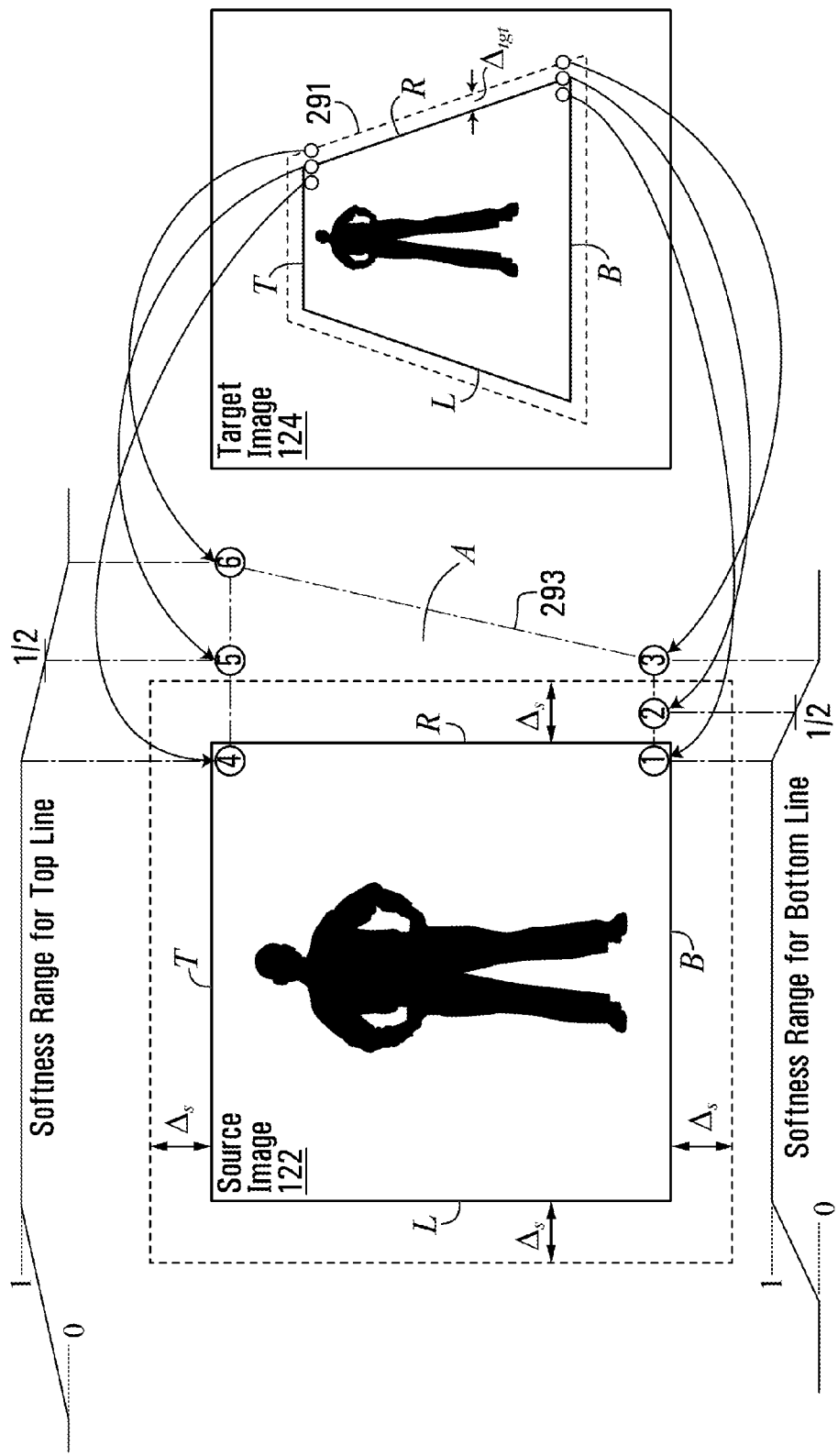
FIG. 23 illustrates some pixel coordinates mapped from a target image to a source image.

The method described above may be considered a "slope-preserved" method. This is because the spatial range $\Delta_{src}$ in the source image is derived under the condition of the target line slope being preserved. More specifically, a uniform softness around the transformed source image (in the target image) is defined, to result in a non-uniform (or spatial variant) softness range around the source image (e.g. as is shown in FIG. 15). To compare this to the alternative method of keeping the softness range around the source image uniform (as in FIG. 10), consider FIG. 23. FIG. 23 illustrates pixel coordinates 1, 2, 3, 4, 5, and 6 mapped from the target image 124 to the source image 122. If a uniform softness were defined around the source image 122, as shown by $\Delta_s$, then pixels 5 and 6 would be mapped outside the softness range resulting in a jagged edge. However, the "slope-preserved" method described above instead causes softness boundary edge 291 in the target image 124 to be mapped to softness boundary edge 293 bordering the source image 122, which results in a non-uniform area A bordering the source image 122. This non-uniform area A results in more uniform softness around the transformed source image in the target image. For example, as illustrated, pixel 5 (on the top line) and pixel 2 (on the bottom line) both have a shaping alpha value of ½ so that instances of jagged edges are mitigated. As can be seen from FIG. 23, the top line has a softness range larger than the bottom line. The "slope-preserved" method may therefore provide an anti-alias effect.

Figure 24:
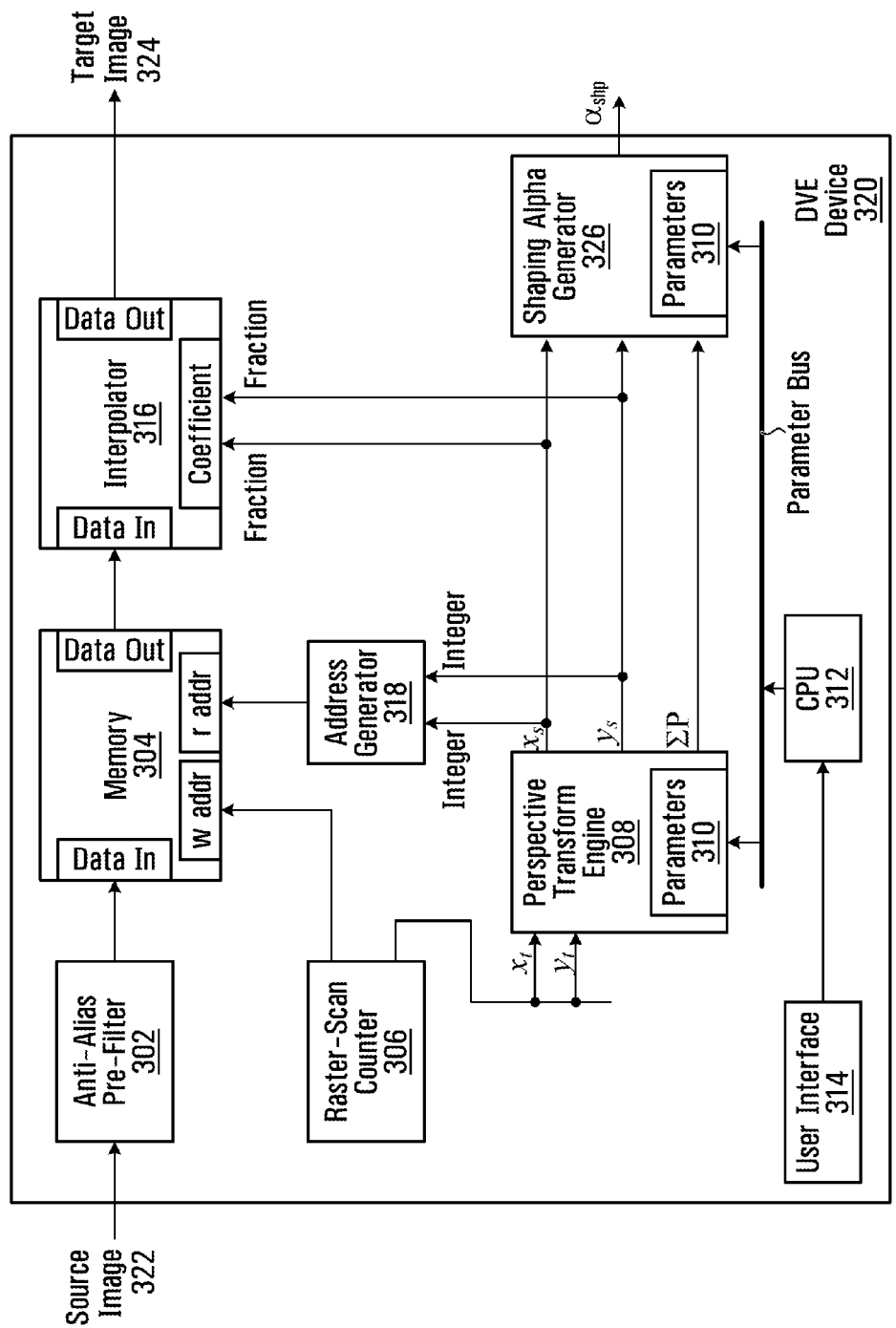
FIG. 24 illustrates another example DVE device.

Turning now to FIG. 24, another example DVE device 320 is disclosed that, for each source image, computes a corresponding target image, as well as an associated shaping alpha $\alpha_{shp}$ in the manner described above.

As shown in FIG. 24, the example DVE device 320 includes a pre-filter 302, memory 304, a raster-scan counter 306, a perspective transform engine 308, a CPU 312, a user interface 314, an interpolator 316, an address generator 318, and a shaping alpha generator 326. The pre-filter 302 may be implemented, for example, by a digital filter implemented by a general processing device (e.g. a processor) and/or a specific integrated circuit. The raster-scan counter 306 may be implemented, for example, by (or using) a digital counter circuit. The perspective transform engine 308, interpolator 316, address generator 318, and shaping alpha generator 326 may each be implemented, for example, using a general processing device (e.g. processor) and/or a specific integrated circuit configured to perform the specific operations discussed herein. The user interface 314 may be implemented, for example, using a graphical user interface and/or knobs and/or keys and/or other physical devices that allow a user to interface with the DVE device 320 and input commands.

In operation, the DVE device 320 receives as an input source image 322 and produces as an output the target image 324 and its corresponding shaping alpha $\alpha_{shp}$. The source image 322 may first be subject to pre-filtering 302 (e.g. to reduce alias artifacts caused by down-sampling), and is then stored in the memory 304. The raster-scan counter 306 can be used to write the source image 322 into the memory 304 on a pixel-by-pixel basis.

The corresponding target image 324 is then also generated on a pixel-by-pixel basis as follows.

The raster-scan counter 306 begins at $(x_t, y_t)=(0,0)$ and counts up to $(x_t, y_t)=(m,n)$ (assuming the target image 324 comprises an $(m+1) \times (n+1)$ grid of pixels). For each target pixel coordinate $(x_t, y_t)$, the target coordinate values $x_t$ and $y_t$ are input into the perspective transform engine 308, which computes the corresponding source pixel coordinate $(x_s, y_s)$ of the source image 322 stored in memory 304. The source pixel coordinate $(x_s, y_s)$ corresponding to the target pixel coordinate $(x_t, y_t)$ is a function of the manipulation being applied by the DVE device 320 and is defined by parameters 310. In this embodiment, to obtain the corresponding x-coordinate of the source pixel (i.e. $x_s$) for a given target pixel coordinate $(x_t, y_t)$, the following computation is performed by the perspective transform engine 308:

$$x_s = T_d + \frac{(T_a x_t + T_b y_t + T_c f) P_d}{P_a x_t + P_b y_t + P_c f}$$ (i.e. Equation 1 above)

To obtain the corresponding y-coordinate of the source pixel (i.e. $y_s$) for a given target pixel $(x_t, y_t)$, the following computation is performed by the perspective transform engine 308:

$$y_s = T_h + \frac{(T_e x_t + T_f y_t + T_g f) P_d}{P_a x_t + P_b y_t + P_c f}$$ (i.e. Equation 2 above).

As discussed earlier, Equations 1 and 2 are based on mapping of a target pixel coordinate to a corresponding source pixel coordinate using the following inverse mapping function:

$$M^{-1} = \begin{bmatrix} T_a & T_b & T_c & T_d \\ T_e & T_f & T_g & T_h \\ P_a & P_b & P_c & -P_d \\ 0 & 0 & 0 & 1 \end{bmatrix}$$ (i.e. Equation 3).

In this example, $T_a$, $T_b$, $T_c$, $T_d$, $T_e$, $T_f$, $T_g$, $T_h$, $P_a$, $P_b$, $P_c$, $P_d$, and f are the parameters 310, and their specific values are computed by the CPU 312 based on the specific effect requested by the user via user interface 314. For example, if a user indicated via the user interface 314 that it was desired to rotate the source image 322 by 15 degrees and shrink the source image 322 to half its size, then the user interface 314 would electronically forward this request to the CPU 312, which would compute the corresponding values of the parameters 310, and forward these specific parameter values 310 to the perspective transform engine 308. There is also now an additional parameter $\Delta_{tgt}$. Specifically, the user may also control the width of the softness area bordering the target object by setting the value $\Delta_{tgt}$ (either directly or indirectly) via the user interface 314.

In general, the target pixel value $Y_t(x_t, y_t)$ will be set as the corresponding source pixel value $Y_s(x_s, y_s)$, which is stored in and retrieved from memory 304. However, the corresponding source pixel coordinate $(x_s, y_s)$ computed by the perspective transform engine 308 for a given target pixel coordinate $(x_t, y_t)$ will (in general) not be an integer, but will be a fractional value. For example, if $(x_t, y_t)=(12, 14)$ is input into the perspective transform engine 308, then the corresponding source pixel coordinate $(x_s, y_s)$ may be, for example, $(x_s, y_s)=(23.63, 17.27)$. Therefore, to compute the target pixel value $Y_t(x_t, y_t)$, interpolation is used, as described earlier. To perform such interpolation, the DVE device 320 includes the interpolator 316.

As shown in FIG. 24, the DVE device 320 also includes the address generator 318, which uses the computed source pixel coordinate $(x_s, y_s)$ (e.g. $(x_s, y_s)=(23.63, 17.27)$) to generate the addresses of the source pixels to be used for the interpolation (e.g. (23, 17), (23, 18), (24, 17), and (24, 18)). The corresponding source pixel values indicated by the address generator 318 are then read from memory 304 and fed to interpolator 316. The fractional values of the computed source pixel coordinate $(x_s, y_s)$ (e.g. 0.63 and 0.27) are also forwarded to the interpolator 316. The output of interpolator 316 is the target pixel value $Y_t(x_t, y_t)$.

The process above is repeated for each target image coordinate $(x_t, y_t)$ such that the target image 324 is created on a pixel-by-pixel basis. In this embodiment, in the cases in which a given target pixel coordinate $(x_t, y_t)$ maps to a corresponding source pixel coordinate $(x_s, y_s)$ that is out of source bounds, then the target pixel value $Y_t(x_t, y_t)$ is set to the source pixel value $Y_s(x_s, y_s)$ of the closest source boundary pixel.

Figure 25:
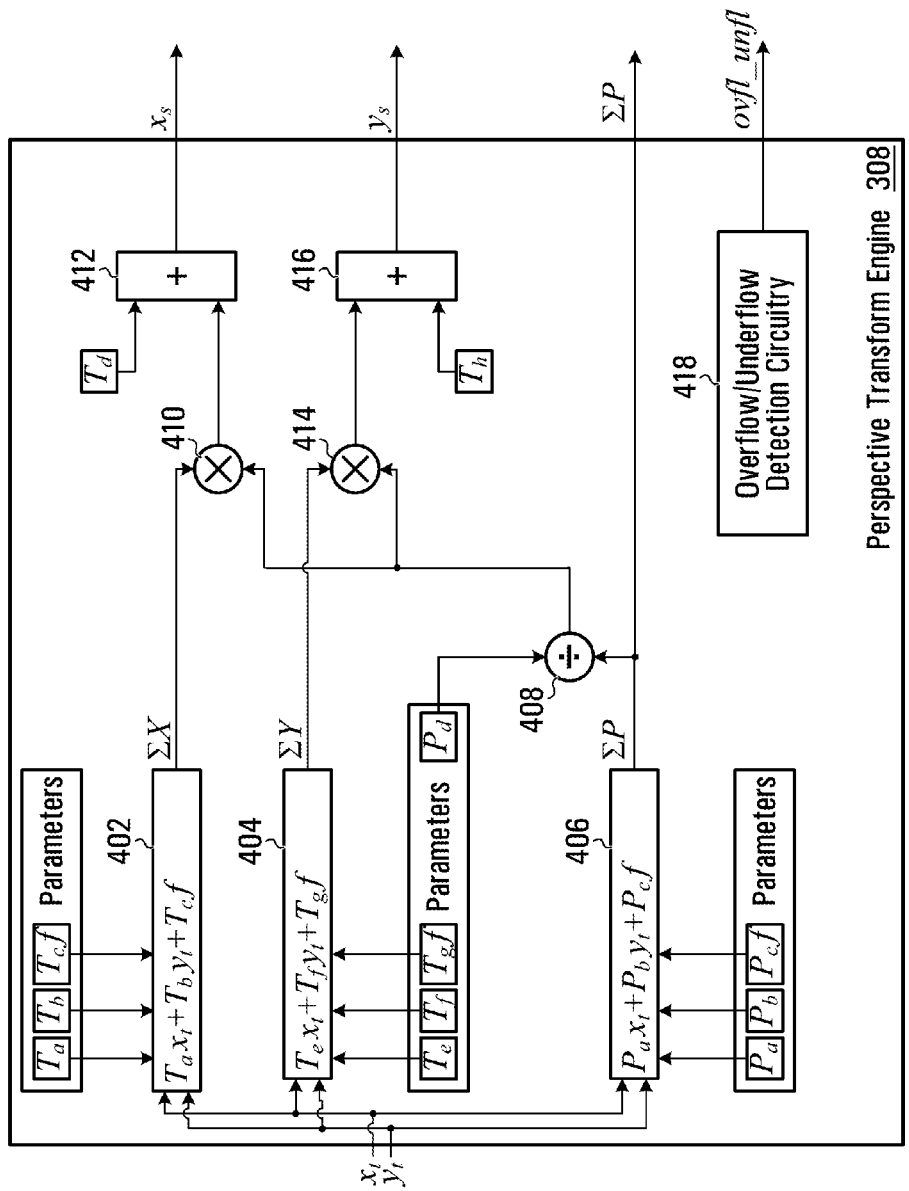
FIG. 25 illustrates an example perspective transform engine.

FIG. 25 illustrates in more detail an example perspective transform engine, which could be implemented as the perspective transform engine 308. Specifically, FIG. 25 illustrates the computations performed to obtain corresponding source pixel coordinate $(x_s, y_s)$ from a given target image coordinate $(x_t, y_t)$. As shown in FIG. 25, the perspective transform engine 308 includes computational blocks 402, 404, and 406 for respectively computing intermediary values $\Sigma X$, $\Sigma Y$, and $\Sigma P$. The perspective transform engine 308 also includes divider 408, multipliers 410 and 414, and adders 412 and 416. The computational blocks 402, 404, and 406 may be implemented, for example, using digital adders and multipliers. The adders, multipliers, and divider may be implemented, for example, using digital logic for adding two inputs (in the case of the adders) or digital logic for multiplying two inputs (in the case of the multipliers) or digital logic for dividing two inputs (in the case of the divider).

As discussed above, the parameters 310 include $T_a$, $T_b$, $T_c$, $T_d$, $T_e$, $T_f$, $T_g$, $T_h$, $P_a$, $P_b$, $P_c$, $P_d$, and f. In operation of the perspective transform engine 308, the parameters $T_a$, $T_b$, $T_c$, and f are combined with target image coordinates $x_t$ and $y_t$ to compute $\Sigma X = T_a x_t + T_b y_t + T_c f$, as per computational block 402. The parameters $T_e$, $T_f$, $T_g$, and f are combined with target image coordinates $x_t$ and $y_t$ to compute $\Sigma Y = T_e x_t + T_f y_t + T_g f$, as per computational block 404. The parameters $P_a$, $P_b$, $P_c$, and f are combined with target image coordinates $x_t$ and $y_t$ to compute $\Sigma P = P_a x_t + P_b y_t + P_c f$, as per computational block 406. The parameter $P_d$ is divided by $\Sigma P = P_a x_t + P_b y_t + P_c f$ to generate $$\frac{P_d}{P_a x_t + P_b y_t + P_c f},$$

as per divider 408. The value $$\frac{P_d}{P_a x_t + P_b y_t + P_c f}$$

is then multiplied with $\Sigma X = T_a x_t + T_b y_t + T_c f$ at multiplier 410 and this result subsequently added to parameter $T_d$ at adder 412 to generate $$x_s = T_d + \frac{(T_a x_t + T_b y_t + T_c f) P_d}{P_a x_t + P_b y_t + P_c f}$$

(i.e. Equation 1). Similarly, the value $$\frac{P_d}{P_a x_t + P_b y_t + P_c f}$$

is multiplied with $\Sigma Y = T_e x_t + T_f y_t + T_g f$ at multiplier 414 and this result subsequently added to parameter $T_h$ at adder 416 to generate $$y_s = T_h + \frac{(T_e x_t + T_f y_t + T_g f) P_d}{P_a x_t + P_b y_t + P_c f}$$

(i.e. Equation 2).

In the illustrated embodiment, the perspective transform engine 308 additionally includes overflow/underflow circuitry 418, which detects any overflow or underflow or data out-of-range conditions, such as situations in which $\Sigma P = P_a x_t + P_b y_t + P_c f = 0$ (e.g. a singularity that occurs when the target object is located at a vanishing line), or an effect causing an invisibility (e.g. unified depth z<0, which corresponds to the object behind the viewers).

Returning to FIG. 24, the DVE device 320 also includes the shaping alpha generator 326, which computes the shaping alpha $\alpha_{shp}$ for the target image 322 in the manner described above. As described above, the shaping alpha $\alpha_{shp}$ comprises the set of shaping alpha values $\{\alpha_{shp}(x_t,y_t)\}$, i.e. a set comprising one shaping alpha value $\alpha_{shp}(x_t,y_t)$ for each pixel coordinate $(x_t,y_t)$ in the target image 324. As described above, a shaping alpha value $\alpha_{shp}(x_t,y_t)$ for a pixel coordinate $(x_t,y_t)$ in the target image may be computed via Equation 29, that is:

$$\alpha_{shp}(x_t, y_t) = \bigcap_{i=L,R,T,B} \alpha_i(x_s, y_s),$$

where $\cap$ is fuzzy logic AND and $(x_s,y_s)$ is the source pixel coordinate corresponding to the target image pixel coordinate $(x_t,y_t)$. That is, $(x_s,y_s)$ is the output of the perspective transform engine 308, which is why these coordinates are fed to the shaping alpha generator 326 in the DVE device 320. As described above, each $\alpha_i(x_s,y_s)$ may be computed via Equation 28, that is:

$$\alpha_i(x_s, y_s) = \begin{cases} 0, & \alpha'_i(x_s, y_s) < 0 \\ 1, & \alpha'_i(x_s, y_s) > 1 \\ \alpha'_i(x_s, y_s), & \text{else} \end{cases},$$

where $\alpha'_i(x_s,y_s)$ is the pre-alpha value defined via Equation 27, that is:

$$\alpha'_i(x_s, y_s) = \frac{\Delta D_i}{\Delta^i_{src}} = \begin{cases} \frac{\Delta x}{\Delta^x_{src}} = \begin{cases} \frac{x_s - C_L}{\Delta^L_{src}} i = L \text{ (left edge)} \\ \frac{C_R - x_s}{\Delta^R_{src}} i = R \text{ (right edge)} \end{cases} \\ \frac{\Delta y}{\Delta^y_{src}} = \begin{cases} \frac{y_s - C_T}{\Delta^T_{src}} i = T \text{ (top edge)} \\ \frac{C_B - y_s}{\Delta^B_{src}} i = B \text{ (bottom edge)} \end{cases} \end{cases}.$$

The value $\Delta_{src}^x$ is defined via Equation 25, that is:

$$\Delta^x_{src} = \begin{cases} \frac{|P_d T_b - P_b(C_H - T_d)|\Delta_{tgt}}{|P_a x_t + P_b y_t + P_c f|}, & \text{if } |P_a(C_H - T_d) - P_d T_a| \leq |P_b(C_H - T_d) - P_d T_b| \\ \frac{|P_d T_a - P_a(C_H - T_d)|\Delta_{tgt}}{|P_a x_t + P_b y_t + P_c f|}, & \text{else} \end{cases}.$$

In other words, for the left edge (i=L), then:

$$\Delta^x_{src} = \Delta^L_{src} = \begin{cases} \frac{|P_d T_b - P_b(C_L - T_d)|\Delta_{tgt}}{|P_a x_t + P_b y_t + P_c f|}, & \text{if } |P_a(C_L - T_d) - P_d T_a| \leq |P_b(C_L - T_d) - P_d T_b| \\ \frac{|P_d T_a - P_a(C_L - T_d)|\Delta_{tgt}}{|P_a x_t + P_b y_t + P_c f|}, & \text{else} \end{cases},$$

and for the right edge (i=R), then:

$$\Delta^x_{src} = \Delta^R_{src} = \begin{cases} \frac{|P_d T_b - P_b(C_R - T_d)|\Delta_{tgt}}{|P_a x_t + P_b y_t + P_c f|}, & \text{if } |P_a(C_R - T_d) - P_d T_a| \leq |P_b(C_R - T_d) - P_d T_b| \\ \frac{|P_d T_a - P_a(C_R - T_d)|\Delta_{tgt}}{|P_a x_t + P_b y_t + P_c f|}, & \text{else} \end{cases}.$$

Recall that $C_L$ and $C_R$ are the left and right cropping lines respectively defining the left and right boundaries of the source image 322. That is, on the left boundary of the source image 322 the source x-coordinate $x_s$ will be a constant $x_s = C_L$, and on the right boundary of the source image 322, the x-coordinate $x_s$ will be a constant $x_s = C_R$.

The value $\Delta_{src}^y$ is defined by Equation 26, that is:

$$\Delta^y_{src} = \begin{cases} \frac{|P_d T_f - P_b(C_V - T_h)|\Delta_{tgt}}{|P_a x_t + P_b y_t + P_c f|}, & \text{if } |P_a(C_V - T_h) - P_d T_e| \leq |P_b(C_V - T_h) - P_d T_f| \\ \frac{|P_d T_e - P_a(C_V - T_h)|\Delta_{tgt}}{|P_a x_t + P_b y_t + P_c f|}, & \text{else} \end{cases}.$$

In other words, for the top edge (i=T), then:

$$\Delta_{src}^y = \Delta_{src}^T = \begin{cases} \frac{|P_dT_f - P_b(C_T - T_h)|\Delta_{tgt}}{|P_ax_t + P_by_t + P_cf|}, & \text{if } |P_a(C_T - T_h) - P_dT_e| \leq \\ & |P_b(C_T - T_h) - P_dT_f| \\ \frac{|P_dT_e - P_a(C_T - T_h)|\Delta_{tgt}}{|P_ax_t + P_by_t + P_cf|}, & \text{else} \end{cases},$$

and for the bottom edge (i=B), then:

$$\Delta_{src}^y = \Delta_{src}^B = \begin{cases} \frac{|P_dT_f - P_b(C_B - T_h)|\Delta_{tgt}}{|P_ax_t + P_by_t + P_cf|}, & \text{if } |P_a(C_B - T_h) - P_dT_e| \leq \\ & |P_b(C_B - T_h) - P_dT_f| \\ \frac{|P_dT_e - P_a(C_B - T_h)|\Delta_{tgt}}{|P_ax_t + P_by_t + P_cf|}, & \text{else} \end{cases}.$$

Recall that $C_T$ and $C_B$ are the top and bottom cropping lines respectively defining the top and bottom boundaries of the source image 322. That is, on the top boundary of the source image 322 the source y-coordinate $y_s$ will be a constant $y_s=C_T$, and on the bottom boundary of the source image 322, the y-coordinate $y_s$ be a constant $y_s=C_B$.

Note that in this embodiment, advantageously the term $P_ax_t+P_by_t+P_cf$ required to compute each shaping alpha value needs to be computed by the perspective transform engine 308 ($\Sigma P = P_ax_t + P_by_t + P_cf$). Therefore, as shown in the DVE device 320 in FIG. 24, the value $\Sigma P = P_ax_t + P_by_t + P_cf$ is forwarded from the perspective transform engine 308 to the shaping alpha generator 326. This has the benefit of reducing the number of computations required by the shaping alpha generator 326, as the results of computations in the perspective transform engine 308 (an intermediate result) can be re-used. That is, an intermediary computational result obtained when computing the corresponding source pixel coordinate $(x_s, y_s)$ can be used in computing the alpha channel value.

Figure 26:
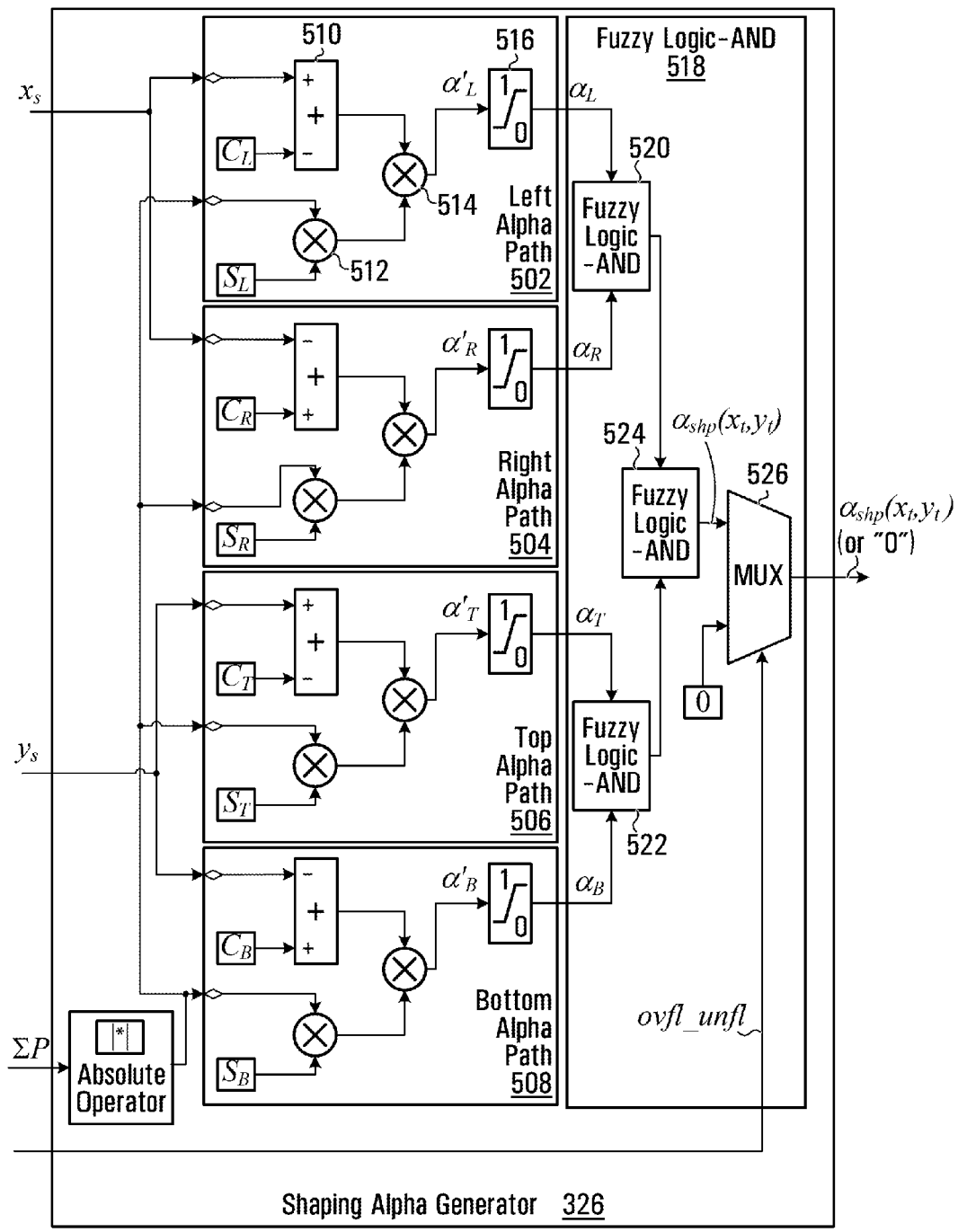
FIG. 26 illustrates an example shaping alpha generator.

FIG. 26 illustrates in more detail an example shaping alpha generator, which could be implemented as the shaping alpha generator 326. As shown in FIG. 26, the shaping alpha generator 326 includes four computational blocks, which may be referred to as processing paths or "channels". Each processing path computes a respective $\alpha_i(x_s, y_s)$, where i=L, R, T, and B. That is, left alpha path 502 computes left boundary shaping alpha value $\alpha_L(x_s, y_s)$, right alpha path 504 computes right boundary shaping alpha value $\alpha_R(x_s, y_s)$, top alpha path 506 computes top boundary shaping alpha value $\alpha_T(x_s, y_s)$, and bottom alpha path 508 computes bottom boundary shaping alpha value $\alpha_B(x_s, y_s)$. Each of processing paths 502 to 508 are of identical structure, but fed with different parameters. Each processing path is implemented using adders, multipliers, and a clipping function. For example, left alpha processing path 502 includes adder 510, multipliers 512 and 514, and clipper 516. The multipliers and subtractors may be implemented, for example, using digital logic for subtracting two inputs (in the case of the subtractor) or digital logic for multiplying two inputs (in the case of the multiplier). The clipper 516 implements the clipping function $$a_L(x_s, y_s) = \begin{cases} 0, & \alpha'_L(x_s, y_s) < 0 \\ 1, & \alpha'_L(x_s, y_s) > 1, \\ \alpha'_L(x_s, y_s), & \text{else} \end{cases}$$

for example, using a comparator to evaluate whether $\alpha'_L(x_s, y_s)$ (from multiplier 514) is less then zero, between zero or one, or greater than zero.

The shaping alpha generator 326 further includes fuzzy logic AND blocks 520, 524, and 522, as well as multiplexer 526. The fuzzy logic AND blocks may be implemented using computational circuitry configured to implement the fuzzy logic AND operations described herein (e.g. as described in more detail later with respect to FIGS. 27 and 28).

In operation, the left alpha processing path 502 computes $$\alpha'_L(x_s, y_s) = \frac{x_s - C_L}{\Delta_{src}^L},$$

where $$\Delta_{src}^L = \begin{cases} \frac{|P_dT_b - P_b(C_L - T_d)|\Delta_{tgt}}{|P_ax_t + P_by_t + P_cf|}, & \text{if } |P_a(C_L - T_d) - P_dT_a| \leq \\ & |P_b(C_L - T_d) - P_dT_b| \\ \frac{|P_dT_a - P_a(C_L - T_d)|\Delta_{tgt}}{|P_ax_t + P_by_t + P_cf|}, & \text{else} \end{cases},$$

by subtracting parameter $C_L$ from source coordinate $x_s$, as at subtractor 510, and by multiplying $|P_ax_t+P_by_t+P_cf|$ by parameter $S_L$, as at multiplier 512, and then multiplying $x_s-C_L$ by $|P_ax_t+P_by_t+P_cf|S_L$, as at multiplier 514. Note that:

$$S_L = \begin{cases} \frac{1}{|P_dT_b - P_b(C_L - T_d)|\Delta_{tgt}}, & \text{if } |P_a(C_L - T_d) - P_dT_a| \leq \\ & |P_b(C_L - T_d) - P_dT_b| \\ \frac{1}{|P_dT_a - P_a(C_L - T_d)|\Delta_{tgt}}, & \text{else} \end{cases} \quad \text{(Equation 32)}$$

so that $(x_s - C_L)|P_ax_t + P_by_t + P_cf|S_L = \frac{x_s - C_L}{\Delta_{src}^L}$.

As mentioned above, the block 516 represents the clipping function $$a_L(x_s, y_s) = \begin{cases} 0, & \alpha'_L(x_s, y_s) < 0 \\ 1, & \alpha'_L(x_s, y_s) > 1 \\ \alpha'_L(x_s, y_s), & \text{else} \end{cases}$$

to produce left boundary shaping alpha value $\alpha_L(x_s, y_s)$.

Right alpha processing path 504, top alpha processing path 506, and bottom alpha processing path 508 are of the same structure as left alpha processing path 504, except that different parameter inputs are used to respectively compute right boundary shaping alpha value $\alpha_R(x_s, y_s)$, top boundary shaping alpha value $\alpha_T(x_s, y_s)$, and bottom boundary shaping alpha value $\alpha_B(x_s, y_s)$ as per the equations above. Note that in FIG. 26:

$$S_R = \begin{cases} \dfrac{1}{\left|\dfrac{P_d T_b -}{P_b(C_R - T_d)|\Delta_{tgt}}\right|}, & \text{if } |P_a(C_R - T_d) - P_d T_a| \le \\ & |P_b(C_R - T_d) - P_d T_b| \\ \dfrac{1}{\left|\dfrac{P_d T_a -}{P_a(C_R - T_d)|\Delta_{tgt}}\right|}, & \text{else} \end{cases}, \quad \text{(Equation 33)}$$

$$S_T = \begin{cases} \dfrac{1}{\left|\dfrac{P_d T_f -}{P_b(C_T - T_h)|\Delta_{tgt}}\right|}, & \text{if } |P_a(C_T - T_h) - P_d T_e| \le \\ & |P_b(C_T - T_h) - P_d T_f| \\ \dfrac{1}{\left|\dfrac{P_d T_e -}{P_a(C_T - T_h)|\Delta_{tgt}}\right|}, & \text{else} \end{cases}, \quad \text{(Equation 34)}$$

and $$S_B = \begin{cases} \dfrac{1}{\left|\dfrac{P_d T_f -}{P_b(C_B - T_h)|\Delta_{tgt}}\right|}, & \text{if } |P_a(C_B - T_h) - P_d T_e| \le \\ & |P_b(C_B - T_h) - P_d T_f| \\ \dfrac{1}{\left|\dfrac{P_d T_e -}{P_a(C_B - T_h)|\Delta_{tgt}}\right|}, & \text{else} \end{cases}. \quad \text{(Equation 35)}$$

Each parameter $C_L$, $C_R$, $C_T$, and $C_B$ can be considered a crop parameter, and each parameter $S_L$, $S_R$, $S_T$, and $S_B$ can be considered a scaling parameter, such that each of processing path 502 to 508 are of identical structure, but fed with a respective different crop and scale parameter.

As can be seen from the above, the output of multiplier 514 in FIG. 26 is simply $\alpha'_L = S_L |\Sigma P| \Delta D_L$, where $\Delta D_L = x_s - C_L$. In general, for each of the processing path, $\alpha'_i = S_i |\Sigma P| \Delta D_i$, where i=L, R, T, B and $$\Delta D_i = \begin{cases} x_s - C_L, & i = L \\ C_R - x_s, & i = R \\ y_s - C_T, & i = T \\ C_B - y_s, & i = B \end{cases}.$$

The fuzzy logic AND block 518 implements the fuzzy logic AND $$\alpha_{shp}(x_t, y_t) = \bigcap_{i=L,R,T,B} \alpha_i(x_s, y_s).$$

Note that in this embodiment, the left and right boundary shaping alpha values $\alpha_L(x_s,y_s)$ and $\alpha_R(x_s,y_s)$ are used as the set of inputs for a first fuzzy logic AND $$\bigcap_{i=L,R} \alpha_i(x_s, y_s),$$

as at block 520, and the top and bottom boundary shaping alpha values $\alpha_T(x_s,y_s)$ and $\alpha_B(x_s,y_s)$ are used as the set of inputs for a second fuzzy logic AND $$\bigcap_{i=T,B} \alpha_i(x_s, y_s),$$

as at block 522, and then these two results are used as the set of inputs for a third fuzzy logic AND, as at block 524, to generate the shaping alpha value $\alpha_{shp}(x_t,y_t)$ for the pixel coordinate $(x_t,y_t)$ of the target image. This can be considered parallel or cascade merging of multiple binary operation fuzzy logic ANDs to construct a fuzzy logic AND having more than 2 operands.

Then, as shown at 526, the shaping alpha value $\alpha_{shp}(x_t,y_t)$ is multiplexed with the value "0", with the overflow/underflow choosing "0" if there was an overflow/underflow error in the computations. This multiplexer implements a switch that can switch between "0" and the shaping alpha value $\alpha_{shp}(x_t,y_t)$. By choosing "0", this results in the pixel being fully transparent if there is an overflow/underflow condition.

Figure 27:
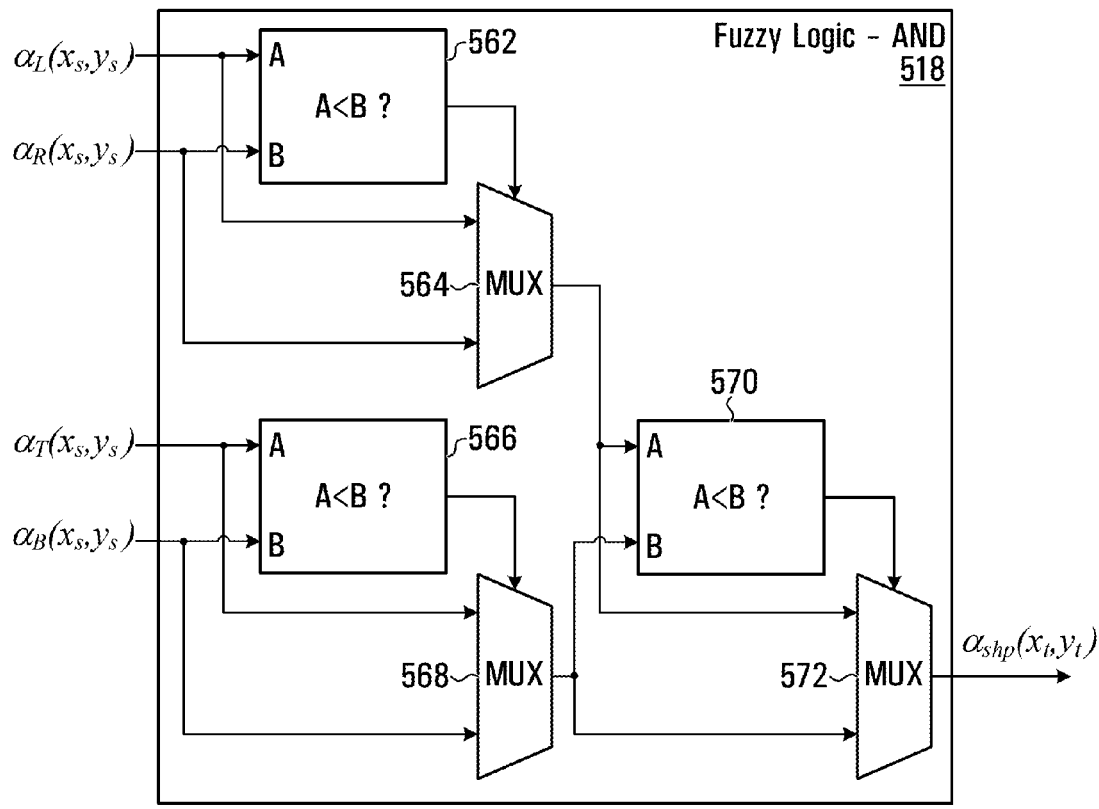
FIG. 27 illustrates an implementation of an arithmetic minimum fuzzy logic.

One example way to implement the fuzzy logic of block 518 is illustrated in FIG. 27. As shown in FIG. 27, this implementation includes comparators and multiplexers arranged in the manner illustrated. Specifically, the minimum of left boundary shaping alpha value $\alpha_L(x_s,y_s)$ and right boundary shaping alpha value $\alpha_R(x_s,y_s)$ is selected via comparator 562 and multiplexer 564. Similarly, the minimum of top boundary shaping alpha value $\alpha_T(x_s,y_s)$ and bottom boundary shaping alpha value $\alpha_B(x_s,y_s)$ is selected via comparator 566 and multiplexer 568. The output of each of multiplexers 564 and 568 are then compared using comparator 570 and the smallest value selected using multiplexer 572. The output is then Equation 30, that is:

$$\alpha_{shp}(x_t,y_t)=\min\{\alpha_L(x_s,y_s),\alpha_R(x_s,y_s),\alpha_T(x_s,y_s),\alpha_B(x_s,y_s)\}.$$

Figure 28:
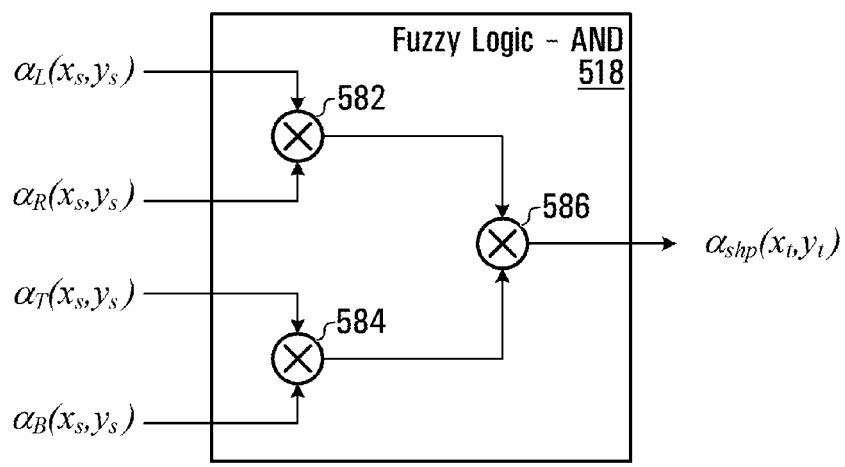
FIG. 28 illustrates an implementation of an arithmetic multiplication fuzzy logic.

Another example way to implement the fuzzy logic of block 518 is illustrated in FIG. 28. As shown in FIG. 28, this implementation includes multipliers arranged in the manner illustrated. Specifically, the left boundary shaping alpha value $\alpha_L(x_s,y_s)$ and the right boundary shaping alpha value $\alpha_R(x_s,y_s)$ are multiplied, as at 582. Similarly, the top boundary shaping alpha value $\alpha_T(x_s,y_s)$ and the bottom boundary shaping alpha value $\alpha_B(x_s,y_s)$ are multiplied, as at 584. The output of each of multipliers 582 and 584 are multiplied, as at 586. The output is then Equation 31, that is:

$$\alpha_{shp}(x_t,y_t)=\alpha_L(x_s,y_s)\times\alpha_R(x_s,y_s)\times\alpha_T(x_s,y_s)\times\alpha_B(x_s,y_s).$$

The FIG. 27 implementation tends to give a sharp-angled corner effect, whereas the FIG. 28 implementation tends to give a rounded corner effect.

Using the example implementation discussed above in relation to FIGS. 24 to 28, different values of $\Delta_{tgt}$ have been tested (e.g. $\Delta_{tgt}=1.5$ and $\Delta_{tgt}=10.5$) and softness around a target object in a target image has been obtained that is aesthetically improved as compared to the alternative approach of not defining a uniform softness border $\Delta_{tgt}$ around the target object, but instead defining a uniform softness border around the source image and then computing the shaping alpha value for each target pixel coordinate in terms of whether the corresponding source pixel coordinate falls within the uniform softness border around the source image.

Figure 29:
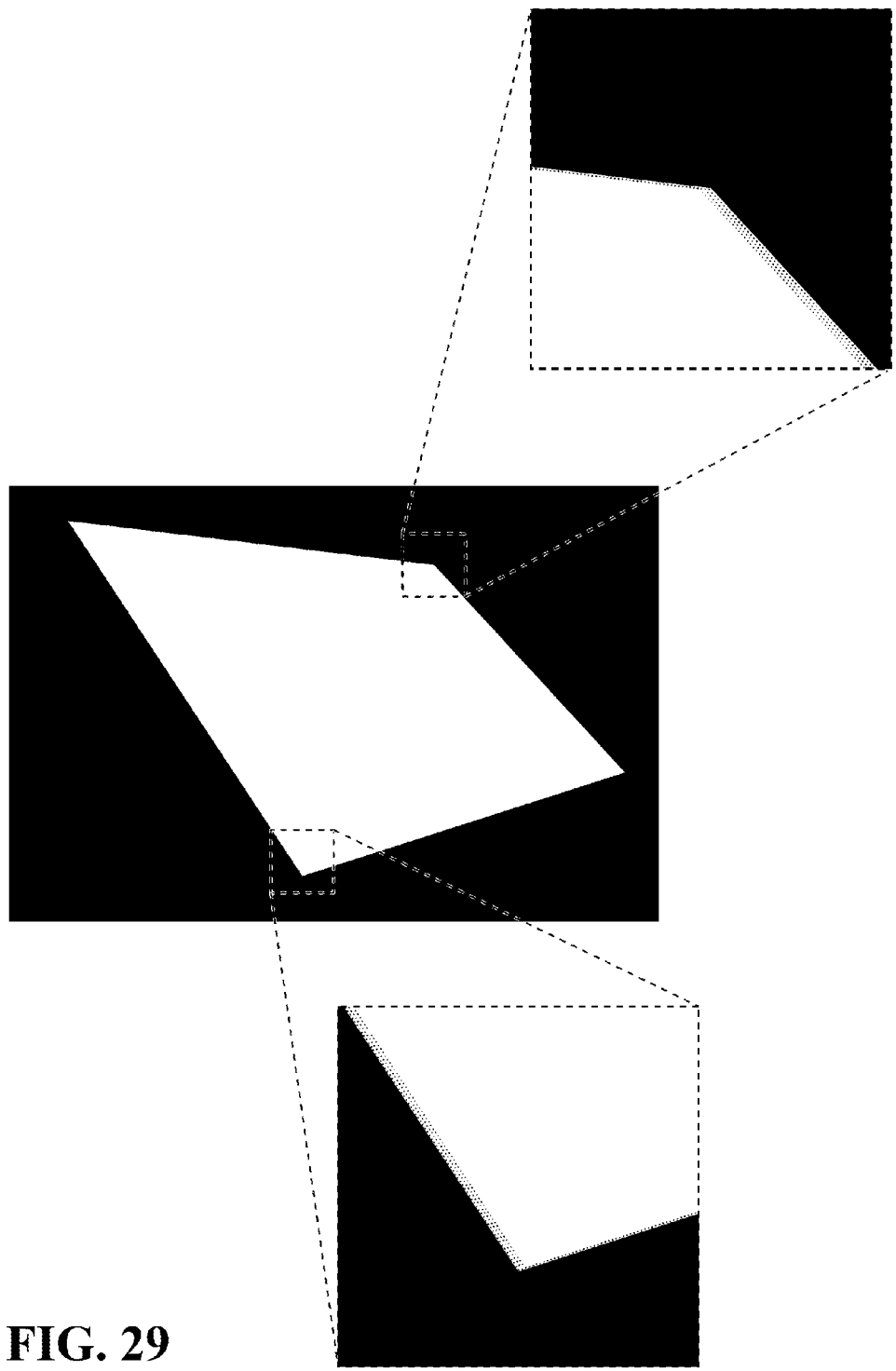
FIGS. 29 to 32 illustrate results showing uniform softness.
Figure 30:
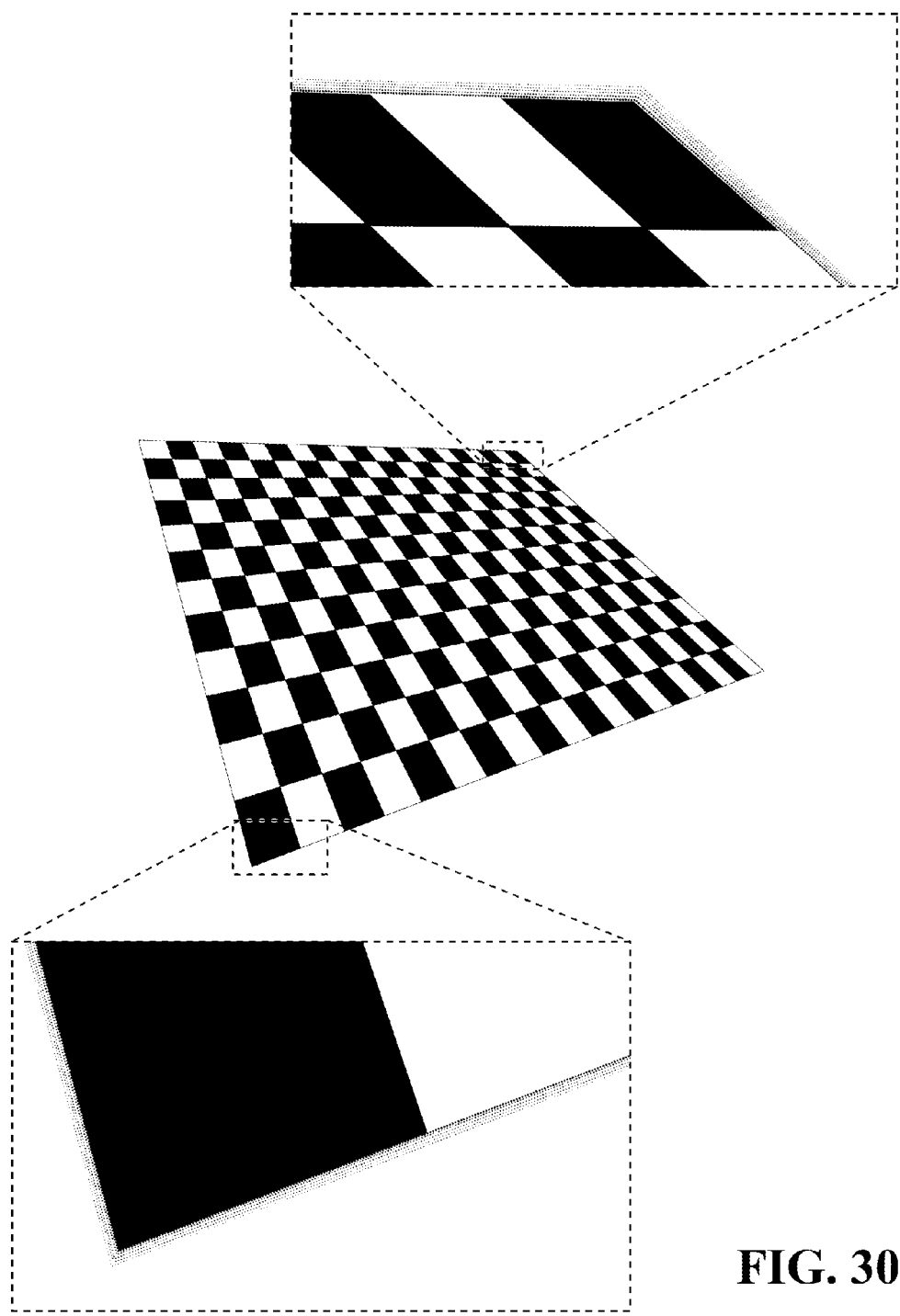
Figure 31:
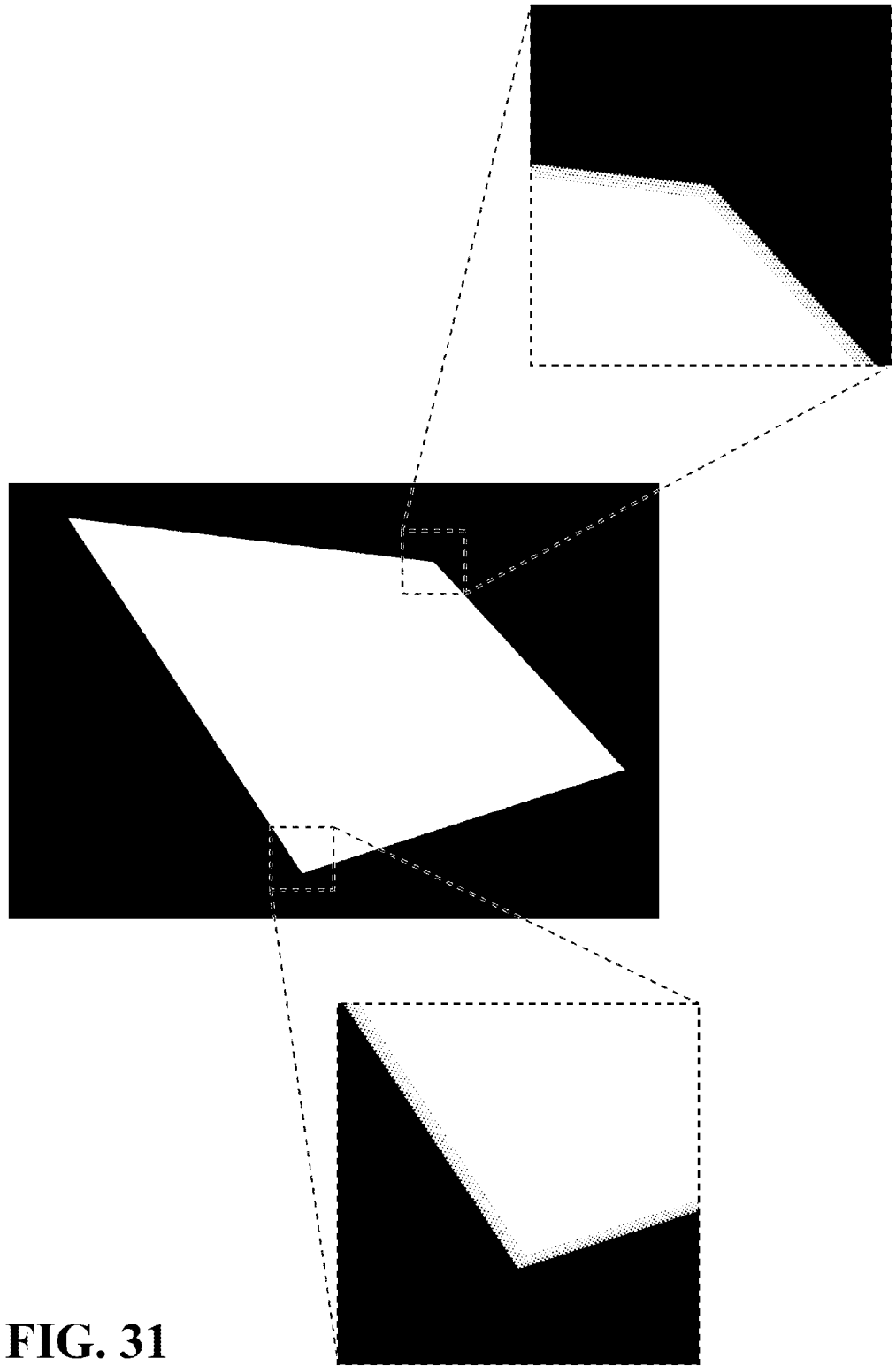
Figure 32:
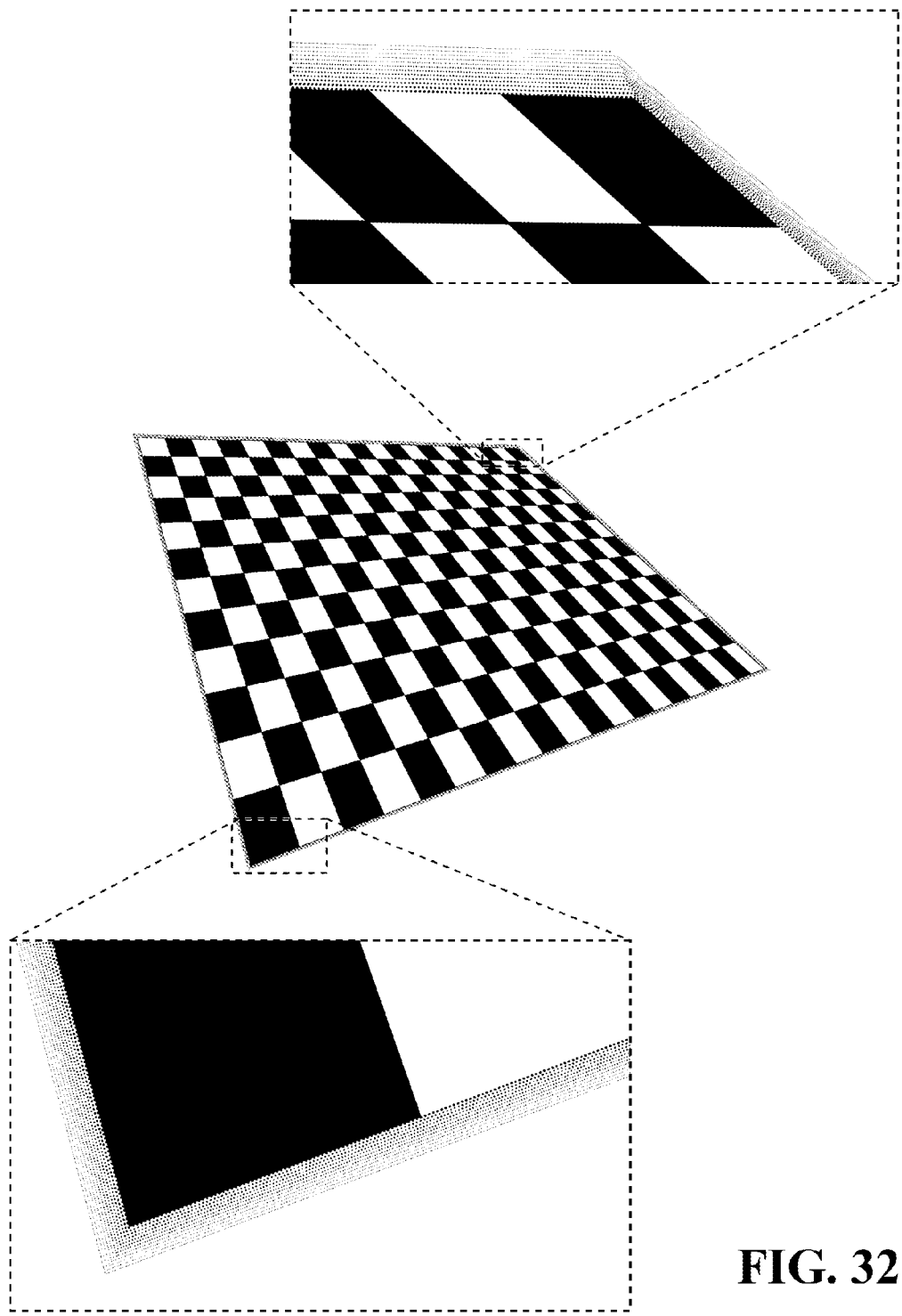

FIG. 29 shows a shaping alpha generated using the implementation discussed above in relation to FIGS. 24 to 28, with $\Delta_{tgt}=1.5$. The black area represents shaping alpha values $\alpha_{shp}$ of 0 (outside the transformed source image), the white area represents shaping alpha values $\alpha_{shp}$ of 1 (inside the transformed source image), and the spaced black dots represent shaping alpha values $\alpha_{shp}$ of between 0 and 1 (on the border of the transformed source image). FIG. 30 is the transformed source image mixed with a white background using the shaping alpha of FIG. 29. FIGS. 31 and 32 respectively correspond to FIGS. 29 and 30, but with $\Delta_{tgt}=10.5$ instead. In both cases ($\Delta_{tgt}=1.5$ or $\Delta_{tgt}=10.5$), all edges of the transformed source object are uniform soft.

It will be appreciated that FIGS. 29 to 32 are black and white drawings meant to represent the actual digital photographs of actual simulated results. These drawings are simplified in some aspects compared to the actual photographs. It should also be appreciated that similar or different results could be obtained under different simulation conditions and/or actual operating conditions.

In the examples described with respect to FIGS. 29 to 32, top and bottom edges of the transformed source image lean on the x-axis and have long ramps horizontally, roughly 10-pixels long for the case of $\Delta_{tgt}=1.5$ and more than 40 pixels long for the case of $\Delta_{tgt}=10.5$. However, they have suitable sizes for vertical softness range: roughly 1-2 pixels wide for the case of $\Delta_{tgt}=1.5$, and roughly 10-11 pixels wide for the case of $\Delta_{tgt}=10.5$. The left and right edge of the transformed source image are almost equally inclined to the x-axis and y-axis and the soft areas in both directions are similar: roughly 1-3 pixels wide for the case of $\Delta_{tgt}=1.5$, and roughly 10-18 pixels wide for the case of $\Delta_{tgt}=10.5$. Both cases use arithmetic multiplication fuzzy logic-AND (FIG. 28), which gives a more rounded corner effect. This is in contrast to arithmetic minimum for fuzzy logic-AND (FIG. 27), which leads to a sharp-angled corner effect.

Figure 33:
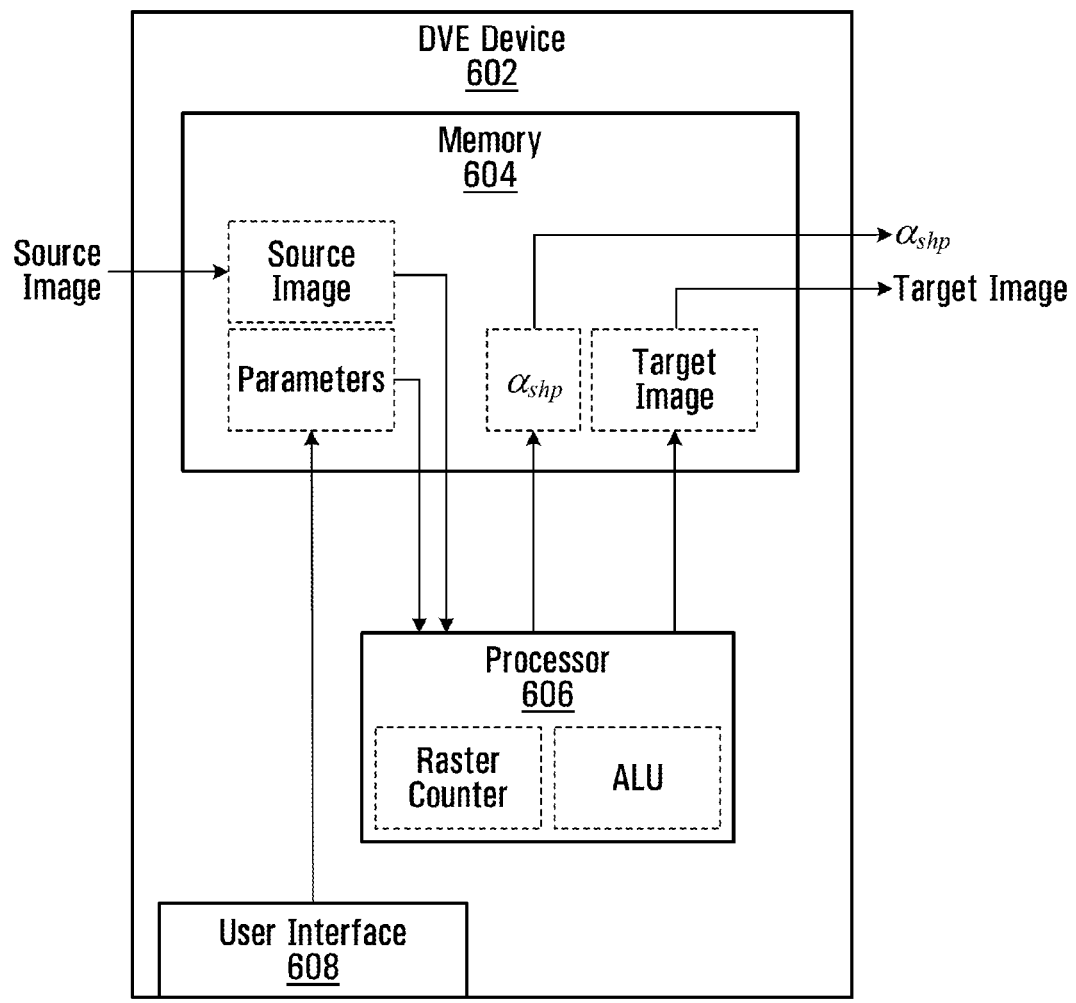
FIG. 33 illustrates another example DVE device.

With reference again to FIGS. 25 to 28, these figures can be considered as illustrating a field programmable gate array (FPGA) or application specific integrated circuit (ASIC) implementation in that separate computation circuitry (e.g. adding/multiplication circuitry) is illustrated. For example, in FIG. 26, four identical computational blocks 502 to 508 are illustrated, one for each boundary of the source image. In an alternative embodiment, the computations above, and in particular the computations performed by the perspective transform engine 308 and shaping alpha generator 326, may instead be performed by a general processor having the relevant parameters stored in memory and instructions stored in memory that, when executed, cause the processor to perform the computations. An example of such a DVE device is illustrated in FIG. 33. As shown in FIG. 33, a DVE device 602 includes a memory 604, a processor 606, and a user interface 608. The memory 604 stores the source image and the parameter values corresponding to the specific effect requested by the user via the user interface 608 (e.g. the specific values of $T_a$, $T_b$, $T_c$, $T_d$, $T_e$, $T_f$, $T_g$, $T_h$, $P_a$, $P_b$, $P_c$, $P_d$, and f for the effect requested by the user). The processor 606 performs the computations to generate the target image and the shaping alpha in the manner described above. For example, the processor 606 can perform the equivalent of the computations performed by filter 302, perspective transform engine 308, shaping alpha generator 326, and interpolator 316 in the DVE device 320 of FIG. 24. The parallel computational blocks, such as blocks 502, 504, 506, and 508 would generally not exist (i.e. the computations would be performed in serial), although depending upon the sophistication of the processor 606, some parallel operations may be possible.

The processor 606 may be, for example, a central processing unit (CPU), a graphics processing unit (GPU), or general-purpose computing on graphics processing units (GPGPU).

The benefit of the field programmable gate array (FPGA) or application specific integrated circuit (ASIC) implementation is that it can generally execute the computations faster, making it more desirable for real-time processing, such as when producing a live video (live production). The general processor implementation shown in FIG. 33 is perhaps better suited for non-real-time video post-production (i.e. not live video production).

Although specific illustrated embodiments have been described above, variations and alternatives will be apparent. Some variations and alternatives are discussed above. Other example variations and alternatives are mentioned below for completeness.

In the embodiments above, it is assumed that each source image and corresponding target image is a component (e.g. a field or frame) of digital video, where the digital video comprises a series of digital images displayed in rapid succession. In a non-video environment, one could perform the methods above with digital images (e.g. a digital picture) to perform an effect on one or more digital images. This may be useful, for example, in a computer graphics application, such as (for example) in polygon rendering or texture mapping around edges in computer graphics to produce an anti-aliasing effect.

In the example shaping alpha computation described above, a pre-alpha value $\alpha'_i(x_s, y_s)$ is first computed via Equation 27 as $$\alpha'_i(x_s, y_s) = \frac{\Delta D_i}{\Delta^i_{src}} = \begin{cases} \frac{\Delta x}{\Delta^x_{src}} = \begin{cases} \frac{x_s - C_L}{\Delta^L_{src}} i = L(\text{left edge}) \\ \frac{C_R - x_s}{\Delta^R_{src}} i = R(\text{right edge}) \end{cases} \\ \frac{\Delta y}{\Delta^y_{src}} = \begin{cases} \frac{y_s - C_T}{\Delta^T_{src}} i = T(\text{top edge}) \\ \frac{C_B - y_s}{\Delta^B_{src}} i = B(\text{bottom edge}) \end{cases} \end{cases}$$

In an alternative embodiment, an initial offset value $\alpha_0$ may be added, such that Equation 27 above is instead:

$$\alpha'_i(x_s, y_s) = \frac{\Delta D_i}{\Delta^i_{src}} + \alpha_0 = \quad \text{(Equation 36)}$$

$$\begin{cases} \frac{\Delta x}{\Delta^x_{src}} + \alpha_0 = \begin{cases} \frac{x_s - C_L}{\Delta^L_{src}} + \alpha_0, i = L(\text{left edge}) \\ \frac{C_R - x_s}{\Delta^R_{src}} + \alpha_0, i = R(\text{right edge}) \end{cases} \\ \frac{\Delta y}{\Delta^y_{src}} + \alpha_0 = \begin{cases} \frac{y_s - C_T}{\Delta^T_{src}} + \alpha_0, i = T(\text{top edge}) \\ \frac{C_B - y_s}{\Delta^B_{src}} + \alpha_0, i = B(\text{bottom edge}) \end{cases} \end{cases}$$

Figure 34:
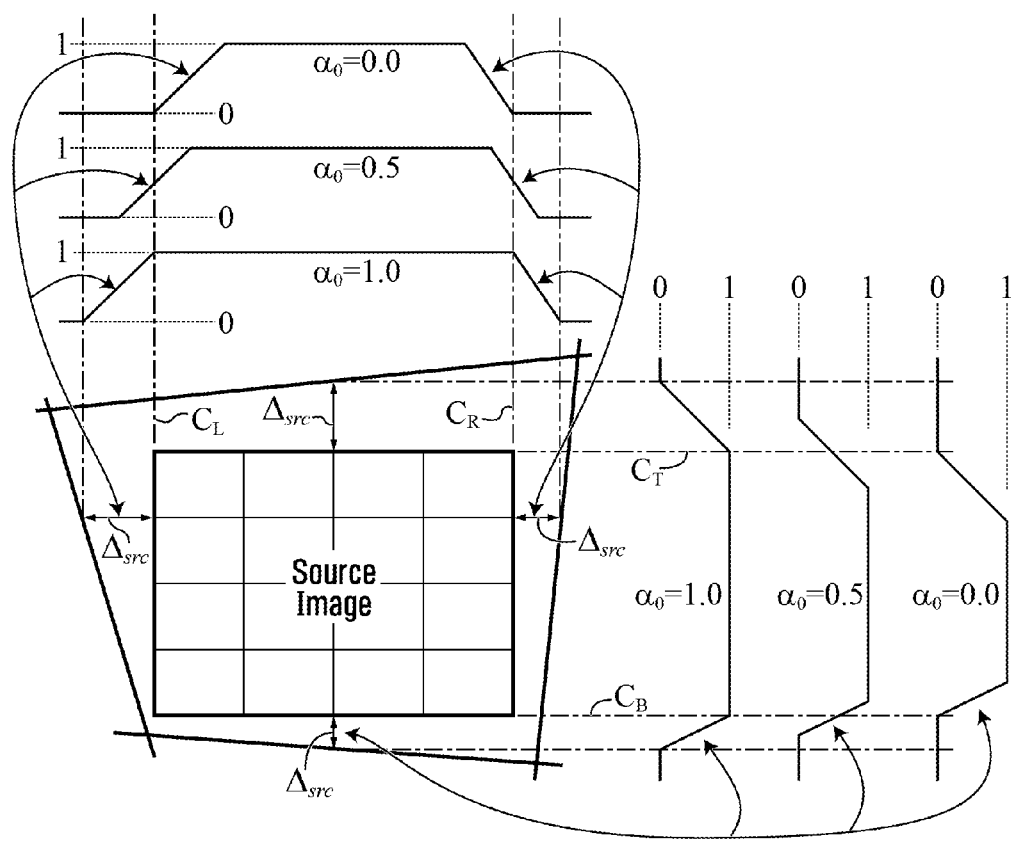
FIG. 34 illustrates the effect of the initial offset value.

The initial offset value $\alpha_0$ is between 0 and 1, and in some embodiments the exact value of the initial offset value $\alpha_0$ may be controlled by the user through the user interface (e.g. user interface 608 or 314). The initial offset value $\alpha_0$ is an effect. Specifically, it causes the softness range to shift inside or outside the target object. For example, when $\alpha_0=0$, the alpha curve (softness range) starts from the source cropping boundary edge and inwardly ramps up, when $\alpha_0=0.5$, the alpha curve (softness range) starts from the outside of the source cropping boundary edge and inwardly ramps up but ends up at the inside of the source image, and when $\alpha_0=1$ the alpha curve (softness range) starts from the outside of the source cropping boundary edge and ends up just at the cropping boundary edge. This is illustrated in FIG. 34.

In short, the initial offset value $\alpha_0$ shifts where the softness area is located relative to the boundary of the target object. The higher the initial offset value $\alpha_0$, the more outwardly extended the softness area is. It will be appreciated that in some embodiments, a different initial offset value $\alpha_{0,i}$ may be chosen for each boundary, if desired.

As mentioned above, the initial offset value $\alpha_0$ can be considered an effect. However, in some embodiments it also plays a role in preventing a warped picture from protruding too much. This is explained below with respect to FIGS. 35 to 37.

Figure 35:
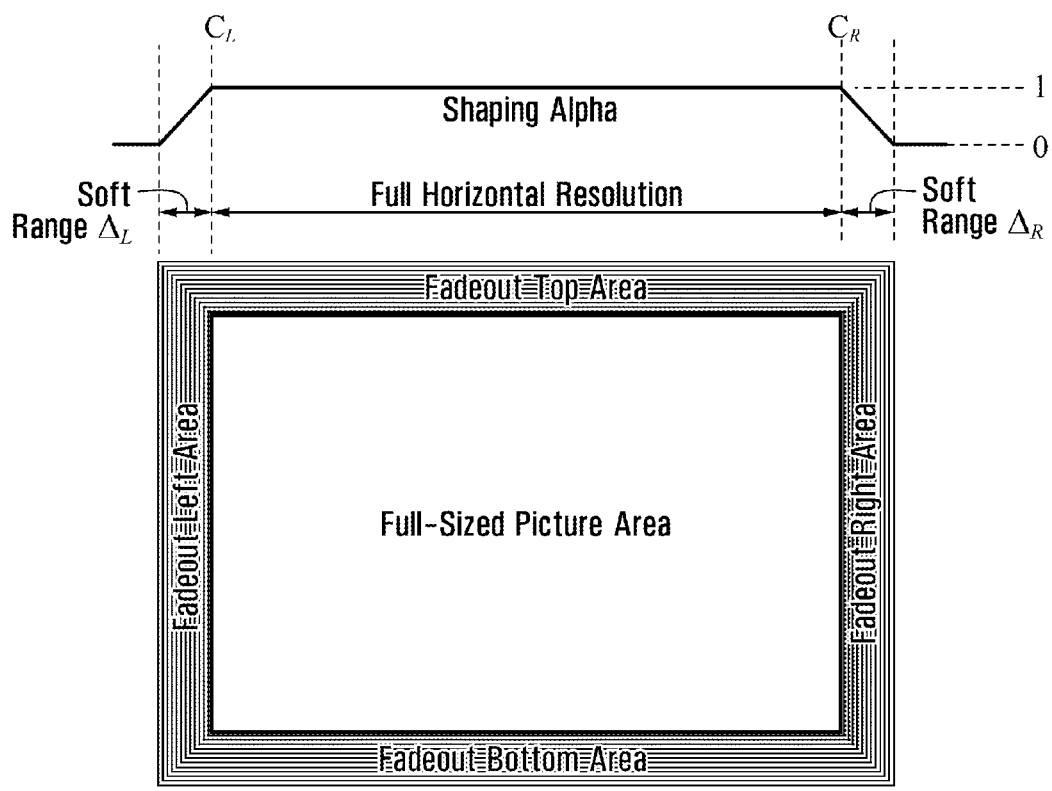
FIG. 35 illustrates a full-sized picture area with softness outside the picture area.

A larger positive initial offset value $\alpha_0$ keeps the ramping (softness area) towards the outside of the picture area and therefore leaves pixels near boundaries of the picture intact or with fewer fadeouts. In most cases, it is preferred that all of the picture content is visible, rather than the fading (semi-transparency) happening too much inside the picture boundary and having some of the picture parts fade out. This is shown in FIG. 35, in which a full-sized picture is completely visible and the softness area (i.e. ramping/fadeout) occurs completely outside the picture.

Figure 36:
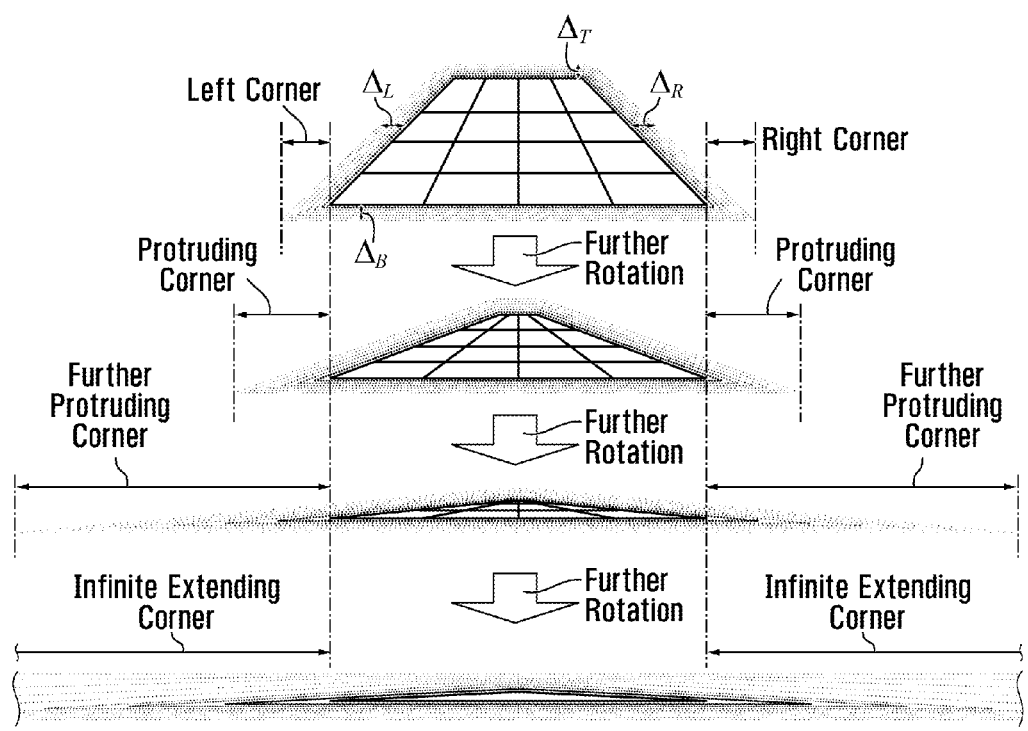
FIG. 36 illustrates the problem of extreme protruding corners.

However, in cases in which the picture is extremely warped by an effect, the uniform softness around the target object in the target image (e.g. target object 123) may produce some protruding corners. This is illustrated in FIG. 36, in which left and right bottom corners have softness areas that protrude outwardly with rotation around the x-axis and may produce unacceptable effects. A particularly bad case is illustrated at the bottom of FIG. 36, in which the plane is rotated enough to make both left and right cropping lines almost parallel to the top and bottom, which causes the left and right corners to extend substantially infinitely outwards.

The initial offset value $\alpha_0$ may be used to help address this problem.

One method of using the initial offset value $\alpha_0$ in order to accommodate both "normal" cases (not extreme warping), and "extreme warping" cases is as follows. The initial offset value $\alpha_0$ can be varied between 0 and 1 during operation depending upon the effect (particularly the rotation angle) so that, when necessary, the ramping (the softness area) may be moved completely inside the picture to eliminate extreme protruding corners. By moving the softness area completely inside the picture, the protruding corners would then be outside the softness area and would have an alpha shaping value of zero and so would be transparent. On the other hand, when the effect is such that there is no such problematic protruding corners, the ramping (the softness area) may instead be completely outside the picture to let the entire picture contents display with no fading of any of the picture contents. Depending upon the effect (the amount of protruding corners), the initial offset value $\alpha_0$ can also be chosen as somewhere between 0 and 1.

Figure 37:
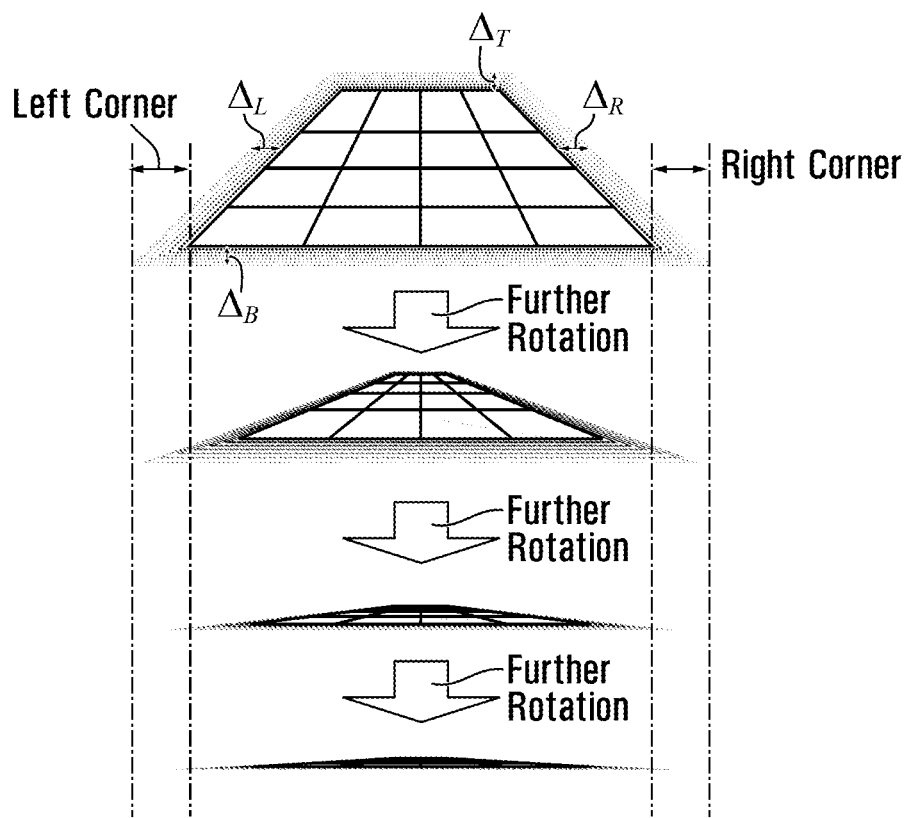
FIG. 37 illustrates the result when an initial offset value is applied to suppress protruding corners.

FIG. 37 illustrates the result when the initial offset value $\alpha_0$ is applied to suppress protruding corners when the effects shown in FIG. 36 are applied.

One way to achieve the above is to compute an appropriate corresponding initial offset value $\alpha_0$ each time the transformation parameters are computed (i.e. each time $M^{-1}$ and the value of f are computed). One such example computation of the initial offset value $\alpha_0$ for a given set of parameters is as follows:

First define a ratio R as:

$$R = \begin{cases} \frac{|P_b W - T_b|}{\text{WIDTH}/2}, & \text{if } |P_a W - T_a| < |P_b W - T_b| \text{ horizontally} \\ \frac{|P_b W - T_a|}{\text{WIDTH}/2}, & \text{else} \\ \frac{|P_b H - T_f|}{\text{HEIGHT}/2}, & \text{if } |P_a H - T_e| < |P_b H - T_f| \text{ vertically} \\ \frac{|P_a H - T_e|}{\text{HEIGHT}/2}, & \text{else} \end{cases} \quad \text{(Equation 37)}$$

where "WIDTH" is the horizontal resolution and "HEIGHT" is the vertical resolution. The other parameters have been introduced earlier.

Then, the initial offsets for the horizontal and vertical boundaries are determined, respectively, as:

$$\alpha_0^H = \begin{cases} 1 - \frac{R}{T_{min}} & \text{if } R < T_0 \quad \text{at } |P_a W - T_a| < |P_b W - T_b| \\ 0 & \text{else} \\ 1 - \frac{R}{T_{max}} & \text{if } R < T_1 \quad \text{at } |P_a W - T_a| \geq |P_b W - T_b| \\ 0 & \text{else} \end{cases} \quad \text{(Equation 38)}$$

and $$\alpha_0^V = \begin{cases} 1 - \frac{R}{T_{min}} & \text{if } R < T_0 \quad \text{at } |P_a H - T_e| \geq |P_b H - T_f| \\ 0 & \text{else} \\ 1 - \frac{R}{T_{max}} & \text{if } R < T_1 \quad \text{at } |P_a H - T_e| < |P_b H - T_f| \\ 0 & \text{else} \end{cases} \quad \text{(Equation 39)}$$

where $T_{min} < T_{max}$. The specific values for $T_{min}$ and $T_{max}$ are implementation specific and may be determined through experimentation. The thresholds $T_0$ and $T_1$ are also implementation specific. In one implementation, these values are as follows $T_0 = T_{min} = 0.2$ and $T_1 = T_{max} = 0.5$.

Note that the conditions in Equations 38 and 39 are opposite because vertical source boundaries (left and right sides) require a smaller threshold $T_0$ but horizontal source boundaries (top and bottom sides) require a larger threshold $T_1$ when rotation is beyond 45 degrees.

The initial offset value $\alpha_0$ is then chosen as:

$$\alpha_0 = \min\{\alpha_0^H, \alpha_0^V\} \quad \text{(Equation 40).}$$

By using as the initial offset value $\alpha_0$ the minimum of $\alpha_0^H$ and $\alpha_0^V$, this prioritizes an alpha shaping ramp inside the picture boundary.

The above is one example way to use and compute an initial offset value $\alpha_0$. More generally, the computation of the initial offset value $\alpha_0$ comprises: for a given effect (set of parameters), computing a ratio R based on the boundary line rotation angle (or more generally, based on the effect chosen by the user, which determines the boundary line rotation angle), and then computing horizontal and vertical offset values using the ratio R, and then choosing as the initial offset value $\alpha_0$ the minimum of the horizontal and vertical offset values.

The variation of having an initial offset value $\alpha_0$ is described above. As another example, in another embodiment there may instead (or in addition) be a global transparency clipping function, which may be combined with the shaping alpha $\alpha_{shp}$ to provide a transparency effect (e.g. for dissolving the target object into the background). This may be applied as follows:

$$\alpha_{shp}' = \begin{cases} \alpha_{Tran}, & \alpha_{shp} > \alpha_{Tran} \\ \alpha_{shp}, & \alpha_{shp} \leq \alpha_{Tran} \end{cases} \quad \text{(Equation 41)}$$

where $\alpha_{Tran}$ is a value between 0 and 1. In some embodiments the exact value of $\alpha_{Tran}$ may be controlled by the user through the user interface (e.g. user interface 608 or 314). The use of $\alpha_{Tran}$ is an effect. As is clear from Equation 41, it clips the shaping alpha value so that the shaping alpha value can never be greater than $\alpha_{Tran}$. Therefore, if $\alpha_{Tran}$ is less than one, the whole target object will be semi-transparent. If $\alpha_{Tran}=0$ then the target object is completely transparent and only the background is shown. If $\alpha_{Tran}=1$ then no additional effect is provided (i.e. it is as if $\alpha_{Tran}$ is not being used).

Figure 38:
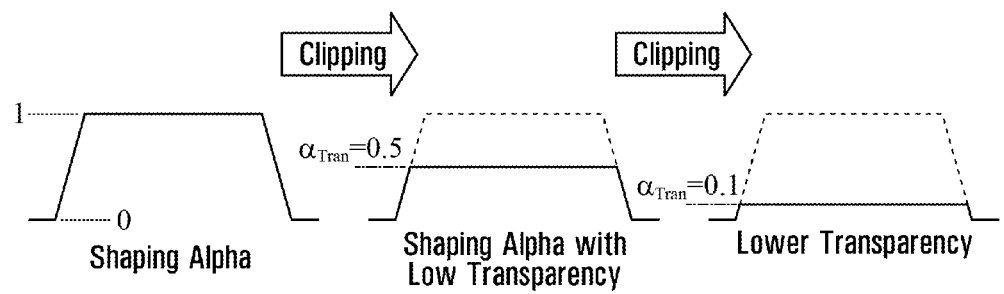
FIG. 38 illustrates a shaping alpha clipped to form a shaping alpha with different global transparency.

As an example, FIG. 38 illustrates a shaping alpha $\alpha_{shp}$ clipped by threshold 0.5 and 0.1 to form a shaping alpha with different global transparency.

Figure 39:
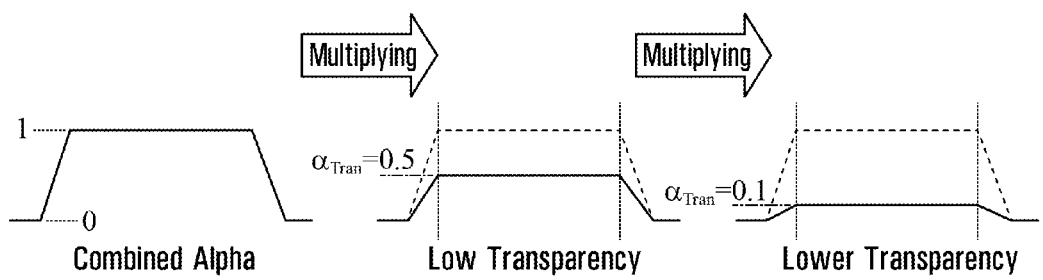
FIG. 39 illustrates a shaping alpha modified via arithmetic multiplication to form a shaping alpha with different global transparency.

In other embodiments, the global transparency clipping function may be replaced more generally with a fuzzy logic AND function: $\alpha_{shp}'=\alpha_{Tran} \cap \alpha_{shp}$ where $\alpha_{Tran} \in [0,1]$. Equation 41 above is one implementation of the fuzzy logic AND in which an arithmetic minimum is taken (i.e. $\alpha_{shp}'=\min(\alpha_{Tran},\alpha_{shp})$). Another implementation may be, for example, $\alpha_{shp}'=\alpha_{Tran}\alpha_{shp}$ (i.e. arithmetic multiplication), which is illustrated with respect to FIG. 39.

Figure 40:
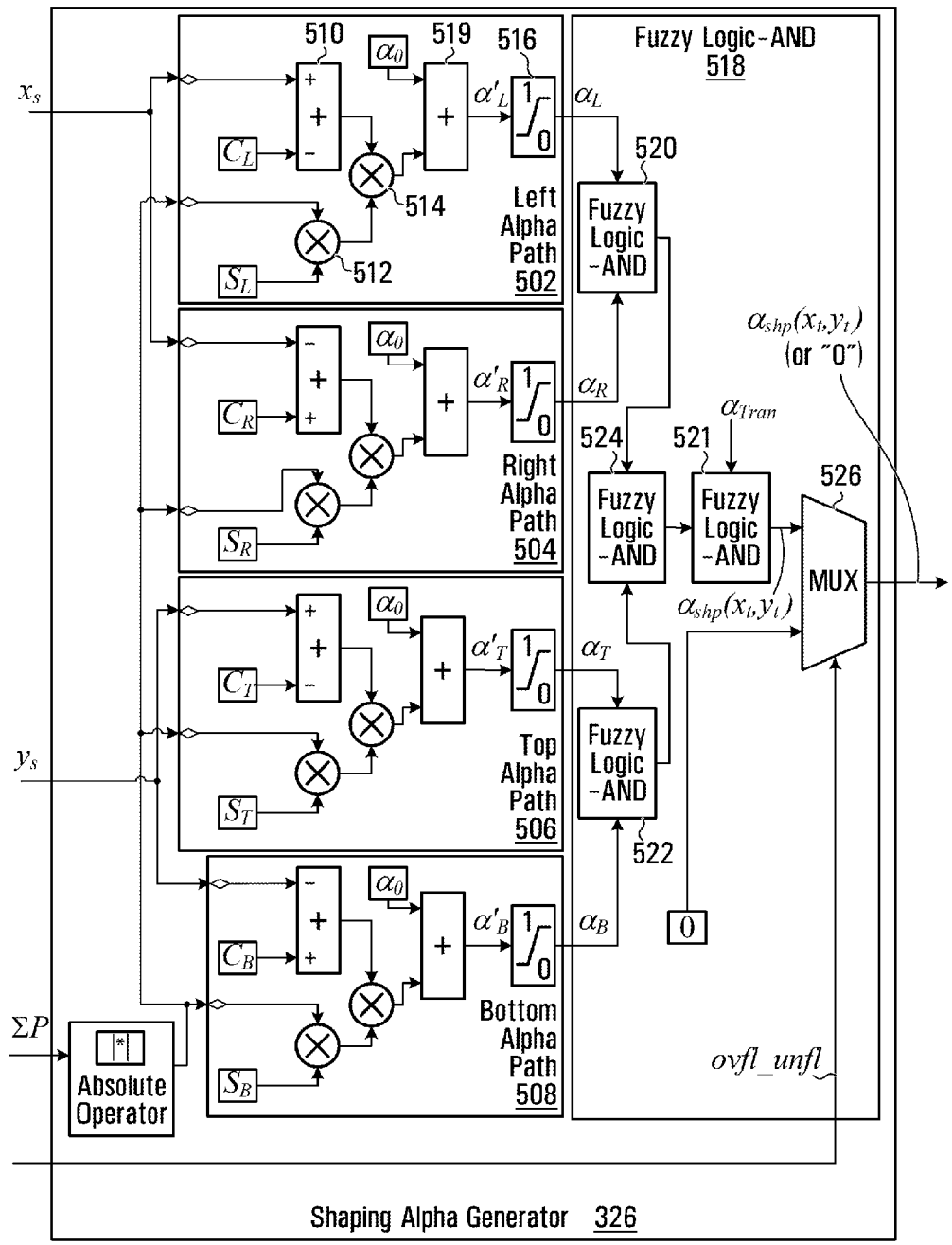
FIG. 40 illustrates an example shaping alpha generator further modified to apply an initial offset value effect and a global transparency effect.

FIG. 40 illustrates the FIG. 26 example further modified to also apply the initial offset value $\alpha_0$ effect and the global transparency $\alpha_{Tran}$ effect. As can be seen from FIG. 40, it is the same as FIG. 26, except now there is additionally an adder 519 for adding in the initial offset value $\alpha_0$, and a fuzzy logic AND 521 for applying the global transparency effect (e.g. for applying Equation 41 if the fuzzy logic AND is implemented as an arithmetic minimum). In an alternative embodiment in which the initial offset value $\alpha_0$ is individually set for each boundary, then $\alpha_0$ in processing path 502 would be replaced with $\alpha_0^L$, which is uniquely set for that processing path, and the same would be the case for the other processing paths (i.e. $\alpha_0$ in processing path 504 would be replaced with a value $\alpha_0^R$ that is uniquely set for processing path 504, $\alpha_0$ in processing path 506 would be replaced with a value $\alpha_0^T$ that is uniquely set for processing path 506, and $\alpha_0$ in processing path 508 would be replaced with a value $\alpha_0^B$ that is uniquely set for processing path 508). In the embodiment in FIG. 40, for each alpha processing path, $\alpha_i'=S_i|\Sigma P|\Delta D_i+\alpha_0$, or, for embodiments in which the initial offset value $\alpha_0$ is individually set for each boundary, then $\alpha_i'=S_i|\Sigma P|\Delta D_i+\alpha_{0,i}$, where i=L, R, T, B.

The above describes some specific embodiments, including some specific example computations using an assumed set of parameters and mapping function (e.g. $M^{-1}$).

Figure 41:
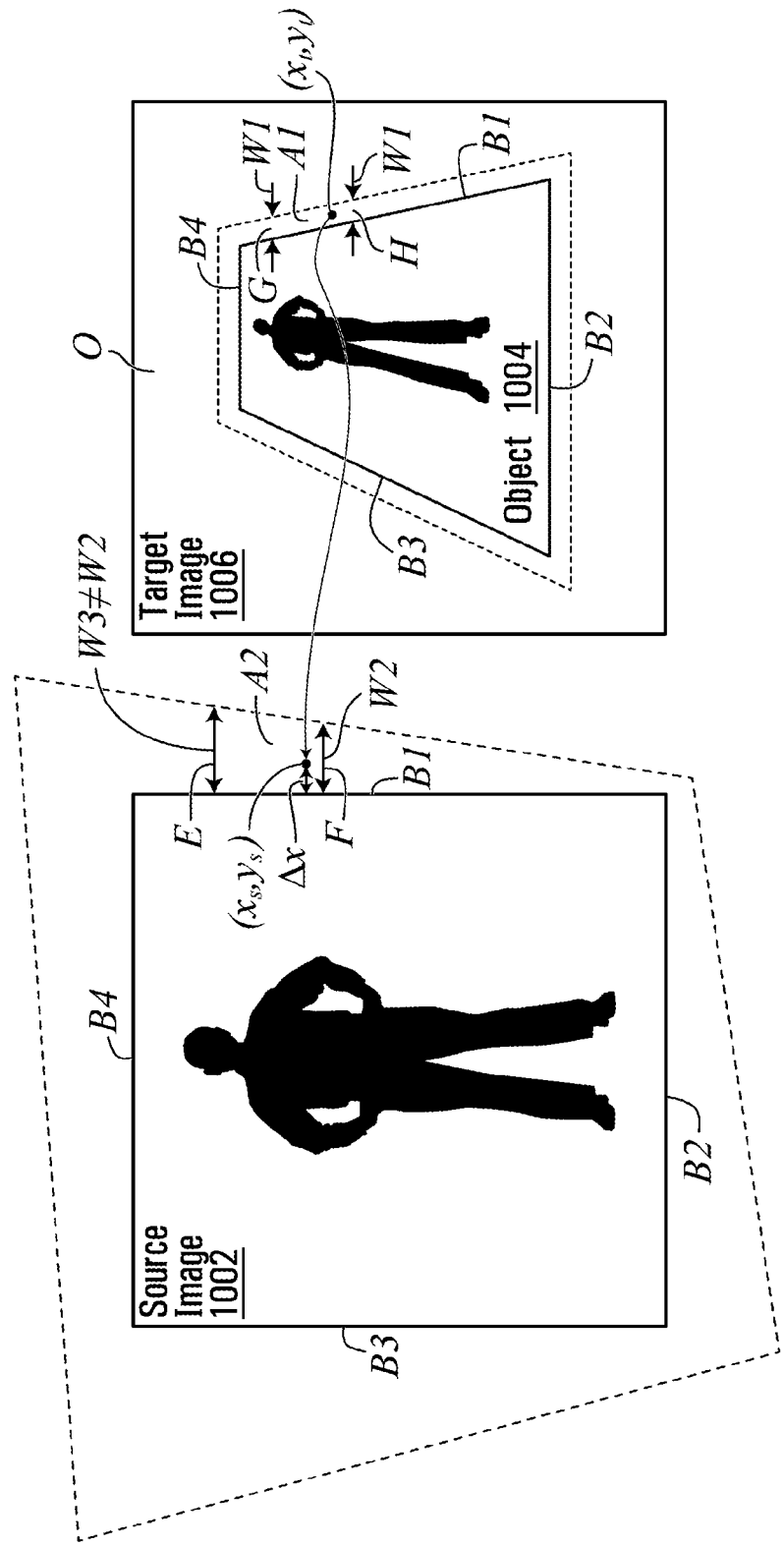
FIG. 41 illustrates mapping of a pixel coordinate from a target image to a source image.

Please now consider FIG. 41, which is described more generally in view of, and in addition to, the foregoing.

With reference to FIG. 41, a source digital image 1002 is illustrated, which comprises a plurality of pixels. It is transformed by a computational device into a digital object 1004 in a target digital image 1006. The target digital image 1006 also comprises a plurality of pixels. In general, some of the pixels of the target digital image 1006 will be within source bounds (i.e. within object 1004) and others will be outside source bounds (i.e. in area O of the target digital image 1006). This scenario is illustrated in FIG. 41, it being understood that this is a generality. It could be the case, for example, that the object 1004 comprises all of target digital image 1006. For example, in a mixing application, the object 1004 could encompass the whole target digital image 1006 and therefore lie completely over the background (when mixed with a background image or video), with the target image having some semi-transparency to reveal some or all of the background to some degree.

The source digital image 1002 is defined by four boundaries B1, B2, B3, and B4. These boundaries may be boundaries of the original source image, or they may be cropping boundaries from previous cropping of the source image 1002. Each one of these four boundaries respectively corresponds to one of four boundaries of the digital object 1004 in the target digital image 1006.

Bordering a boundary of the digital object 1004 is an area A1 having a width W1 uniform along at least that boundary. This area A1 defines the softness range or softness margin of the boundary of the object 1004. In FIG. 41, the area A1 has a width W1 that is uniform along boundary B1 of the object 1004. Also, in FIG. 41, the uniform width is the same around all boundaries of the object 1004. However, in general, this need not be the case. As one example, the width of the area bordering boundary B2 of the digital object 1004 could be different from width W1. Also, in general, the width of the area bordering the digital object 1004 does not necessarily have to be uniform along all boundaries of the digital object 1004, only along at least one boundary (e.g. boundary B1 of the digital object 1004). Also, in general, it could be the case that not all boundaries of the digital object 1004 have a softness area bordering that boundary, for example, if a softness range is not needed or desired at a particular boundary.

The width W1 of area A1 is uniform in that the number of pixels in the target image 1006 between the boundary B1 of the object 1004 and an edge of the border, measured along a coordinate axis (in this case along the x-coordinate axis), is the same at each point or location along the boundary. This is shown in FIG. 41, in which the width of the area A1 at G and H is the same (W1). The uniform width W1 is defined by a value $\Delta$ that in some embodiments may be received by or based upon an input by the user.

A pixel coordinate $(x_t,y_t)$ of the target image 1006 that is within the area A1 is mapped to a corresponding source pixel coordinate $(x_s,y_s)$ that is within another area A2 bordering the source digital image 1002. This mapping may involve computing the corresponding source pixel coordinate using parameters obtained based on the effect requested by the user and applying those parameters to the target pixel coordinate. Because of the use of an area A1 of uniform width in the target image 1006, the area A2 bordering the boundary of the source image 1002 has a width that is non-uniform along a corresponding boundary of the source image 1002. This width is non-uniform in that the number of source pixels between the boundary of the source digital image 1002 and an edge of the border, measured along a coordinate axis, is different at two different points (locations) along the boundary of the source digital image 1002. This is shown in FIG. 41, in which the width at points E and F are different (specifically at E the width is W3, and at F the width is W2≠W3).

Area A1 (and corresponding area A2) define a range or area of "softness" around the object 1004. A shaping alpha channel defines the amount of the "softness". Specifically, each shaping alpha channel value defines the semi-transparency of a respective pixel associated with a pixel coordinate $(x_t,y_t)$ of the target digital image 1006. In particular, for the target pixel coordinate $(x_t,y_t)$ in area A1 of the target image 1006, the pixel is mapped to a corresponding source pixel coordinate $(x_s,y_s)$ in area A2, and the alpha channel value for that target pixel coordinate $(x_t,y_t)$ is then computed as a function of the location of the corresponding source pixel coordinate $(x_s,y_s)$ in area A2. For example, in one embodiment, the alpha channel value is computed as a function of: (i) a distance between the corresponding source pixel coordinate $(x_s,y_s)$ and the boundary of the source digital image 1002 and (ii) the width of area A2 at the location of the corresponding source pixel coordinate $(x_s,y_s)$. In FIG. 41, the distance between the corresponding source pixel coordinate $(x_s,y_s)$ and the boundary B1 is measured along the coordinate axis perpendicular to the boundary (which is the x-axis in the FIG. 41 illustrated example this is shown as Δx as an example).

This method of computing the alpha channel value for the target pixel coordinate $(x_t,y_t)$ can be repeated for each target pixel coordinate in the softness area bordering the target digital object 1004.

By using the approach above to compute the alpha channel values for the target pixels in the softness area bordering the digital object 1004, the result is an ability to have a more uniform range of softness around the object 1004 in the target image 1006, since a uniform area A1 is defined to result in an area of uniform width (e.g. width W1) bordering a boundary of the object 1004, and then the appropriate alpha channel values are computed based on this. Specifically, an alpha channel value for a pixel coordinate $(x_t,y_t)$ of the target image 1006 in the uniform softness area A1 is computed as a function of the location of the corresponding source pixel coordinate $(x_s,y_s)$ in the area A2 of non-uniform width bordering the source image 1004).

Figure 42:
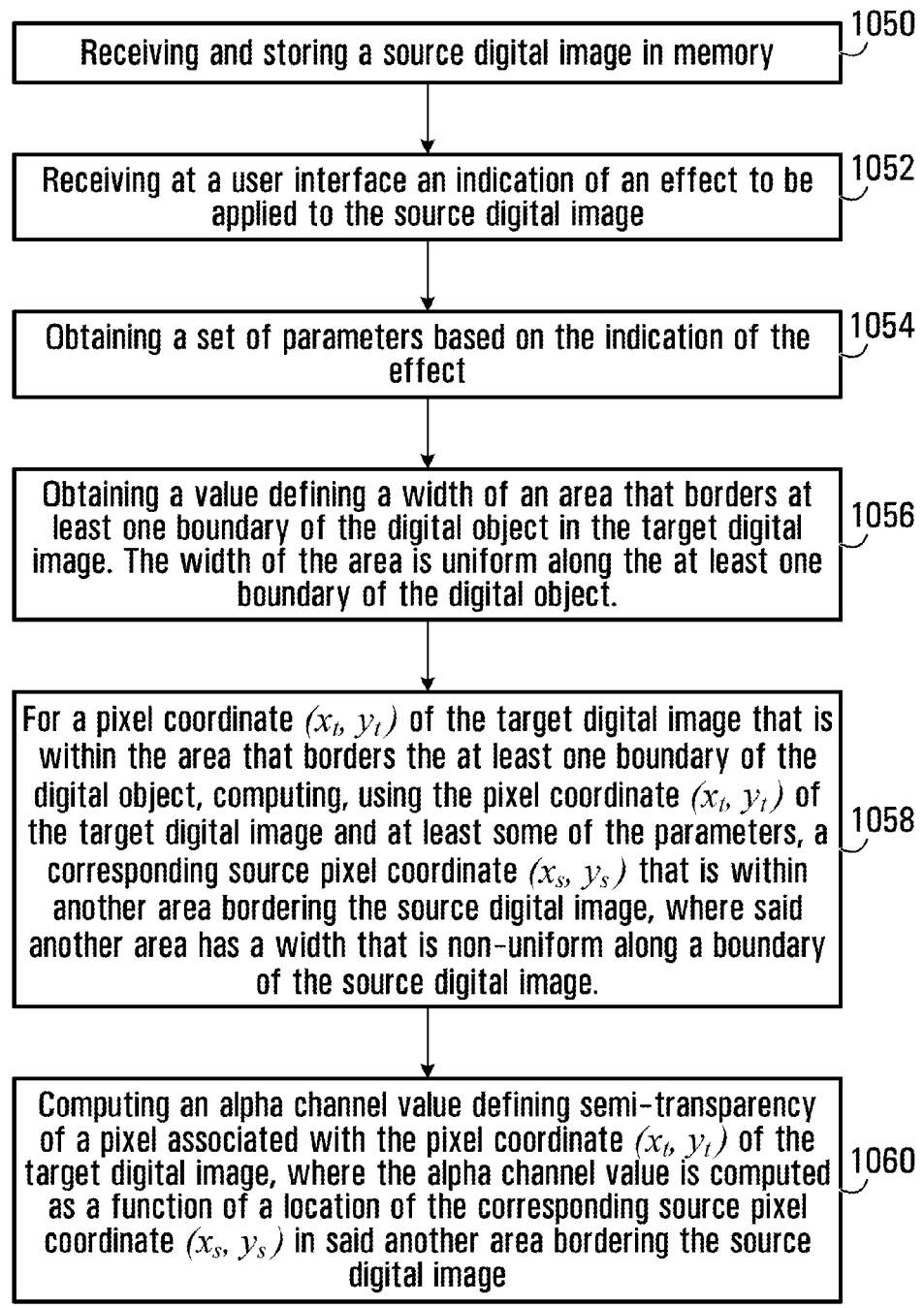
FIG. 42 illustrates an example method of computing an alpha channel value.

Example devices for performing the method above are disclosed, for example, in FIGS. 24 and 33. However, it will be appreciated that more generally, a computational device does not have to have all of the specific components shown in the examples of FIGS. 24 and 33. One example method is illustrated in FIG. 42, in which the computational device has a memory, a user interface, and some sort of processing circuitry for performing the computations. This example method is as follows. In step 1050, a source digital image is received and stored in the memory. In step 1052, there is received at the user interface an indication of an effect to be applied to the source digital image. In step 1054, a set of parameters are obtained based on the indication of the effect. In step 1056, a value is obtained that defines a width of an area that borders at least one boundary of the digital object in the target digital image (e.g. area A1). The width of the area is uniform along the at least one boundary of the digital object. In step 1058, for a pixel coordinate $(x_t,y_t)$ of the target digital image that is within the area that borders the at least one boundary of the digital object, a corresponding source pixel coordinate $(x_s,y_s)$ that is within another area bordering the source digital image is computed, using the pixel coordinate $(x_t,y_t)$ of the target digital image and at least some of the parameters. This "another area" (e.g. area A2) has a width that is non-uniform along a boundary of the source digital image. In step 1060, an alpha channel value is computed that defines the semi-transparency of a pixel associated with the pixel coordinate $(x_t,y_t)$ of the target digital image. As explained above, the alpha channel value is computed as a function of a location of the corresponding source pixel coordinate $(x_s,y_s)$ in said another area bordering the source digital image.

Figure 43:
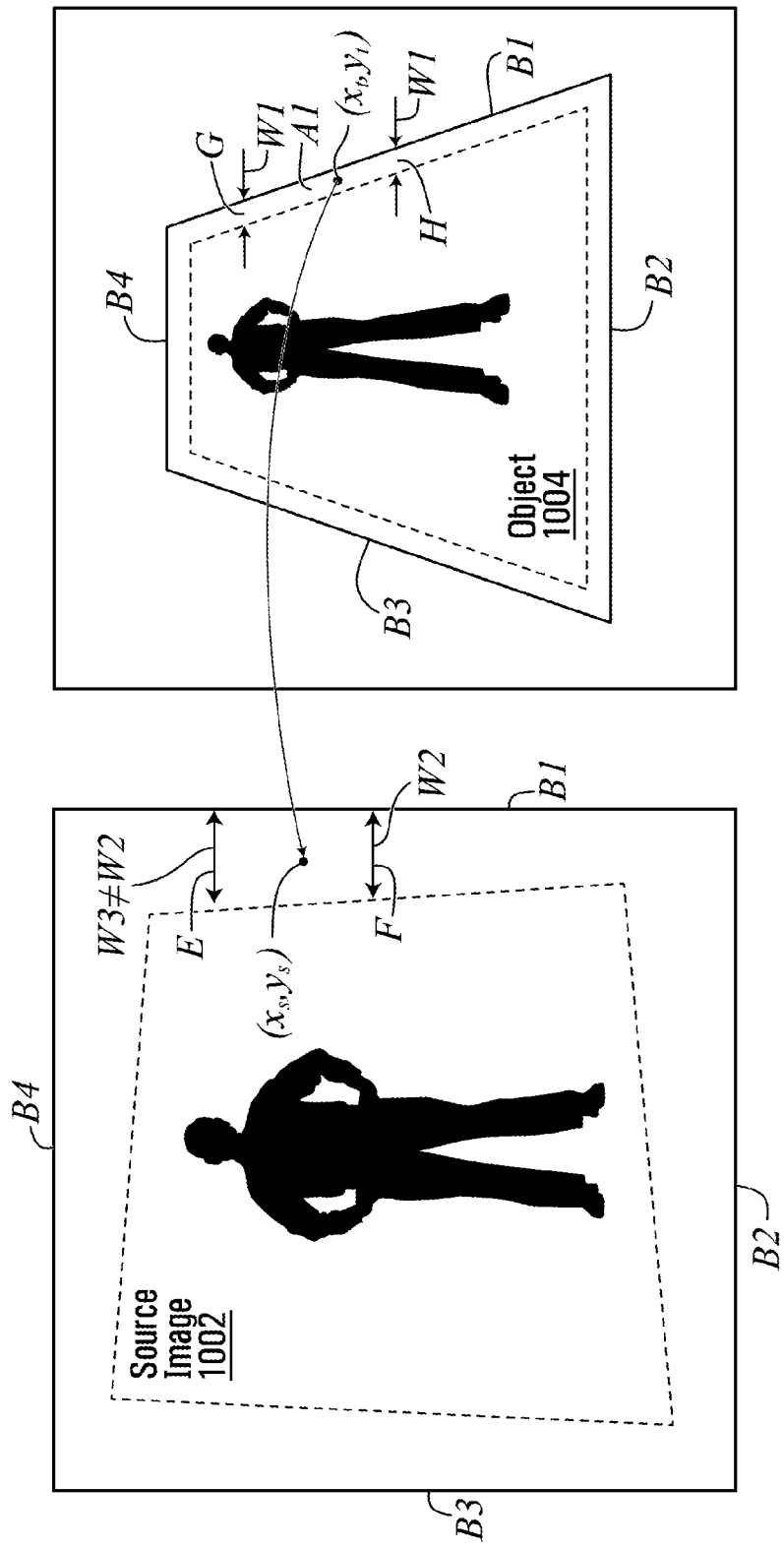
FIG. 43 illustrates another mapping of a pixel coordinate from a target image to a source image.

FIG. 41 assumes outward ramping (like FIG. 15) with the softness area outside the border of the picture. Inward ramping is also possible and the method described above still applies. FIG. 43 shows the inward ramping variation with the softness area inside the boundary of the picture.

Some general embodiments will now be described.

In one embodiment, a method for computing an alpha channel value is provided. In this method, a set of parameters is obtained based on an effect (transformation) to be applied to a source image. A value is also obtained that defines a uniform width of an area that borders at least one boundary of the transformed source image in the target image. For a target image pixel coordinate in the area, a corresponding source pixel coordinate is computed that is within another non-uniform area bordering the source image. An alpha channel value defining semi-transparency of a pixel associated with the target image pixel coordinate is computed as a function of a location of the corresponding source pixel coordinate in the another area bordering the source image.

In one example embodiment, the method is performed by a computational device, and the method is performed as part of transforming a source digital image into a digital object in a target digital image. The source digital image and the target digital image each comprise a plurality of pixels. The method comprises the following steps: (i) receiving an indication of an effect to be applied to the source digital image; (ii) obtaining a set of parameters based on the indication of the effect; (iii) obtaining a value defining a width of an area that borders at least one boundary of the digital object in the target digital image; the width of the area is uniform along the at least one boundary of the digital object; (iv) for a pixel coordinate $(x_t,y_t)$ of the target digital image that is within the area that borders the at least one boundary of the digital object, computing, using the pixel coordinate $(x_t,y_t)$ of the target digital image and at least some of the parameters, a corresponding source pixel coordinate $(x_s,y_s)$ that is within another area bordering the source digital image; the another area has a width that is non-uniform along a boundary of the source digital image; and (v) computing an alpha channel value defining semi-transparency of a pixel associated with the pixel coordinate $(x_t,y_t)$ of the target digital image. The alpha channel value is computed as a function of a location of the corresponding source pixel coordinate $(x_s,y_s)$ in the another area bordering the source digital image.

In some embodiments, the value defining the width of the area that borders the at least one boundary of the digital object in the target digital image is controlled by the user via the user interface (e.g. the user inputs a command to the user interface that translates to a specific value of the width of the area that borders the at least one boundary of the digital object in the target digital image).

In some embodiments, the value defining the width of the area that borders the at least one boundary of the digital object in the target digital image may be different for different boundaries of the digital object.

In some embodiments, the effect to be applied to the source digital image is a transformation/modification of the source digital image, such as resizing, rotation, translation, and/or distortion of the source image. The set of parameters obtained based on the indication of the effect are parameters defining the effect (transformation). More specifically, the parameters may define the mapping between target pixel coordinates and source pixel coordinates.

In some embodiments, the "at least one boundary" of the digital object may be all boundaries of the digital object (i.e. a uniform area bordering the entire digital object, as shown in FIG. 41).

In general, the source digital image is defined by four boundaries (e.g. left, right, top, and bottom), and each one of the four boundaries respectively corresponds to one of four boundaries of the digital object in the target digital image.

In some embodiments, the width of the area that borders the at least one boundary of the digital object is defined as the number of pixels in the target image between the at least one boundary of the digital object and an edge of the border, measured along a coordinate axis (e.g. along a coordinate axis perpendicular to the boundary), and the width of said another area that borders the source digital image is defined as the number of source pixels between the boundary of the source digital image and an edge of the border, measured along a coordinate axis (e.g. along a coordinate axis perpendicular to the boundary).

In some embodiments, computing the alpha channel value specifically comprises computing the alpha channel value as a function of: (i) a distance between the corresponding source pixel coordinate $(x_s,y_s)$ and the boundary of the source digital image, and/or (ii) the width of said another area at the location of the corresponding source pixel coordinate $(x_s,y_s)$. The distance between the corresponding source pixel coordinate $(x_s,y_s)$ and the boundary of the source digital image may be measured along a coordinate axis. The coordinate axis may be the coordinate axis that is perpendicular to the boundary.

In some embodiments, the width of said another area at the location of the corresponding source pixel coordinate $(x_s,y_s)$ is a function of the value defining the width of the area that borders the at least one boundary of the digital object in the target digital image, and/or the target pixel coordinate $(x_t,y_t)$, and/or at least some of the parameters.

In some embodiments, the width of the area that borders the at least one boundary of the digital object is uniform along the at least one boundary in that: the number of pixels in the target digital image between the at least one boundary and an edge of the area that borders the at least one boundary, measured along a coordinate axis, is the same at each point along the at least one boundary.

In some embodiments, the width of said another area that borders the source digital image is non-uniform along the boundary of the source digital image in that: the number of source pixels between the boundary of the source digital image and an edge of said another area that borders the source digital image, measured along a coordinate axis, is different at two different points along the boundary of the source digital image.

In some embodiments, the computational device performs: computing, for each one of a plurality of pixel coordinates of the target digital image, a respective corresponding source pixel coordinate. Each target pixel coordinate that is within the area that borders the at least one boundary of the digital object in the target digital image has a corresponding source pixel coordinate that is within said another area bordering the source digital image. In some of such embodiments, it may be that an alpha channel value is computed for each one of the plurality of pixel coordinates of the target digital image in said area.

An alpha channel value may, in some embodiments, be computed as a function of a distance between the respective corresponding source pixel coordinate and the boundary of the source digital image.

In some embodiments, computing the alpha channel value comprises: computing four pre-alpha values, one for each of four boundaries of the source digital image, and obtaining the alpha channel value using the four pre-alpha values.

In some embodiments, each one of the four pre-alpha values may be computed as a function of: (i) the distance between the corresponding source pixel coordinate $(x_s,y_s)$ and a respective one of the four boundaries of the source digital image, and/or (ii) the value defining the width of the area that borders the at least one boundary of the digital object, and/or (iii) the target pixel coordinate $(x_t,y_t)$, and/or (iv) at least some of the parameters.

In some embodiments, the alpha channel value may be computed using four pre-alpha values as inputs to one or more fuzzy logic functions.

In some embodiments, each one of four pre-alpha values may be computed in parallel.

In some embodiments, computing each one of four pre-alpha values comprises: using computational circuitry that is substantially identical to other computational circuitry used to compute each other of the four pre-alpha values; and inputting into the computational circuitry parameter values that are different from parameter values used to compute each other of the four pre-alpha values.

In some embodiments, each one of four pre-alpha values is a function of an initial alpha offset value. The initial offset value may be between 0 and 1.

In some embodiments, the computational device may obtain an intermediary computational result when computing the corresponding source pixel coordinate $(x_s,y_s)$, and then use this intermediary computational result in computing the alpha channel value.

In some embodiments, the source digital image discussed herein may be an image in a source digital video, and the target digital image discussed herein may be an image in a target digital video.

In some embodiments, the alpha channel value is a real number in the range $0 \leq \alpha \leq 1$, where $\alpha$ is the alpha channel value, although more generally, the alpha value does not have to be between zero and one.

In some embodiments, the computational device may compute a pixel value for the pixel coordinate $(x_t,y_t)$ of the target digital image using one or more pixel values in the source digital image that are obtained based on the corresponding source pixel coordinate $(x_s,y_s)$.

In some embodiments, the computational device may combine the alpha channel value with a pixel value for the pixel coordinate $(x_t,y_t)$ of the target digital image to effect transparency of the pixel value and result in a semi-transparent pixel value. The "combining" may comprise multiplying the pixel value for the pixel coordinate $(x_t,y_t)$ with the corresponding alpha channel value, or some other operation (e.g. divisional, addition, some sort of fuzzy logic, etc.). The semi-transparent pixel value may be mixed with a pixel of a background image.

In some embodiments, the alpha channel value is further modified by a global transparency function.

In some embodiments, computing the alpha channel value further comprises computing an initial offset value. For example, the alpha channel value may be computed as a function of a location of the corresponding source pixel coordinate $(x_s,y_s)$ in the another area bordering the source digital image and as a function of the initial offset value. As another example, the alpha channel value may be a function of: (i) a distance between the corresponding source pixel coordinate $(x_s,y_s)$ and the boundary of the source digital image, and (ii) the width of said another area at the location of the corresponding source pixel coordinate $(x_s,y_s)$, and (iii) the initial offset value. In some embodiments, the initial offset value may be computed at least each time the effect is changed (i.e. when there is a new set of parameters or when one or more of the parameters change). In such embodiments, the initial offset value is a function of at least some of the parameters. The initial offset may be computed at least each time the effect is changed in order to control the softness boundary of a warped picture. In some embodiments, the computation of the initial offset value may comprise: for a given set of parameters, computing a ratio R based on a boundary line rotation angle (or more generally, based on the effect chosen by the user, which defines the set of parameters and which determines the boundary line rotation angle), and then computing horizontal and vertical offset values using the ratio R, and then choosing as the initial offset value $\alpha_0$ the minimum of the horizontal and vertical offset values.

In one embodiment, there is provided a digital video effects (DVE) device for performing any of the methods described herein. In one implementation, the DVE device transforms a source digital image in source video into a digital object in a target digital image in target video, and the DVE device comprises: memory to store the source digital image when received by the DVE device, and to store a value defining a width of an area that borders at least one boundary of the digital object in the target digital image. The width of the area is uniform along the at least one boundary of the digital object. The DVE device can further comprise a user interface to receive an indication of an effect to be applied to said source digital image. The DVE device can further comprise circuitry to perform operations including: (i) obtaining a set of parameters based on the indication of the effect; (ii) for a pixel coordinate $(x_t,y_t)$ of the target digital image that is within the area that borders the at least one boundary of the digital object, computing, using the pixel coordinate $(x_t,y_t)$ of the target digital image and at least some of the parameters, a corresponding source pixel coordinate $(x_s,y_s)$ that is within another area bordering the source digital image, the another area having a width that is non-uniform along a boundary of the source digital image; (iii) computing an alpha channel value defining semi-transparency of a pixel associated with the pixel coordinate $(x_t,y_t)$ of the target digital image. The alpha channel value may be computed as a function of a location of the corresponding source pixel coordinate $(x_s,y_s)$ in said another area bordering the source digital image.

In some embodiments, the DVE device may comprise a processor to execute instructions stored in memory in the DVE device. The instructions, when executed by the processor, cause the DVE device to perform the operations discussed herein. In some embodiments, this processor may be part of the "circuitry" referred to in the paragraph above.

In some embodiments, the DVE device may comprise an integrated circuit to perform the operations discussed herein. The integrated circuit may (in some embodiments) comprise a field-programmable gate array (FPGA) or an application-specific integrated circuit (ASIC). In some embodiments, the integrated circuit may be part of the "circuitry" referred to two paragraphs above.

In another embodiment, there is provided a computer readable storage medium having stored thereon computer executable instructions that, when executed by a computational device, cause the computational device to perform the operations discussed herein.

Finally, although boundaries of images are discussed, it will be appreciated that the methods described herein could be adapted to introduce uniform softness along another line or in an area inside an image away from the image boundaries. Such another line or area may be considered as bounded by "boundaries", and the methods described herein applied as such.

Although the foregoing has been described with reference to certain specific embodiments, various modifications thereof will be apparent to those skilled in the art without departing from the scope of the claims appended hereto.

The invention claimed is:

1. A method performed by a computational device as part of transforming a source digital image into a digital object in a target digital image, the source digital image and the target digital image each comprising a plurality of pixels; the method comprising:
    receiving and storing the source digital image in memory;
    receiving at a user interface an indication of an effect to be applied to said source digital image;
    obtaining a set of parameters based on the indication of the effect;
    obtaining a value defining a width of an area that borders at least one boundary of the digital object in the target digital image;
    the width of the area being uniform along the at least one boundary of the digital object;
    for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image, said another area having a width that is non-uniform along a boundary of the source digital image;
    computing an alpha channel value defining semi-transparency of a pixel associated with the pixel coordinate $(x_t, y_t)$ of the target digital image, the alpha channel value computed as a function of:
    (i) a distance between the corresponding source pixel coordinate $(x_s, y_s)$ and the boundary of the source digital image, and
    (ii) the width of said another area at the location of the corresponding source pixel coordinate $(x_s, y_s)$.

2. The method of claim 1, wherein the width of said another area at the location of the corresponding source pixel coordinate $(x_s, y_s)$ is a function of:
    (a) the value defining the width of the area that borders the at least one boundary of the digital object in the target digital image,
    (b) the target pixel coordinate $(x_t, y_t)$, and
    (c) at least some of the parameters.

3. The method of claim 1, wherein said computing the alpha channel value comprises obtaining an initial offset value and computing the alpha channel value as a function of the location of the corresponding source pixel coordinate $(x_s, y_s)$ in the another area bordering the source digital image and as a function of the initial offset value; the method further comprising using a different initial offset value when the effect to be applied to said source digital image changes.

4. The method of claim 1 further comprising: computing, for each one of a plurality of pixel coordinates of the target digital image, a respective corresponding source pixel coordinate; wherein each target pixel coordinate that is within the area that borders the at least one boundary of the digital object in the target digital image has a corresponding source pixel coordinate that is within said another area bordering the source digital image; and wherein an alpha channel value is computed for each one of the plurality of pixel coordinates of the target digital image in said area as a function of a distance between the respective corresponding source pixel coordinate and the boundary of the source digital image.

5. The method of claim 1, wherein said computing the alpha channel value comprises:
    computing four pre-alpha values, one for each of four boundaries of the source digital image, and obtaining the alpha channel value using the four pre-alpha values; and
    wherein each one of the four pre-alpha values is a function of:
    (i) the distance between the corresponding source pixel coordinate $(x_s, y_s)$ and a respective one of the four boundaries of the source digital image,
    (ii) the value defining the width of the area that borders the at least one boundary of the digital object,
    (iii) the target pixel coordinate $(x_t, y_t)$, and
    (iv) at least some of the parameters.

6. The method of claim 5, wherein said obtaining the alpha channel value using the four pre-alpha values comprises using the four pre-alpha values as inputs to one or more fuzzy logic functions.

7. The method of claim 5, further comprising computing each one of the four pre-alpha values in parallel; and wherein computing each one of the four pre-alpha values comprises:
- using computational circuitry that is substantially identical to other computational circuitry used to compute each other of the four pre-alpha values; and
- inputting into the computational circuitry parameter values that are different from parameter values used to compute each other of the four pre-alpha values.

8. The method of claim 1, further comprising obtaining an intermediary computational result when computing the corresponding source pixel coordinate $(x_s, y_s)$, and then using the intermediary computational result in computing the alpha channel value.

9. The method of claim 1, wherein the source digital image is an image in a source digital video and wherein the target digital image is an image in a target digital video; wherein the alpha channel value is in the range $0 \leq \alpha \leq 1$, where $\alpha$ is the alpha channel value; and the method further comprising:
- computing a pixel value for the pixel coordinate $(x_t, y_t)$ of the target digital image using one or more pixel values in the source digital image that are obtained based on the corresponding source pixel coordinate $(x_s, y_s)$;
- combining the alpha channel value with the pixel value for the pixel coordinate $(x_t, y_t)$ of the target digital image to effect transparency of the pixel value and result in a semi-transparent pixel value.

10. A digital video effects (DVE) device for transforming a source digital image in source video into a digital object in a target digital image in target video, the source digital image and the target digital image each comprising a plurality of pixels; the DVE device comprising:
- memory to store the source digital image when received by the DVE device, and to store a value defining a width of an area that borders at least one boundary of the digital object in the target digital image;
- the width of the area being uniform along the at least one boundary of the digital object;
- a user interface to receive an indication of an effect to be applied to said source digital image; and
- circuitry to perform operations including:
  - obtaining a set of parameters based on the indication of the effect;
  - for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image, said another area having a width that is non-uniform along a boundary of the source digital image;
  - computing an alpha channel value defining semi-transparency of a pixel associated with the pixel coordinate $(x_t, y_t)$ of the target digital image, the alpha channel value computed as a function of:
    - (i) a distance between the corresponding source pixel coordinate $(x_s, y_s)$ and the boundary of the source digital image, and
    - (ii) the width of said another area at the location of the corresponding source pixel coordinate $(x_s, y_s)$.

11. The DVE device of claim 10, wherein the circuitry comprises a processor to execute instructions stored in the memory; the instructions, when executed by the processor, causing said operations to be performed by the DVE device.

12. The DVE device of claim 10, wherein the circuitry comprises an integrated circuit to perform said operations; wherein said integrated circuit comprises at least one of a field-programmable gate array (FPGA) and an application-specific integrated circuit (ASIC).

13. The DVE device of claim 10, wherein the width of said another area at the location of the corresponding source pixel coordinate $(x_s, y_s)$ is a function of: (a) the value defining the width of the area that borders the at least one boundary of the digital object in the target digital image, (b) the target pixel coordinate $(x_t, y_t)$, and (c) at least some of the parameters.

14. The DVE device of claim 10, wherein the circuitry is further to perform operations including: computing, for each one of a plurality of pixel coordinates of the target digital image, a respective corresponding source pixel coordinate; wherein each target pixel coordinate that is within the area that borders the at least one boundary of the digital object in the target digital image has a corresponding source pixel coordinate that is within said another area bordering the source digital image; and wherein an alpha channel value is computed for each one of the plurality of pixel coordinates of the target digital image in said area as a function of a distance between the respective corresponding source pixel coordinate and the boundary of the source digital image.

15. The DVE device of claim 10, wherein the circuitry is to perform said computing the alpha channel value by:
- computing four pre-alpha values, one for each of four boundaries of the source digital image, and obtaining the alpha channel value using the four pre-alpha values; and
- wherein each one of the four pre-alpha values is a function of:
  - (i) the distance between the corresponding source pixel coordinate $(x_s, y_s)$ and a respective one of the four boundaries of the source digital image,
  - (ii) the value defining the width of the area that borders the at least one boundary of the digital object,
  - (iii) the target pixel coordinate $(x_t, y_t)$, and
  - (iv) at least some of the parameters.

16. The DVE device of claim 15, further comprising four sets of identical computation circuitry for respectively computing each one of the four pre-alpha values in parallel; each one of the sets of computational circuitry for receiving parameter values that are different from parameter values used to compute each other of the four pre-alpha values.

17. The DVE device of claim 10, wherein the circuitry is further to perform operations including: obtaining an intermediary computational result when computing the corresponding source pixel coordinate $(x_s, y_s)$, and then using the intermediary computational result in computing the alpha channel value.

18. The DVE device of claim 10, wherein the alpha channel value is in the range $0 \leq \alpha \leq 1$, where $\alpha$ is the alpha channel value; and the circuitry is further to perform operations including:
- computing a pixel value for the pixel coordinate $(x_t, y_t)$ of the target digital image using one or more pixel values in the source digital image that are obtained based on the corresponding source pixel coordinate $(x_s, y_s)$;

combining the alpha channel value with the pixel value for the pixel coordinate $(x_t, y_t)$ of the target digital image to effect transparency of the pixel value and result in a semi-transparent pixel value.

19. A computer readable storage medium having stored thereon computer executable instructions for transforming a source digital image into a digital object in a target digital image, the source digital image and the target digital image each comprising a plurality of pixels; the computer executable instructions, when executed by a computational device, cause the computational device to perform operations comprising:

receiving and storing the source digital image in a memory;

receiving from a user interface an indication of an effect to be applied to said source digital image;

obtaining a set of parameters based on the indication of the effect;

obtaining a value defining a width of an area that borders at least one boundary of the digital object in the target digital image; the width of the area being uniform along the at least one boundary of the digital object;

for a pixel coordinate $(x_t, y_t)$ of the target digital image that is within the area that borders the at least one boundary of the digital object, computing, using the pixel coordinate $(x_t, y_t)$ of the target digital image and at least some of the parameters, a corresponding source pixel coordinate $(x_s, y_s)$ that is within another area bordering the source digital image, said another area having a width that is non-uniform along a boundary of the source digital image;

computing an alpha channel value defining semi-transparency of a pixel associated with the pixel coordinate $(x_t, y_t)$ of the target digital image, the alpha channel value computed as a function of:

(i) a distance between the corresponding source pixel coordinate $(x_s, y_s)$ and the boundary of the source digital image, and (ii) the width of said another area at the location of the corresponding source pixel coordinate $(x_s, y_s)$.

\* \* \* \* \*